United States Patent Office 3,107,342
Patented Oct. 15, 1963

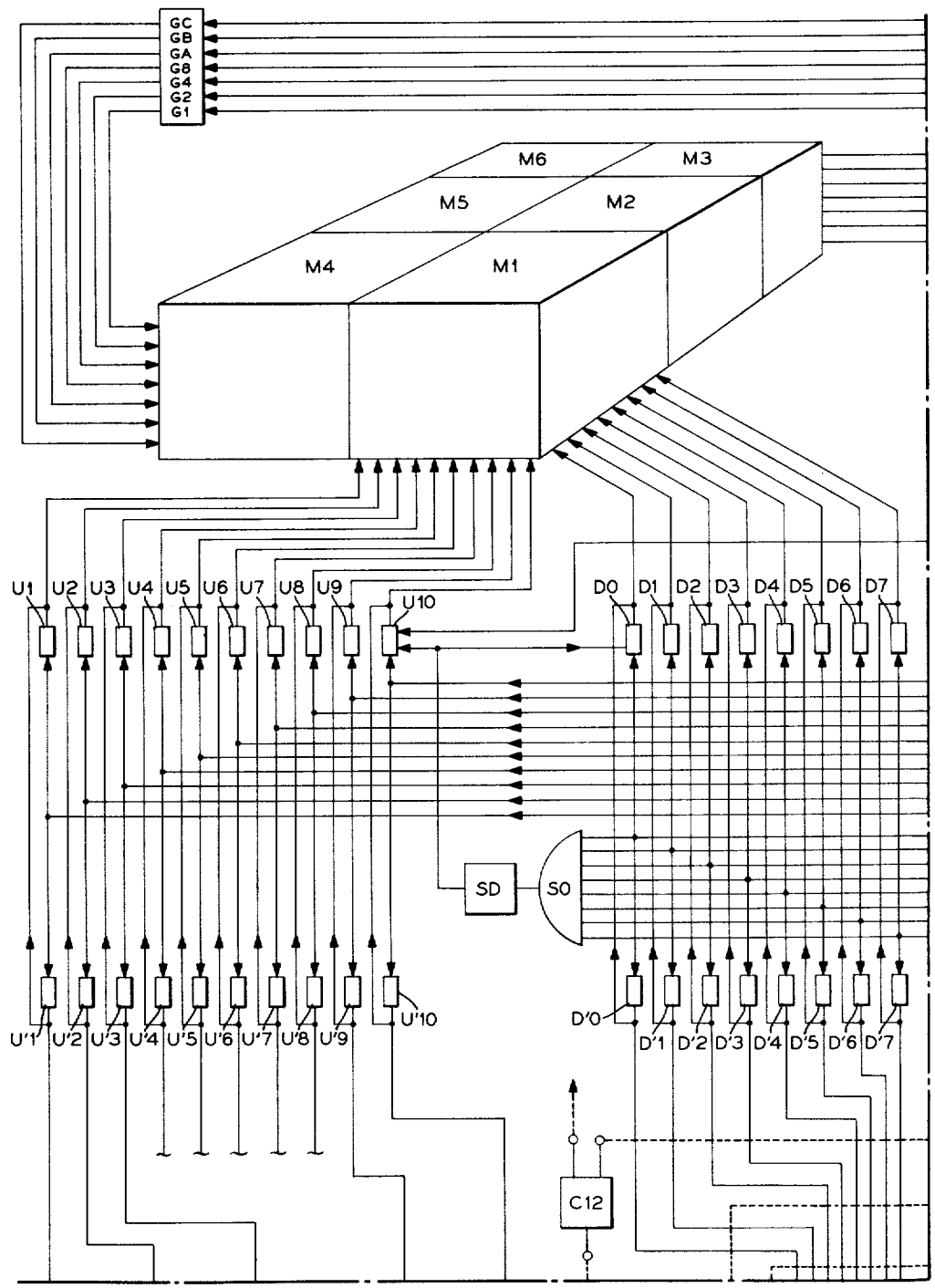
FIG_2a_

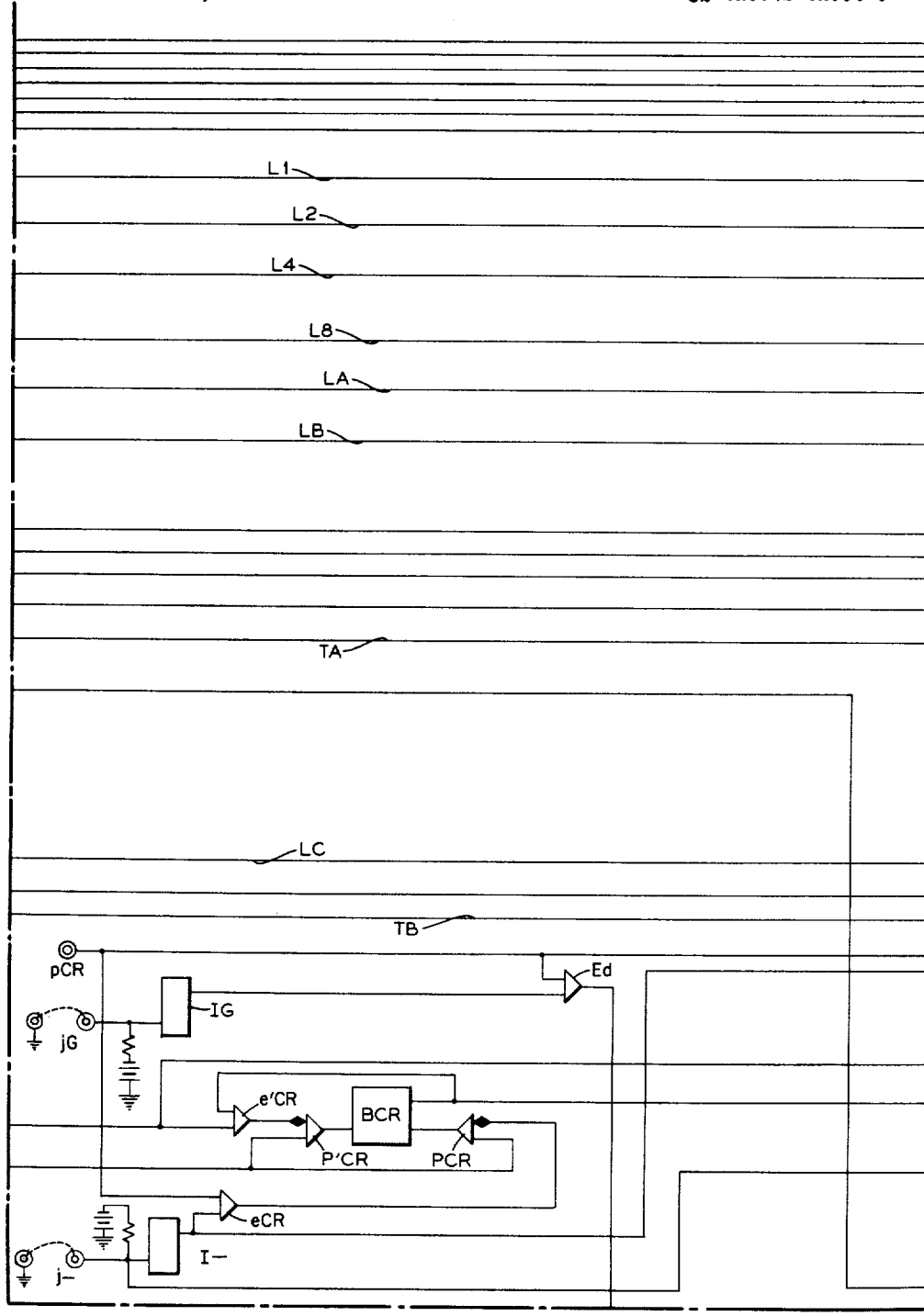
FIG_4d_

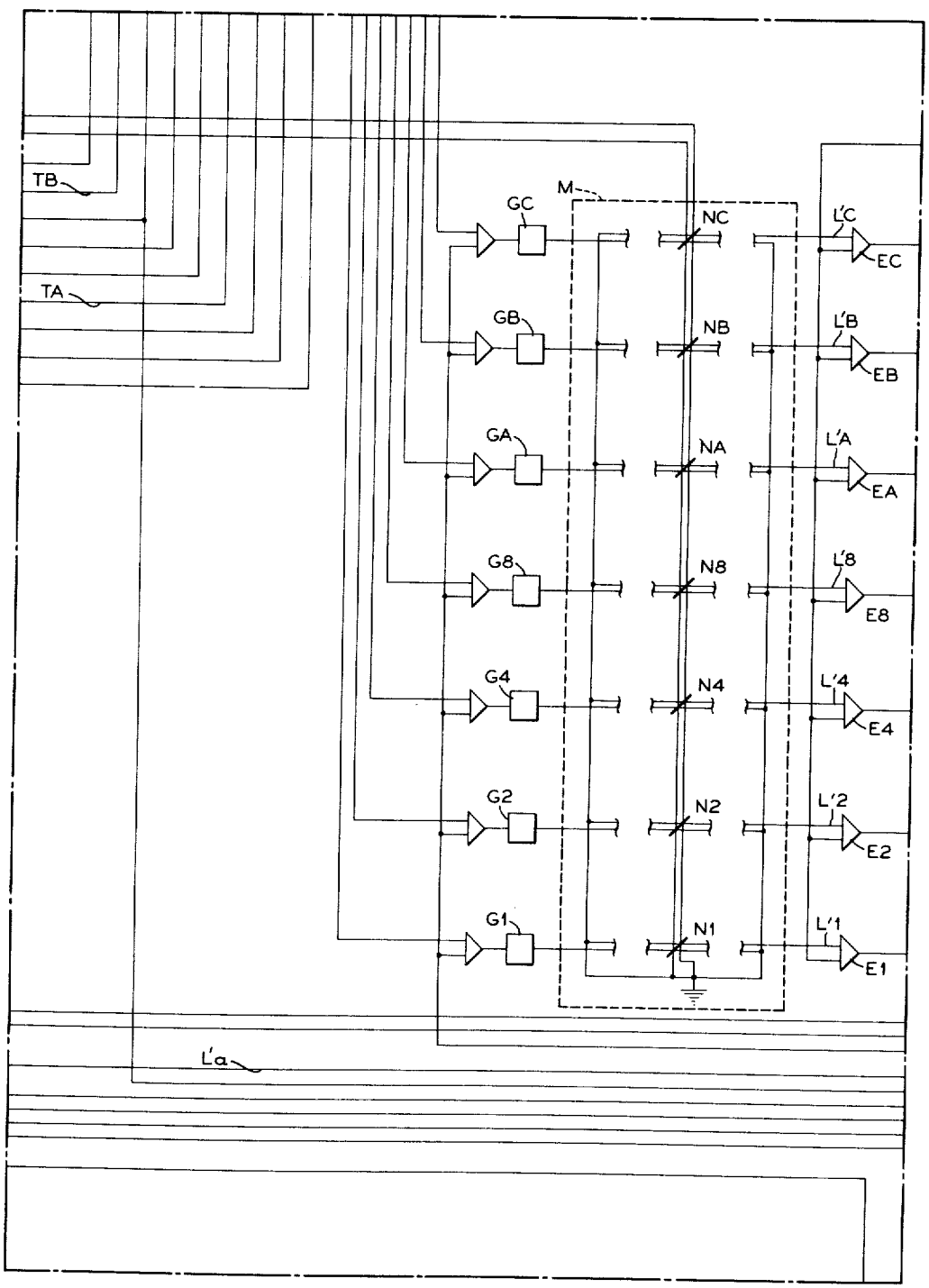
FIG_4i_

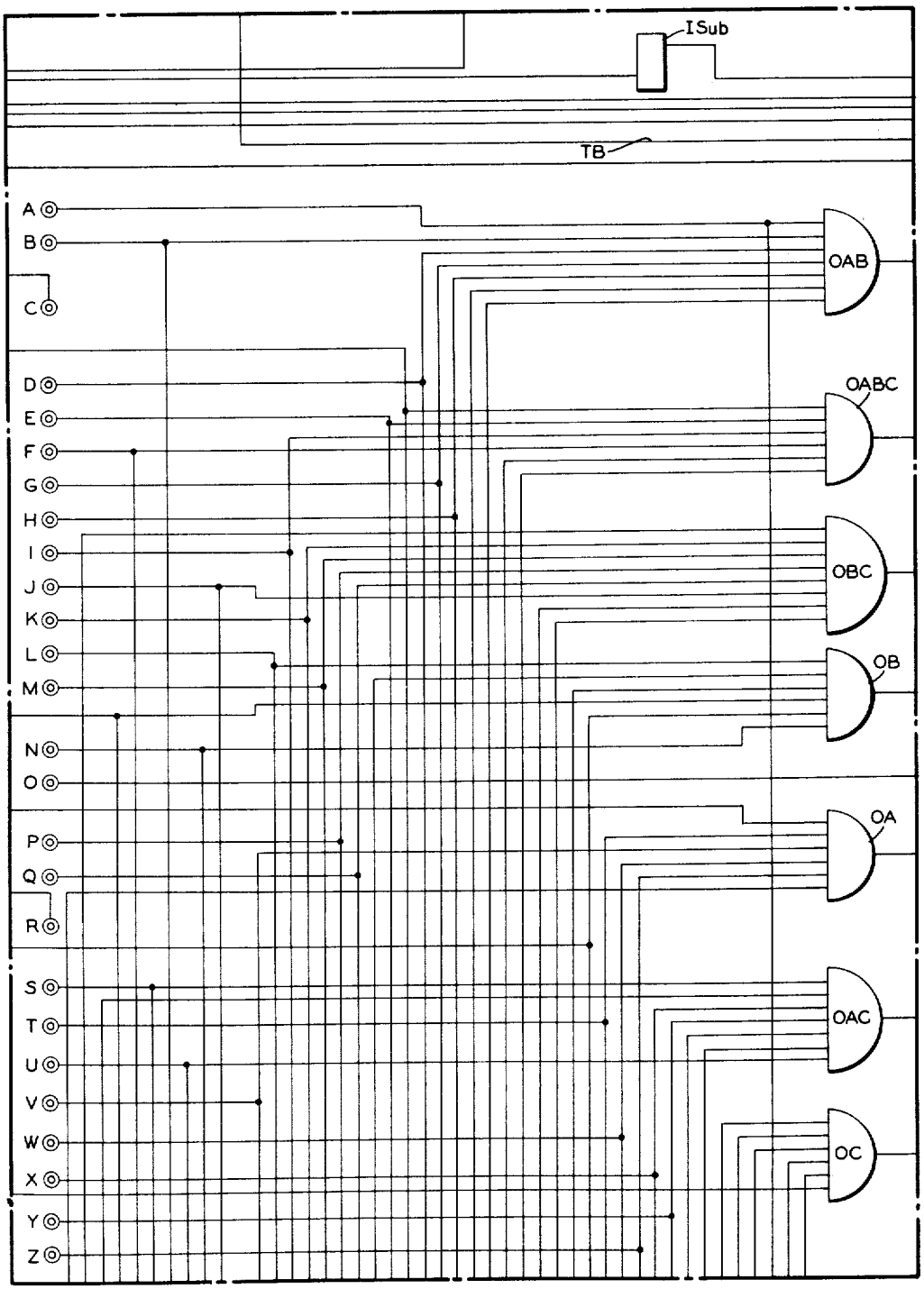
FIG_4n_

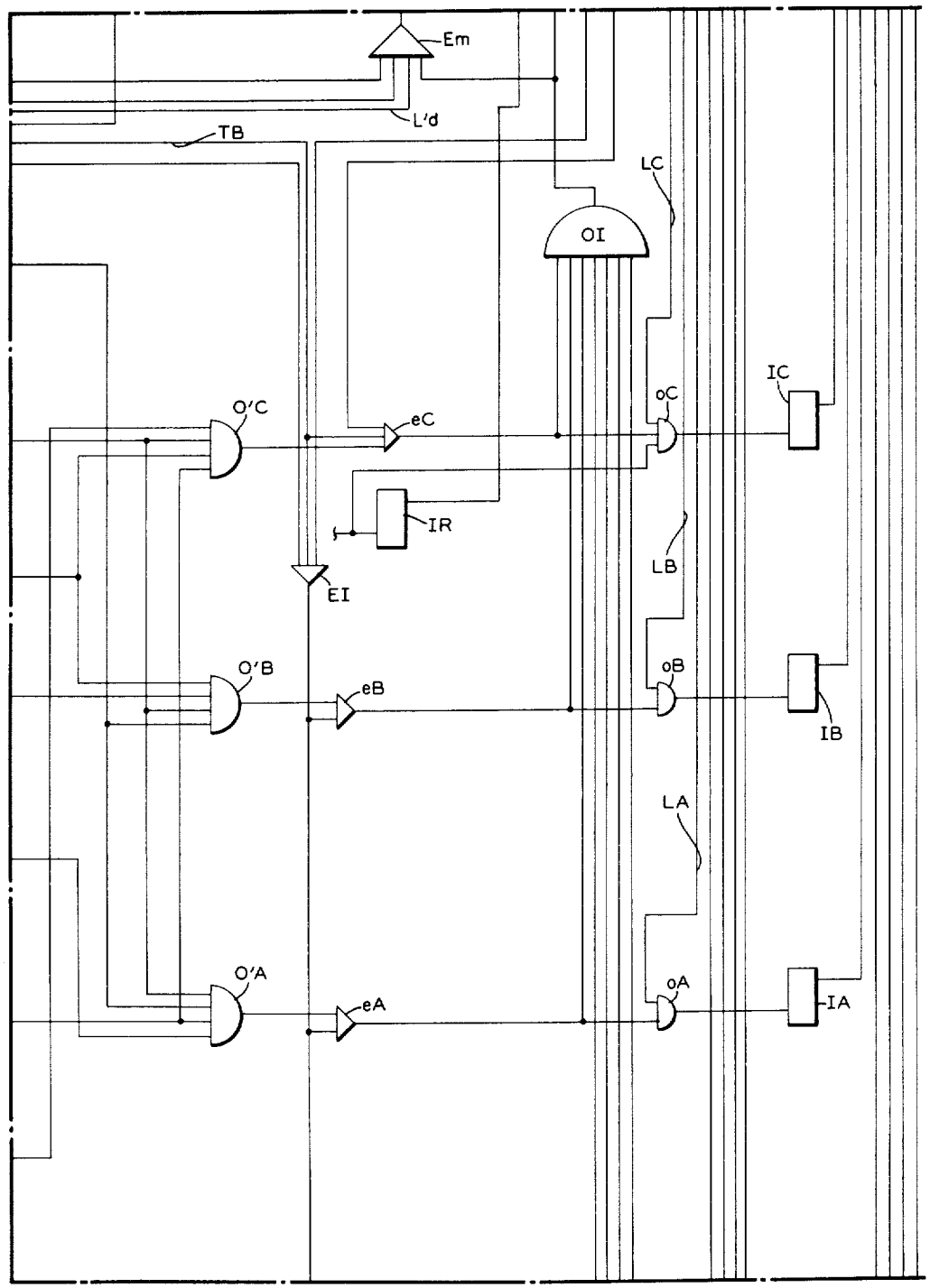
FIG_40_

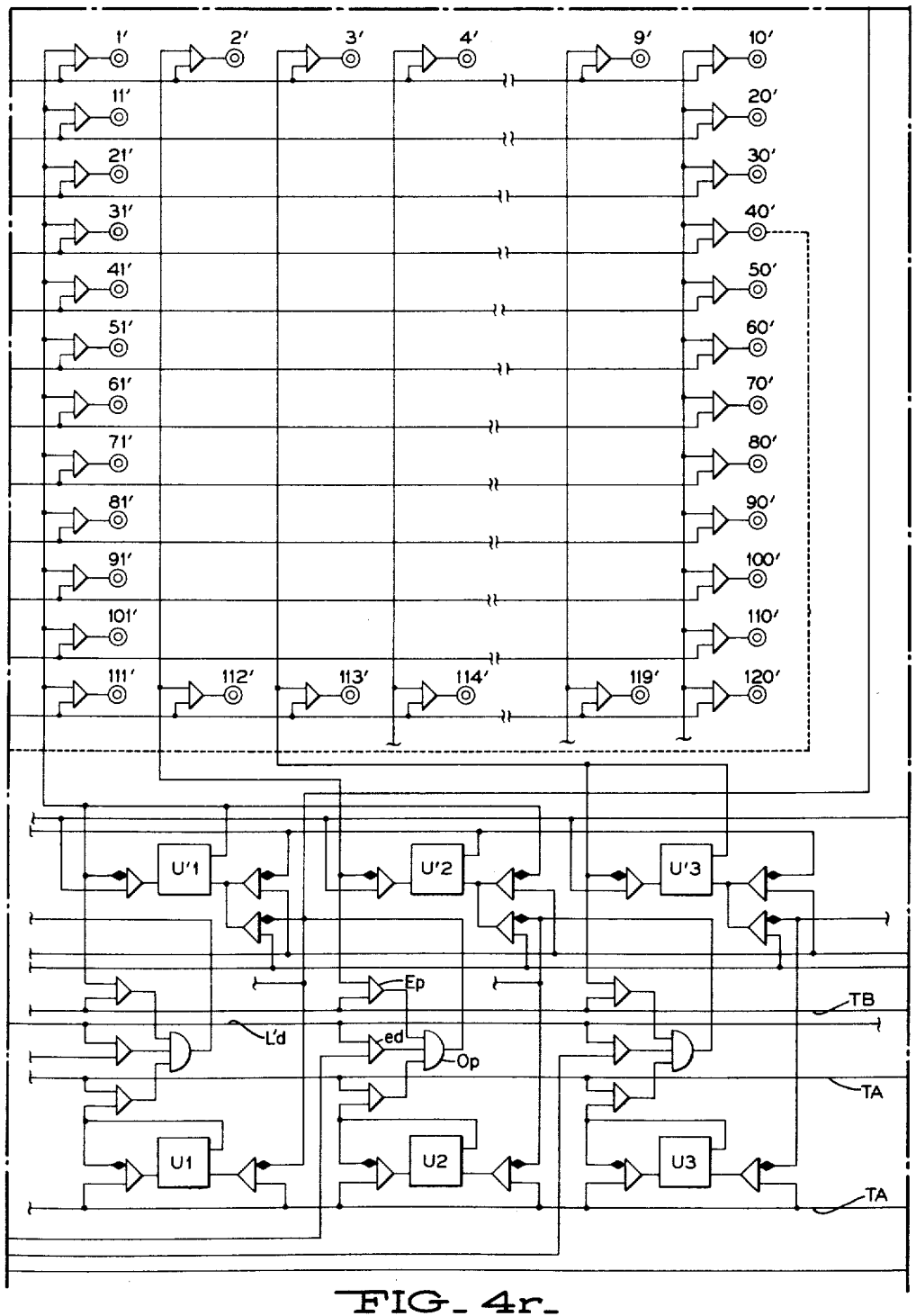
FIG_4r_

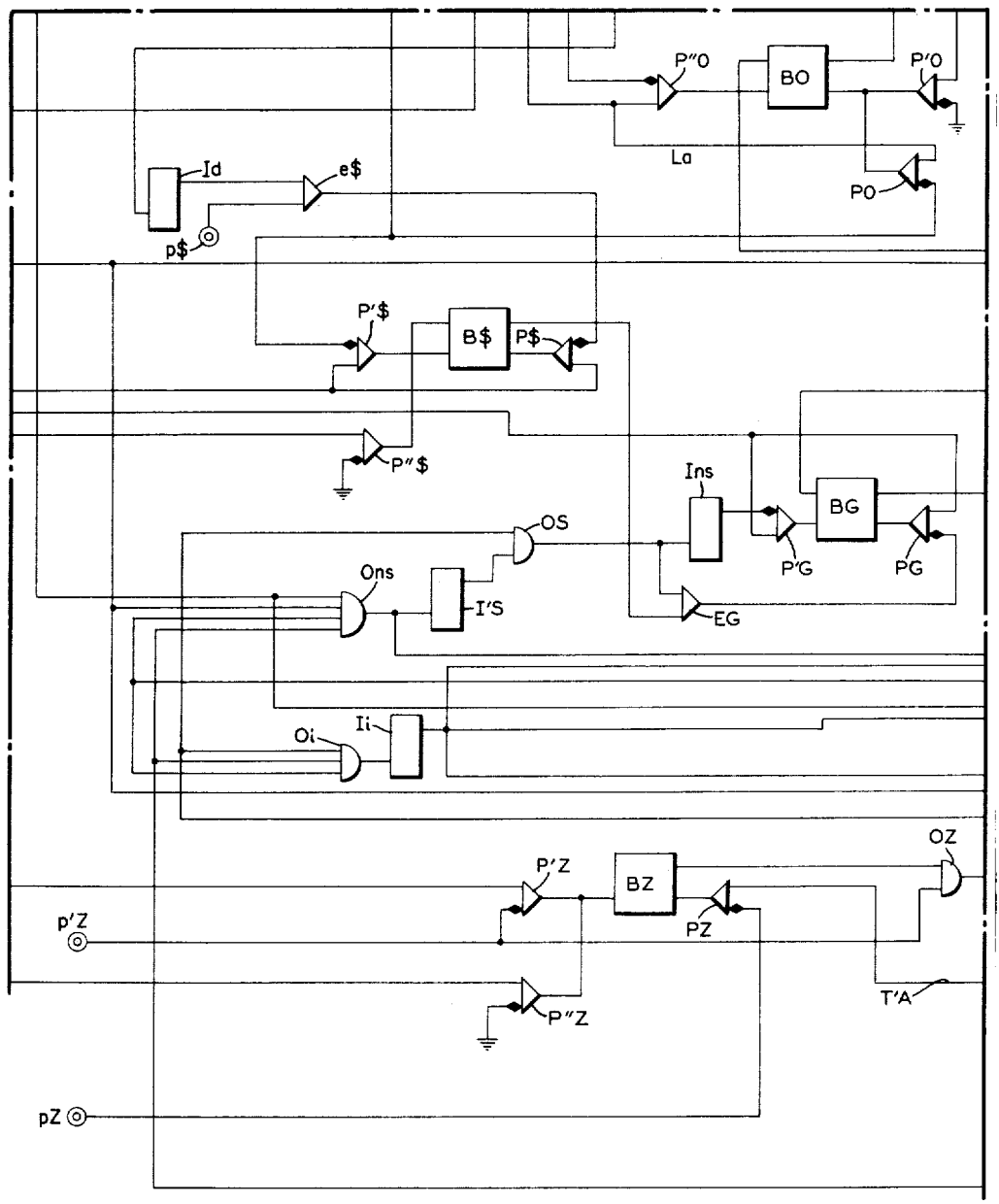
FIG_ 4t_

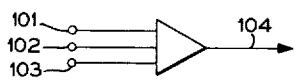
FIG_6_
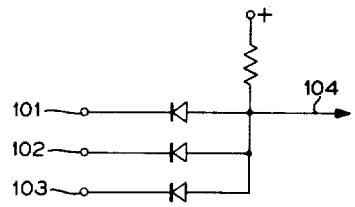
FIG_6a_
FIG_7_
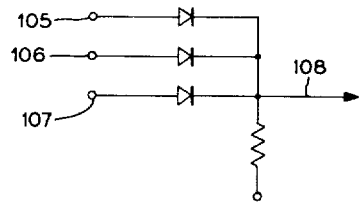
FIG_7a_
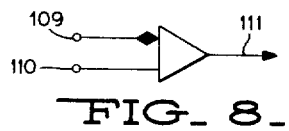
FIG_8_
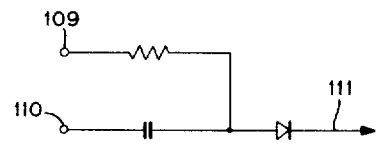
FIG_8a_
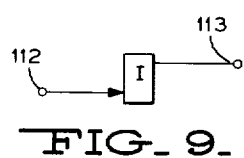
FIG_9_
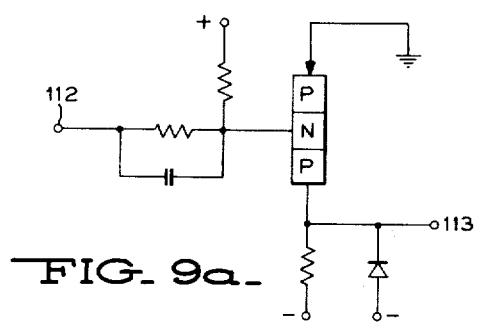
FIG_9a_

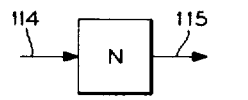
FIG. 10.
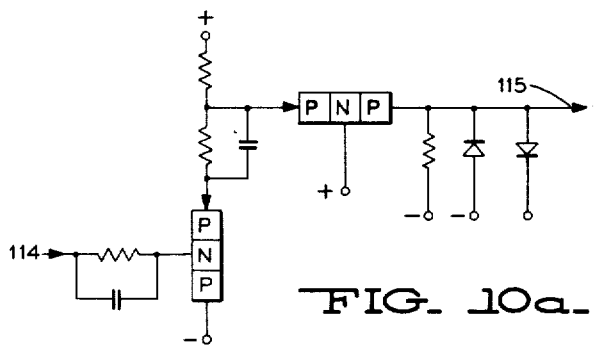
FIG. 10a.
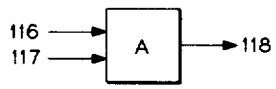
FIG. 11.
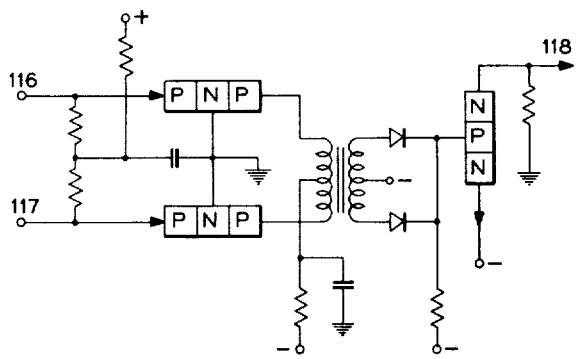
FIG. 11a.
FIG. 11b.
FIG. 12b.
FIG. 12.
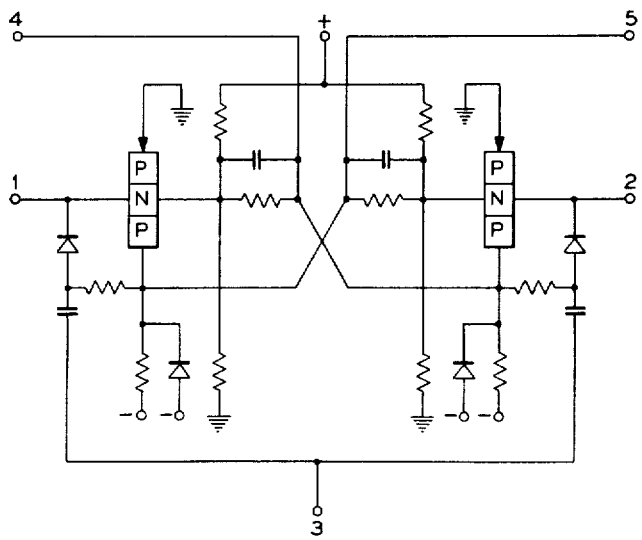
FIG. 12a.

3,107,342
EDITING MACHINE
Eugeni Estrems, Saint Mande, and Maurice Papo, Paris, France, assignors to International Business Machines Corporation, New York, N.Y., a corporation of New York
Filed Dec. 23, 1957, Ser. No. 704,782
27 Claims. (Cl. 340—172.5)

This invention relates to a machine used for editing information and which may be utilized in accounting machines, calculators, etc.

To make it more convenient, even though the data are not necessarily assembled according to lines and may be arranged in any manner, a group including a miscellaneous number of information and composed during a machine operating cycle will be indicated as an "information line."

In previous electrical accounting machines, the editing of an information line is usually performed through intricate mechanical devices, slow and cumbersome. For the transfer of the information to the printing mechanisms, these devices require a connection for each character or position of the line to be composed; for example, in order to compose an 80 position line, 80 connections must be wired. Not only does this large number of connections hinder the machine control panel, but still, in case it is desired to compose differently 2 lines, it is necessary to use a certain number of selectors having in total as many transferable contacts as there are connections to be switched according to the above example, if, in the 2 lines to be composed, the distribution of the information is different for the 80 positions, 20 selectors with 4 transferable contacts for example, are necessary; according to the occupied state, normal or transferred, these selectors allow the composition of the line according to one or the other of the selected types.

A primary object of this invention is to provide an improved data processing machine.

Another object of this invention is to provide improved editing apparatus for a data processing machine.

Another object is to provide editing apparatus of improved flexibility.

A further object is to provide more easily operated controls for editing apparatus.

Another object is to provide editing apparatus with wider utility.

Another object is to provide improved editing apparatus allowing a complete redistribution of data in a single program step.

Another object is to provide improved editing apparatus wherein a plurality of characters may be selected by a single control wire.

Another object is to provide improved apparatus for inserting special symbols at locations determined by the data being processed.

Another object is to provide improved apparatus for effecting a floating $ operation.

Still another object is to provide editing apparatus of improved speed.

Another object is to provide an editing machine of high versatility.

A still further object is to provide an editing machine of economic construction with high versatility.

Another object is to provide an editing machine with serial operation and improved speed.

Another object is to provide an improved editing machine requiring fewer plug connections.

Another object is to provide an editing machine requiring fewer selectors for changing a format.

A more particular object of this invention is to provide an improved zero suppression apparatus for an editing machine.

Another object is to provide an editing machine with improved sign detecting apparatus.

The present machine provides for the composition of an information line in a storage device, the format of which line may vary from one machine cycle to the other. Control circuits are associated with each position of said storage device in order to control the elimination, the replacement or the insertion of a whole or a part of an information element, while conserving space on the control panel, especially by reducing the number of selectors necessary to change the format of the line to be transferred later to any display device such as a printing or punching mechanism, for example. This editing machine allows the recording to the output storage of an information line with all its details, thus making up the complete picture of the line to be printed, punched, etc.

The present machine may perform simultaneously a redistribution of the information, the erasing of certain characters, the substitution or the insertion of one or several miscellaneous characters which may, for example, make up fixed words. The arrangement of these circuits is such that it is sufficient to control an operation at a determined position, in order that this operation be automatically performed during the following position (or positions) until the control of another operation is reached. The insertion of characters may be unconditional or, for example, depend on the sign of the quantity to be printed. The position where the character is to be inserted may also, either be arbitrarily determined, or depend on certain conditions, such as: the character may be printed in the position to the left of the first significant digit of the quantity to be printed.

The information line may be composed during a direct scanning (from right to left) of all its positions, then it is retouched by an opposite scanning (from left to right) just before the display, the printing, etc., so that the output storage contains the very picture of the information line that will be displayed, printed, etc. During the direct scanning, transfers, insertions, suppressions or substitutions may be performed. During the opposite scanning, substitutions may still be performed, so that, after the opposite scanning, the information line be completely composed.

The composition of an information line is an operation which may be performed in a single program step, and once the line has been composed, the display, the printing, etc., is controlled by a single program step, regardless of the number of characters included in the line. After controlling the display, printing, etc., the output storage is reset, that is a blank is recorded in all the positions of the storage, in order that it be ready to receive the information to be reproduced in the following line.

The operating times for an editing program are synchronized with the computing cycles so that the same selectors may be used indifferently for computing or editing.

The machine is provided with several devices that enable numerous types of editing to be done.

A special device, controlled by a single connection allows the insertion, at the beginning of the quantity to be printed, of one or several check protection asterisks, the number of asterisks to be inserted are automatically determined according to the first significant digit of the quantity to be printed. In prior devices, in order to insert these asterisks, a relay was necessary for each position that might be occupied by an asterisk.

Another device allows to record a dollar sign in the next position to the left of the high order significant digit and consequently must first determine the position into which the dollar sign is to be printed.

Another device allows the erasure of certain characters, that is, either a single blank may be inserted or a continuous series of blanks. During this insertion, as during all the others, the information transfer is interrupted. In order to insert a series of blanks, it is sufficient to wire 2 connections that determine the two positions between which the blanks must be inserted.

The print edit is performed according to a general rule; only exceptions need be wired. Thus, another device erases automatically the zeros on the right of a blank, and this suppression is stopped upon reading the first significant digit. This function is performed during the opposite scanning, and, being in accordance with the general rule, need not be wired. Some exceptions which must be wired through one or two connections are:

(1) Zero suppress in the absence of blanks preceding the field.

(2) Zero print starting from a predetermined position.

(3) Zero print between two positions.

Another device allows the insertion of the character — (minus) or letters CR (credit), either on the right, or on the left of the quantity to be printed if it is negative. The control of a CR or — on the right of a quantity automatically starts a sign detection. A single connection is sufficient to control the insertion of R, and the C is automatically recorded on its left. In case the quantity is positive, one or two blanks replace — or CR.

During the transfer into the output storage, two connections control an information offset device according to the computed result. The columns in which a quantity (a total, for example) is to be printed may vary according to the sign. A certain number of columns are appointed to a credit balance and different columns to a debit balance. Generally, the debit quantities are printed on the left and the credit on the right, but the contrary is also possible through a single additional connection.

Through a small number of selectors, it is possible to compose differently several successive lines, the splitting, the distribution or the insertions being controlled by miscellaneous conditions acting on the selectors, so that the line format may vary on each edit cycle.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a general block diagram of a machine constructed in accordance with the present invention.

FIGS. 2a through 2c constitute a somewhat more detailed block diagram of the machine as shown in FIG. 1.

FIG. 3 shows how FIGS. 2a through 2c should be placed together.

FIG. 5 shows how FIGS. 4a through 4x should be placed together.

Figure 4A:
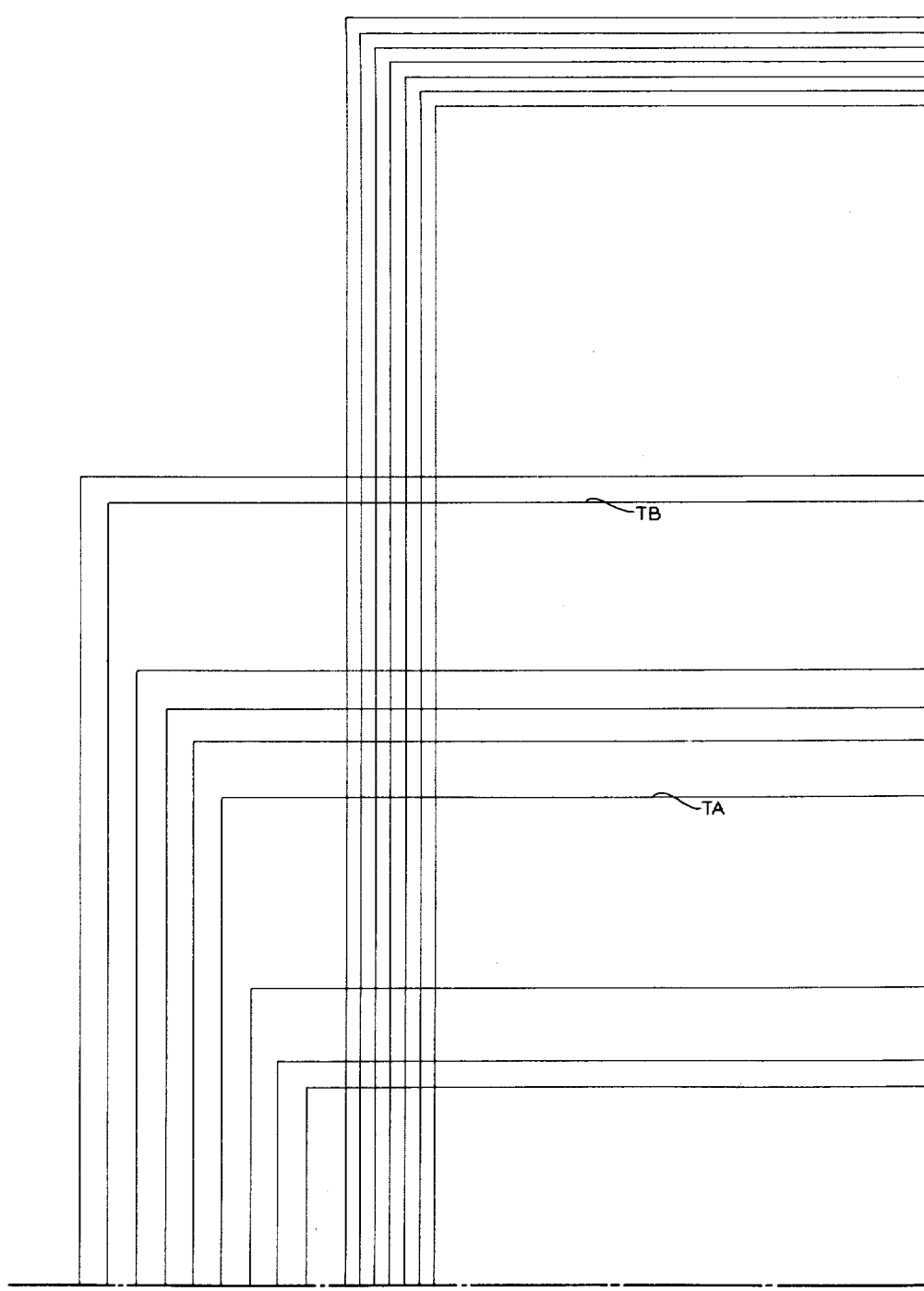
FIGS. 4a through 4x show a detailed block diagram of the machine as shown in FIGS. 2a through 2c.
Figure 4B:
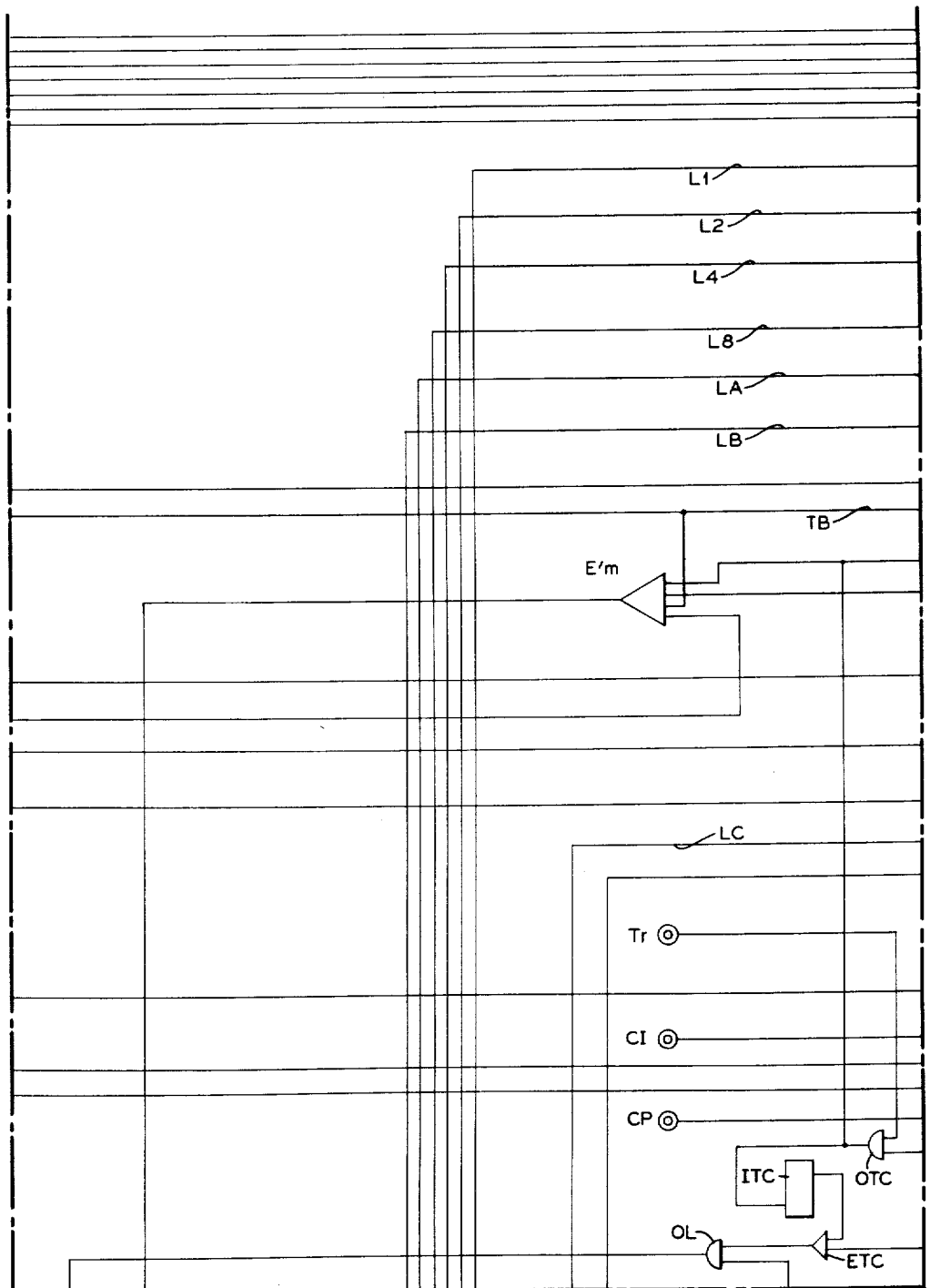
Figure 4C:
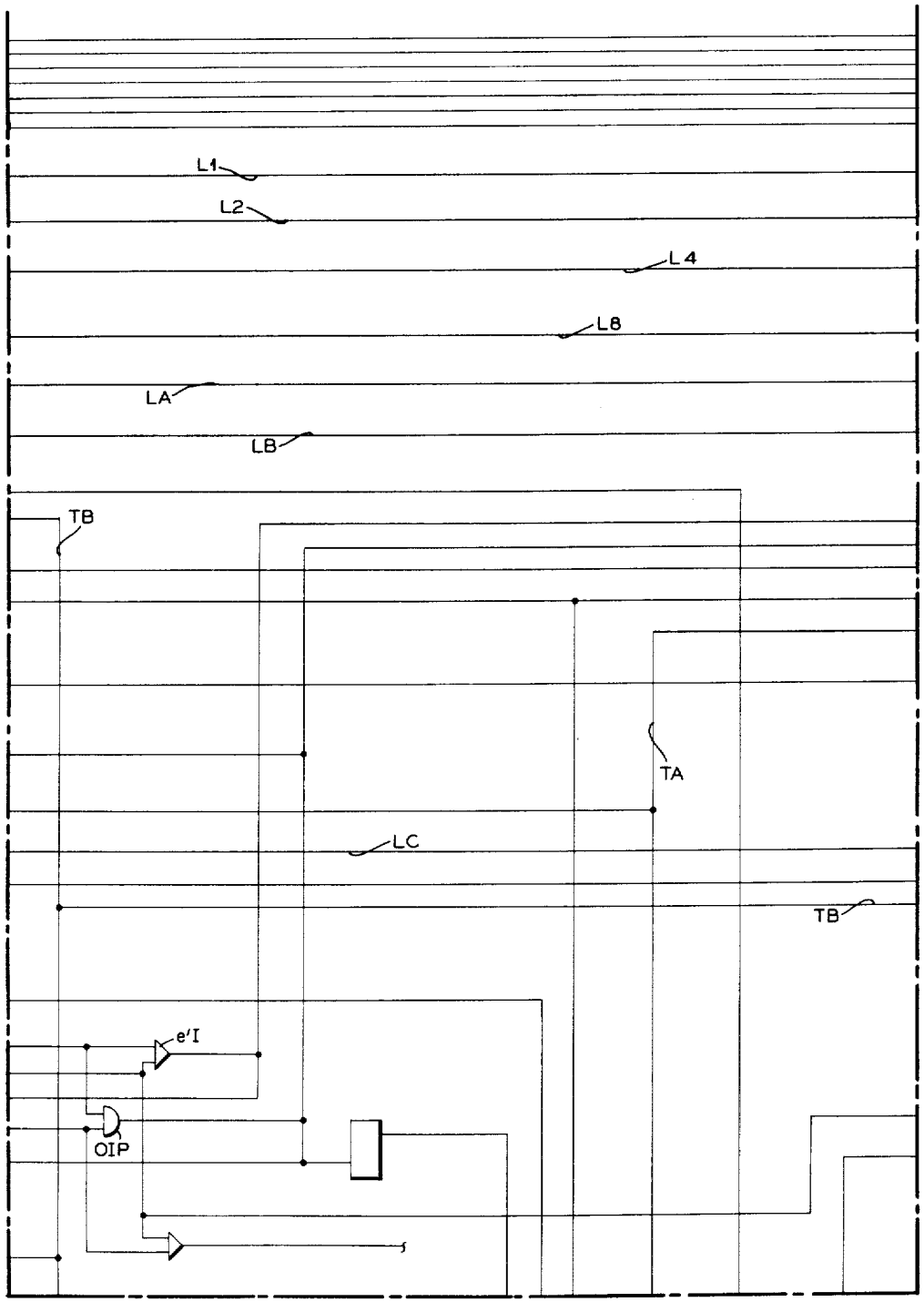
Figure 4E:
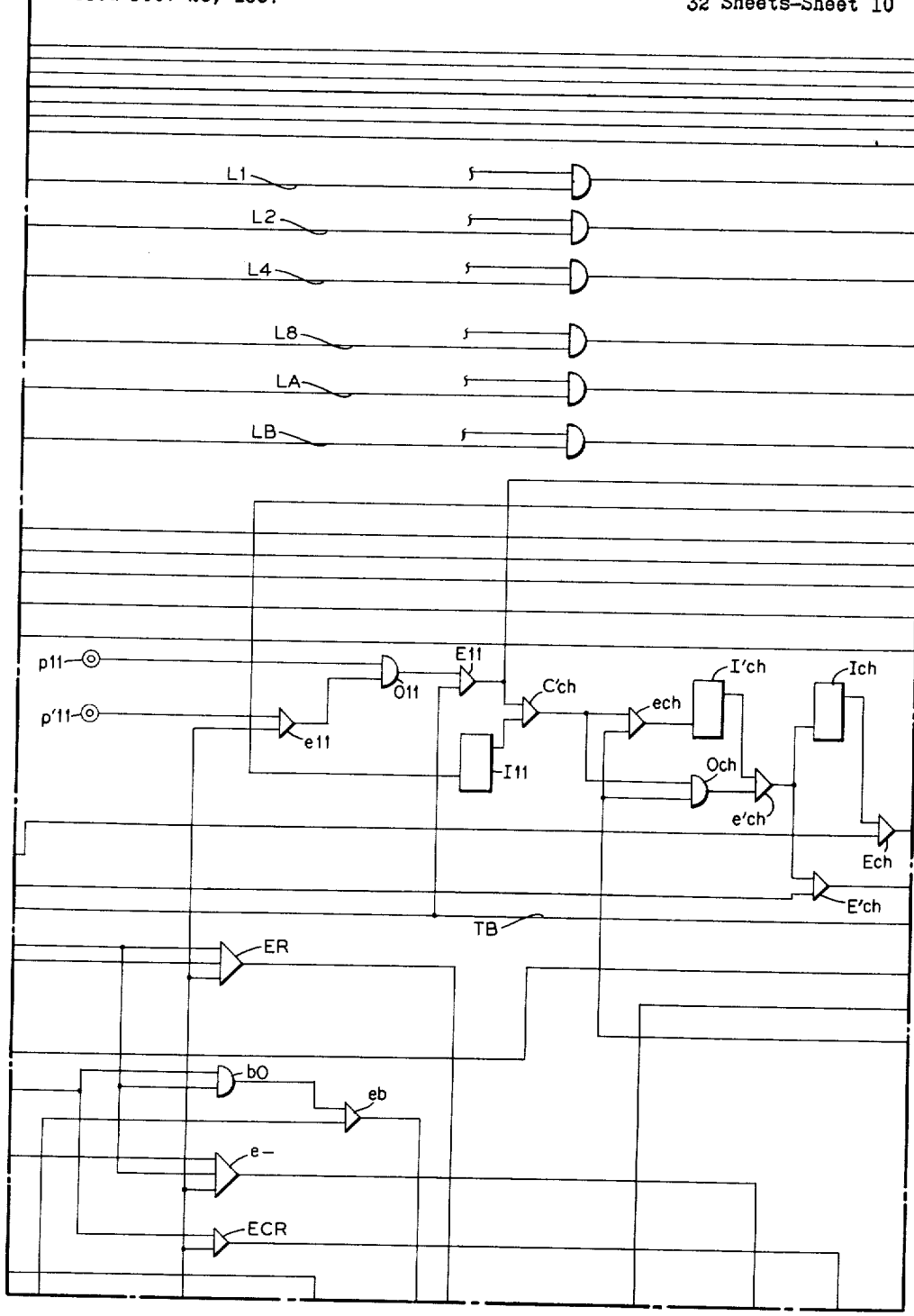
Figure 4F:
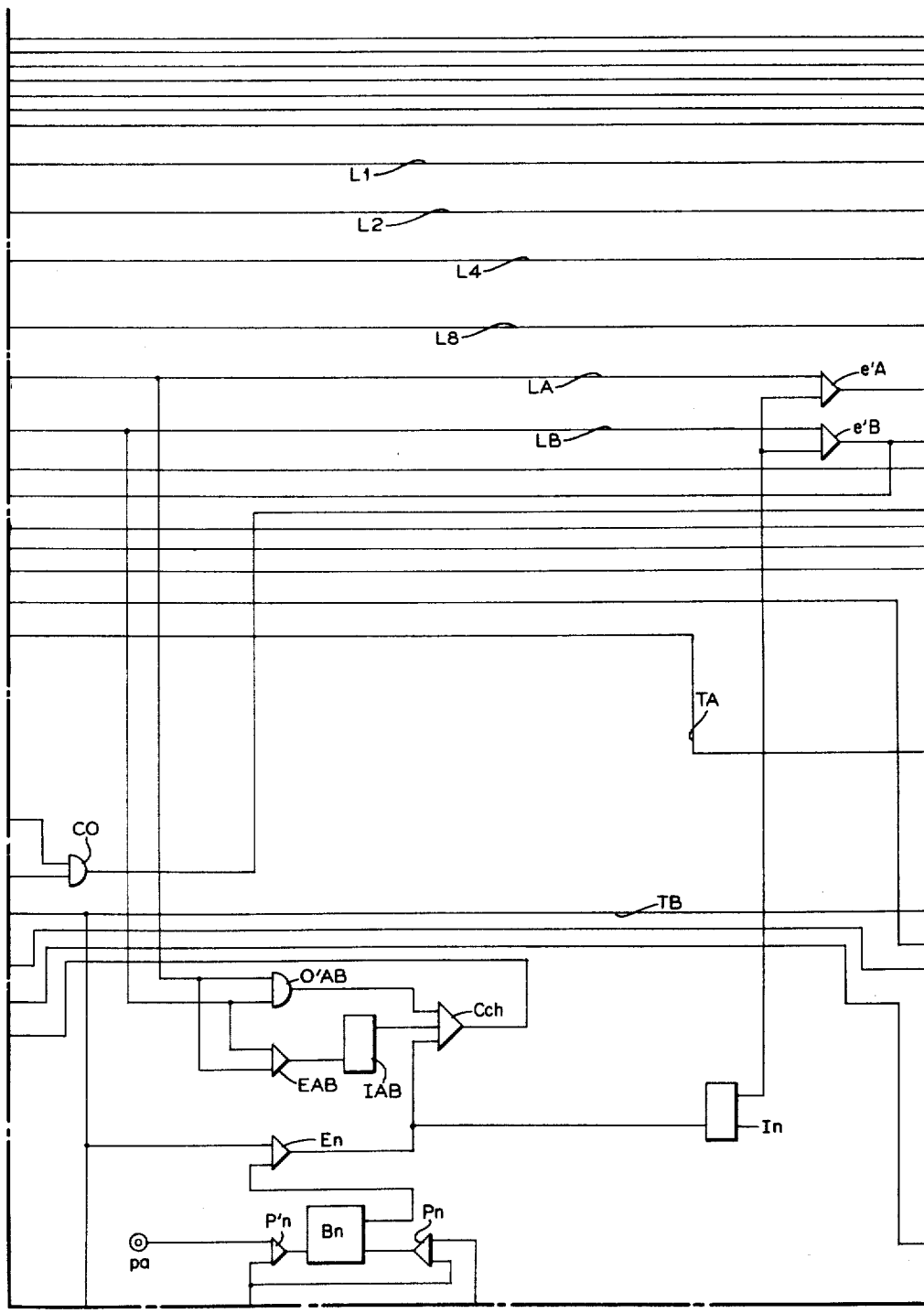
Figure 4G:
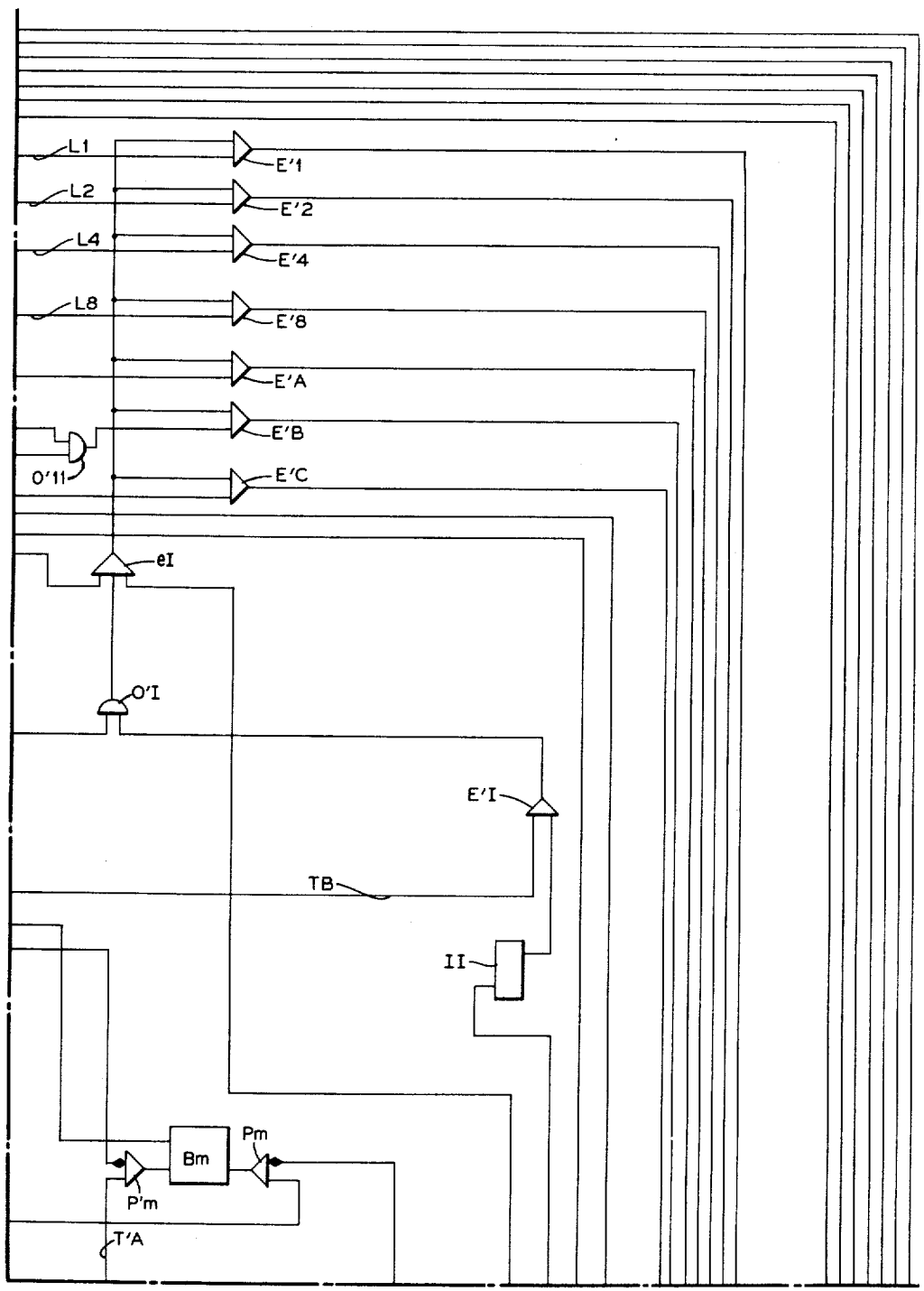
Figure 4H:
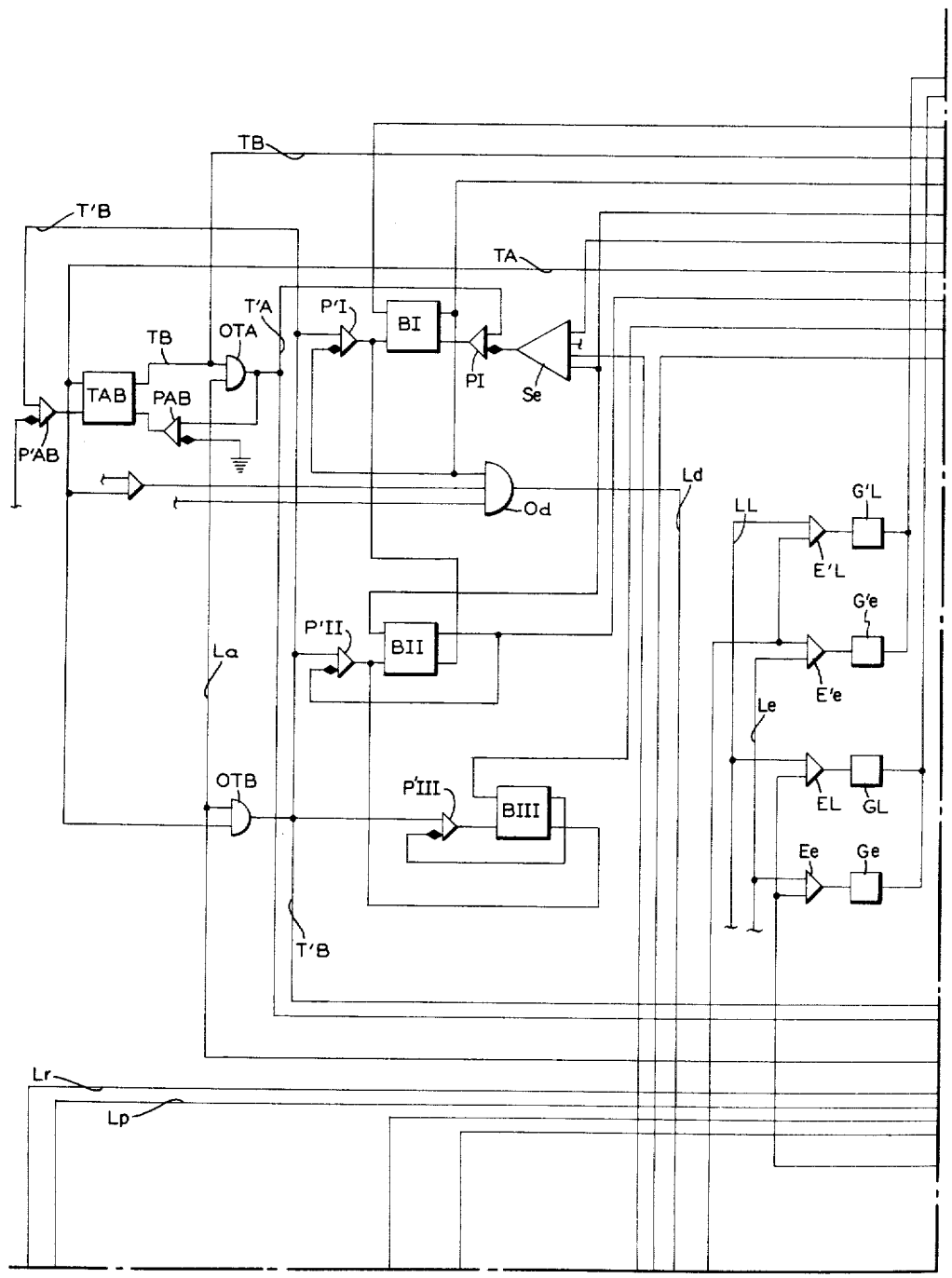
Figure 4J:
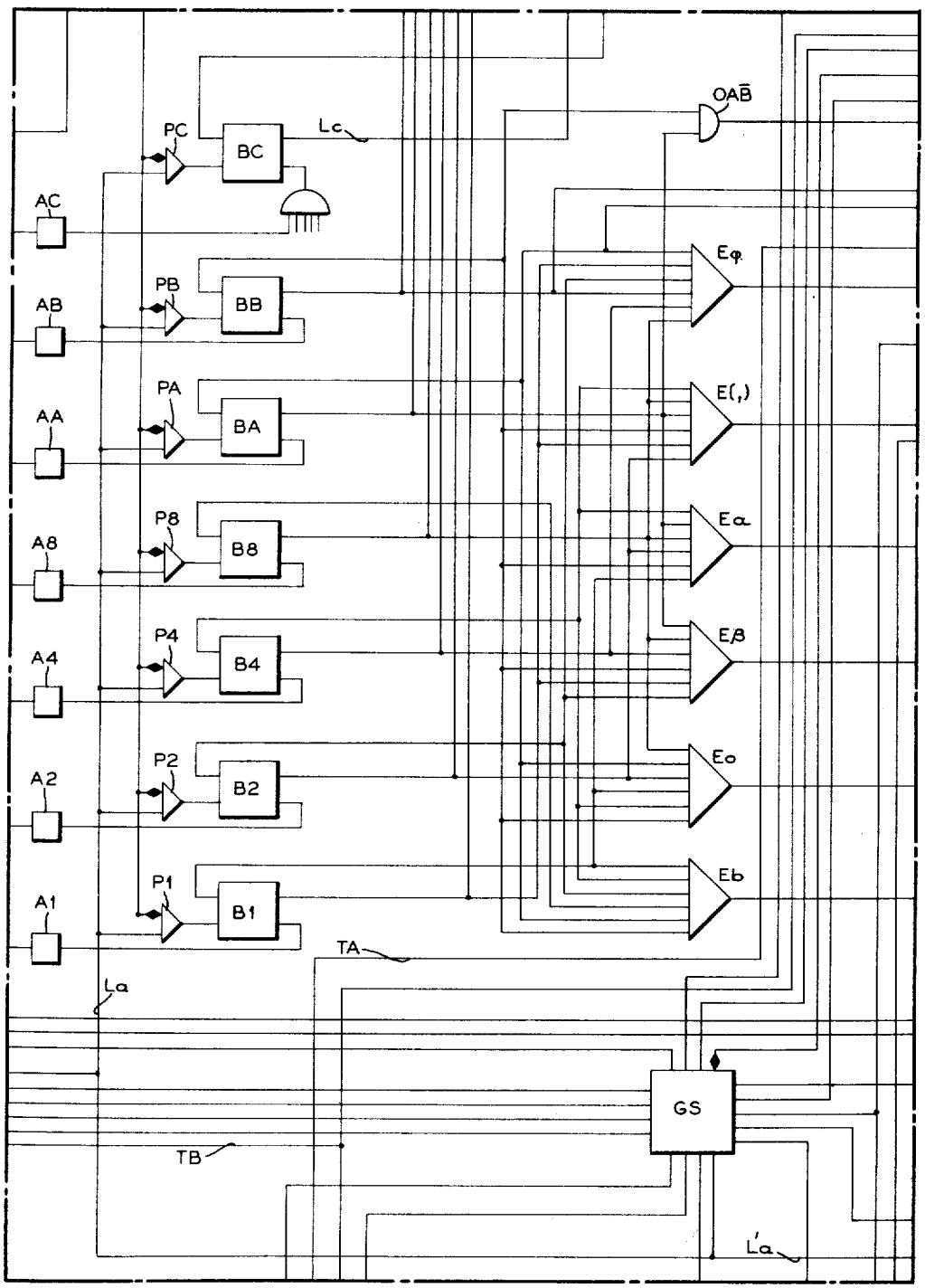
Figure 4K:
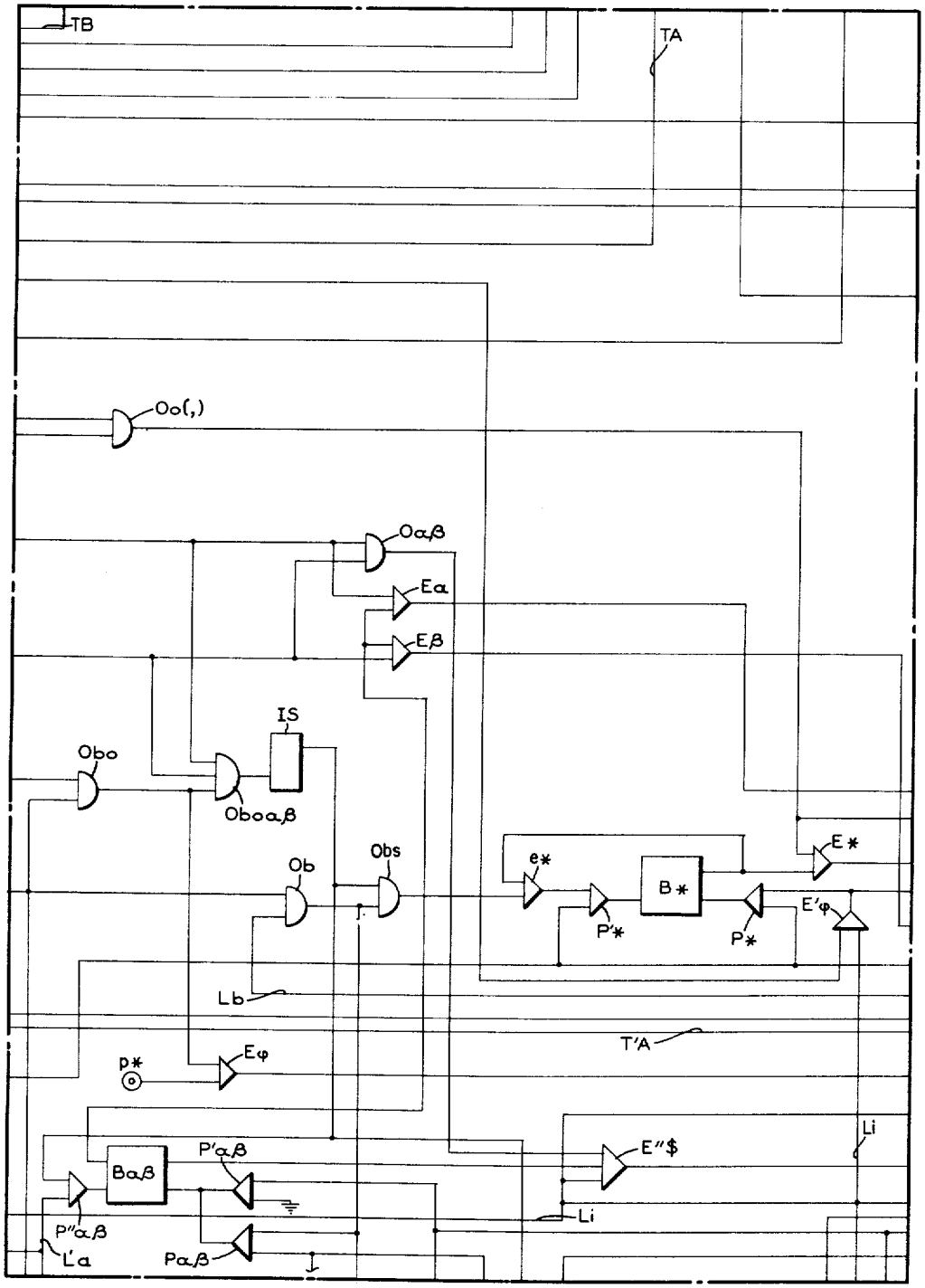
Figure 4M:
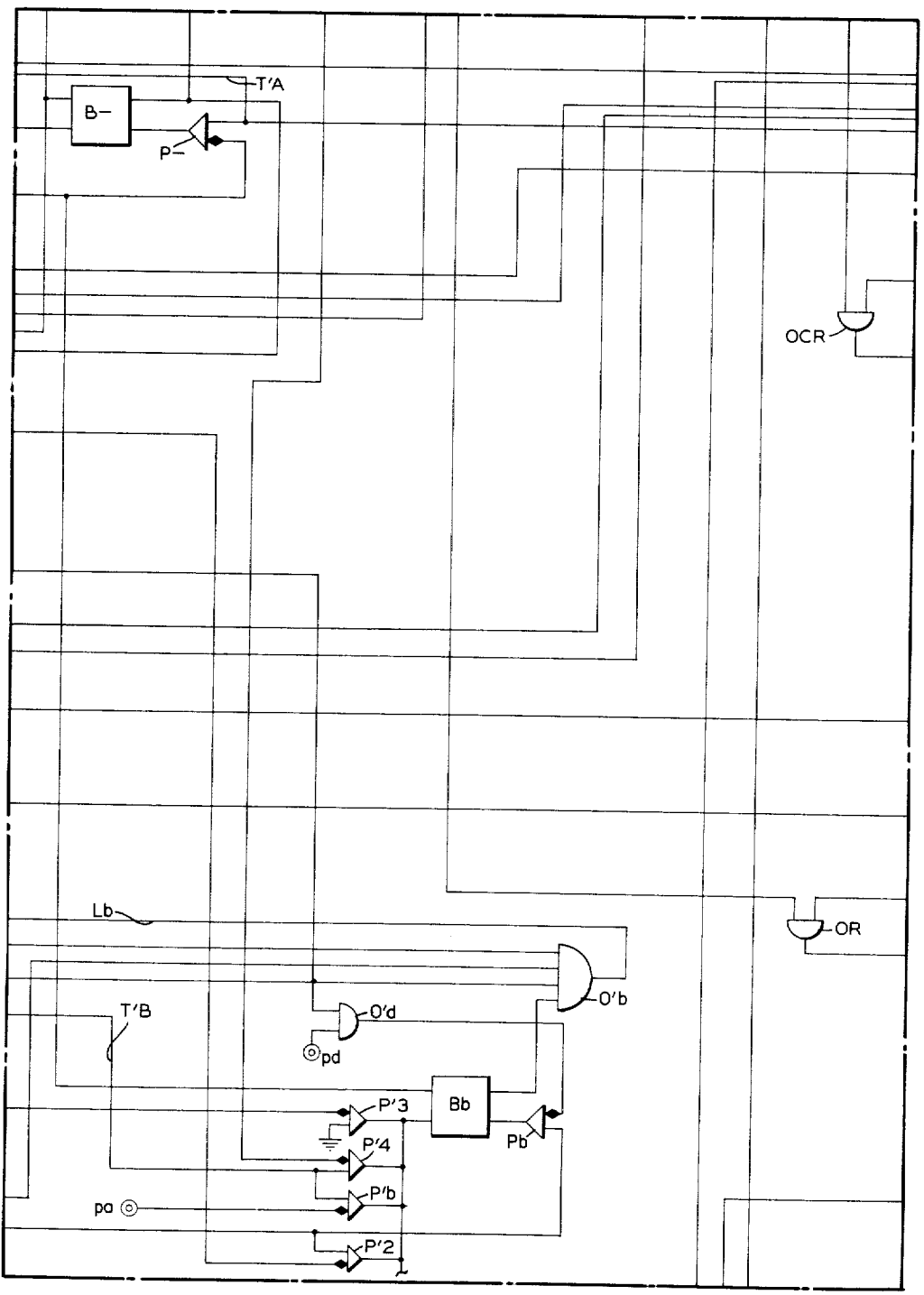
Figure 4P:
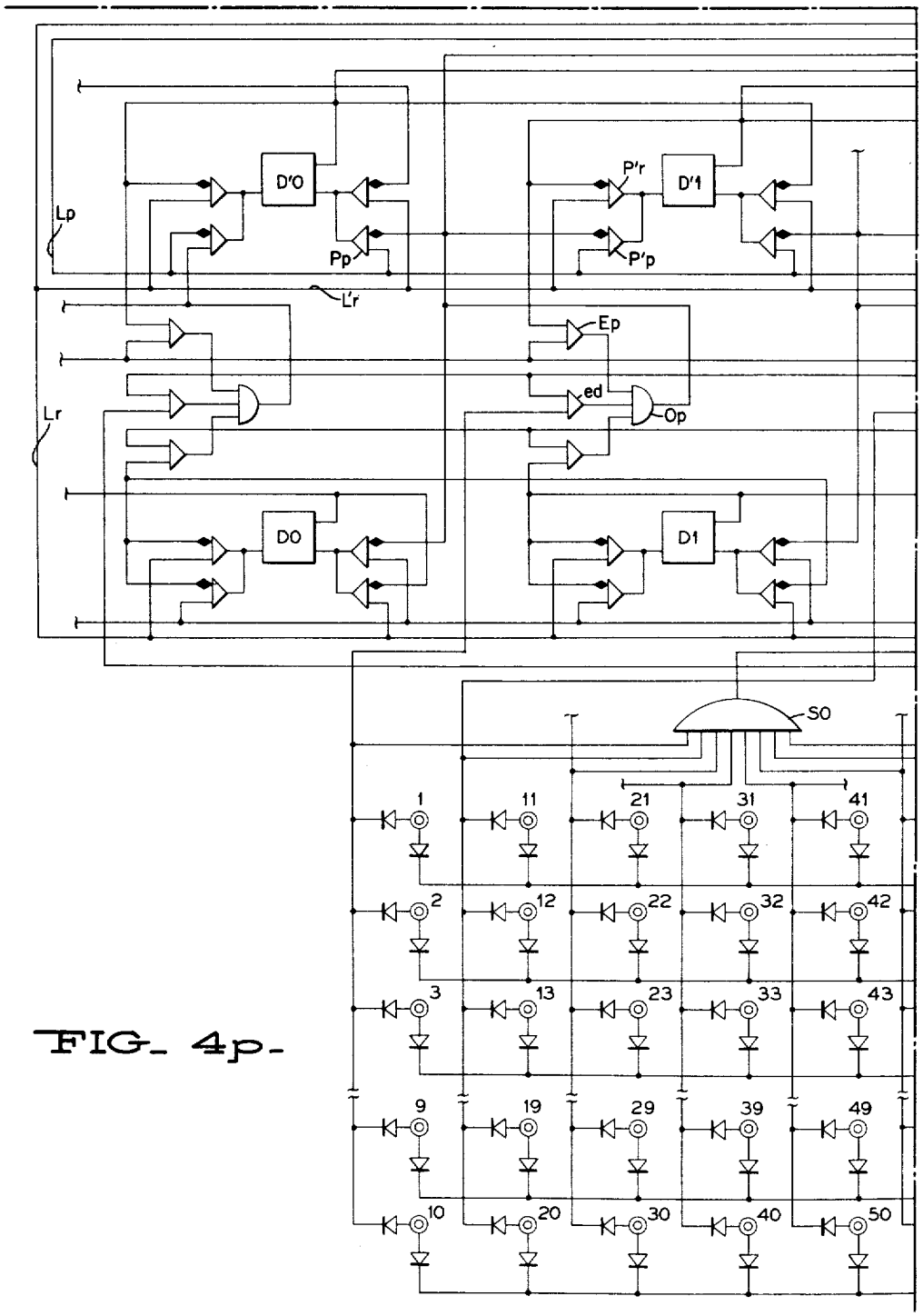
Figure 4Q:
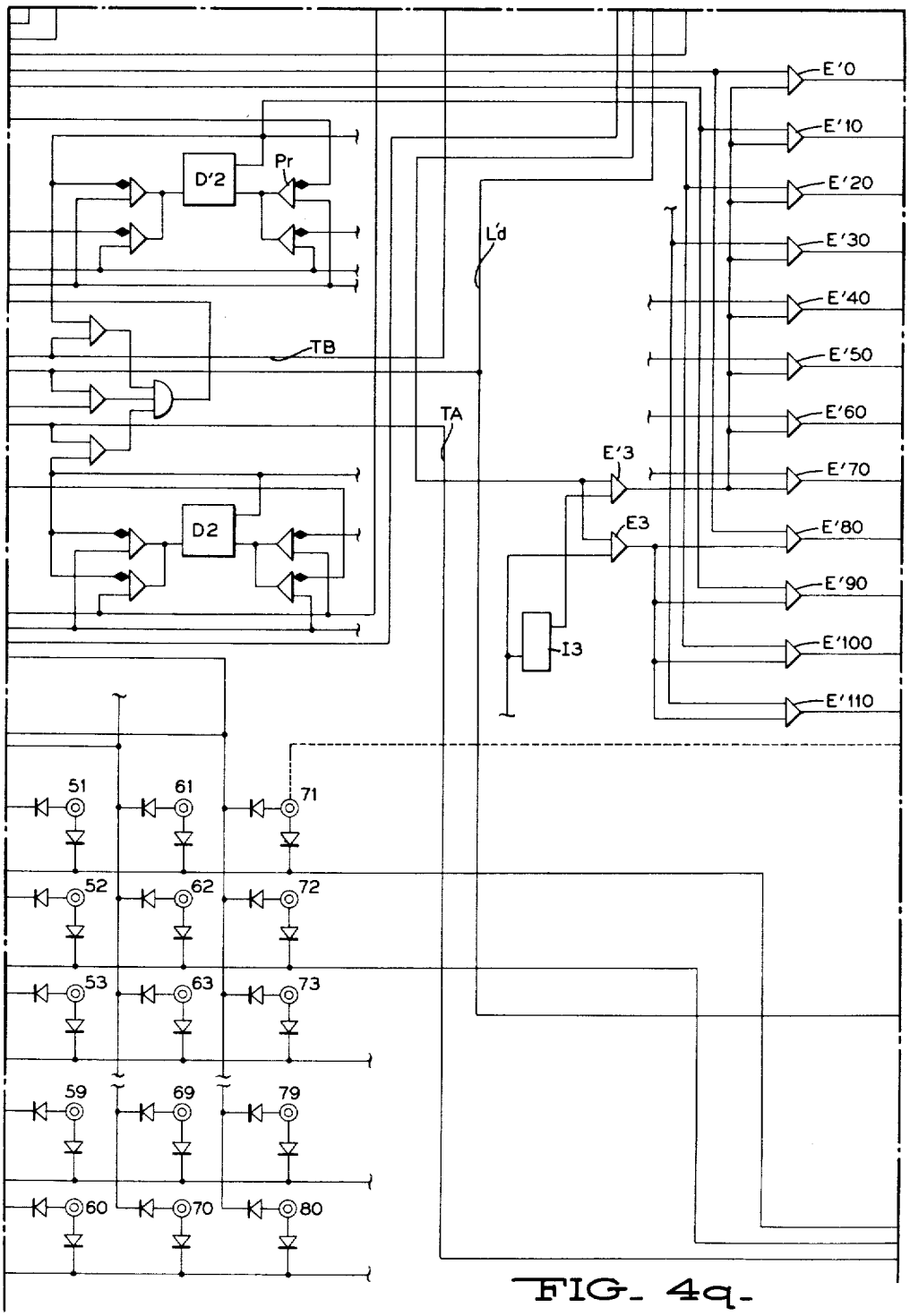
Figure 4S:
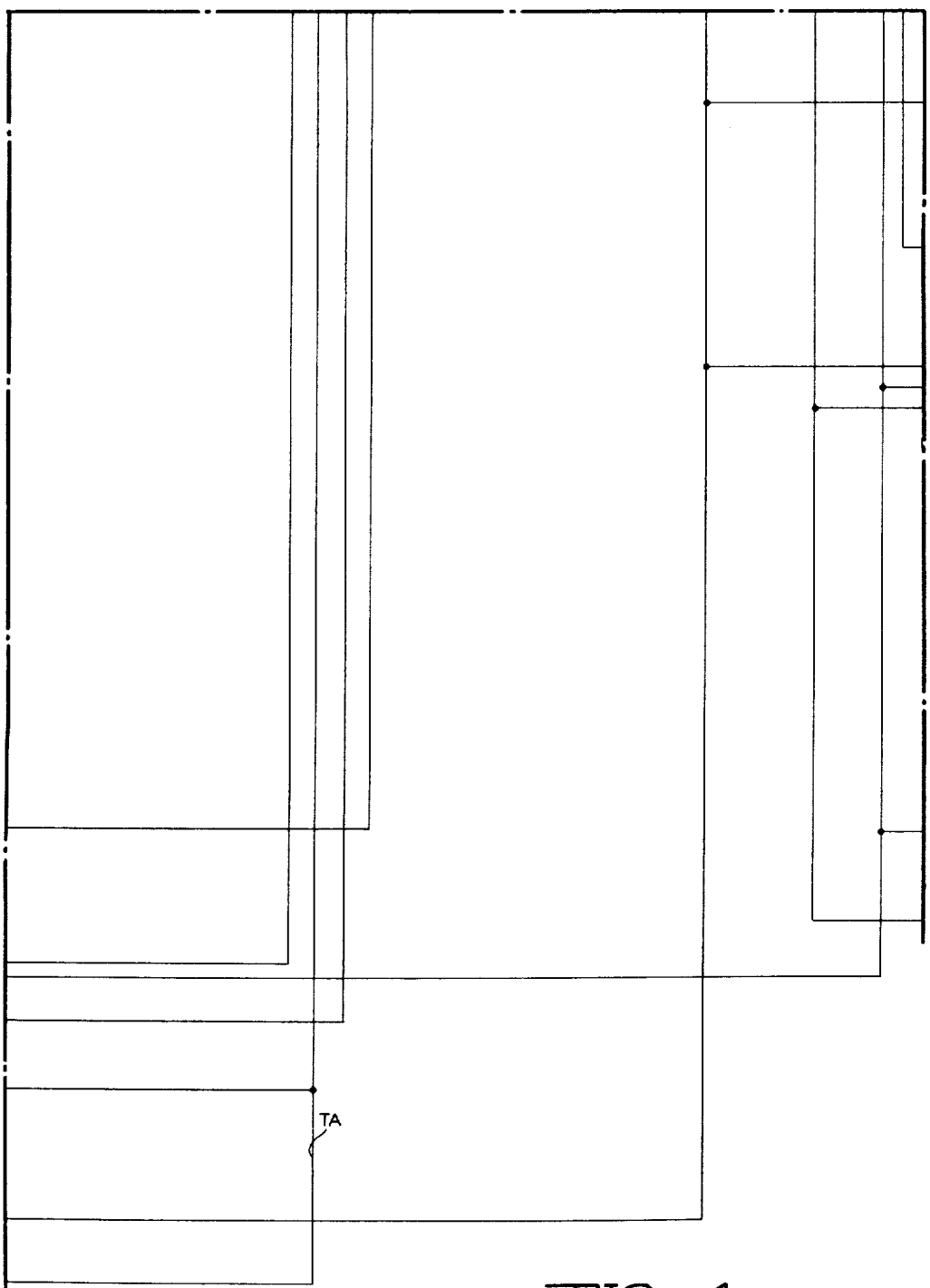
Figure 4U:
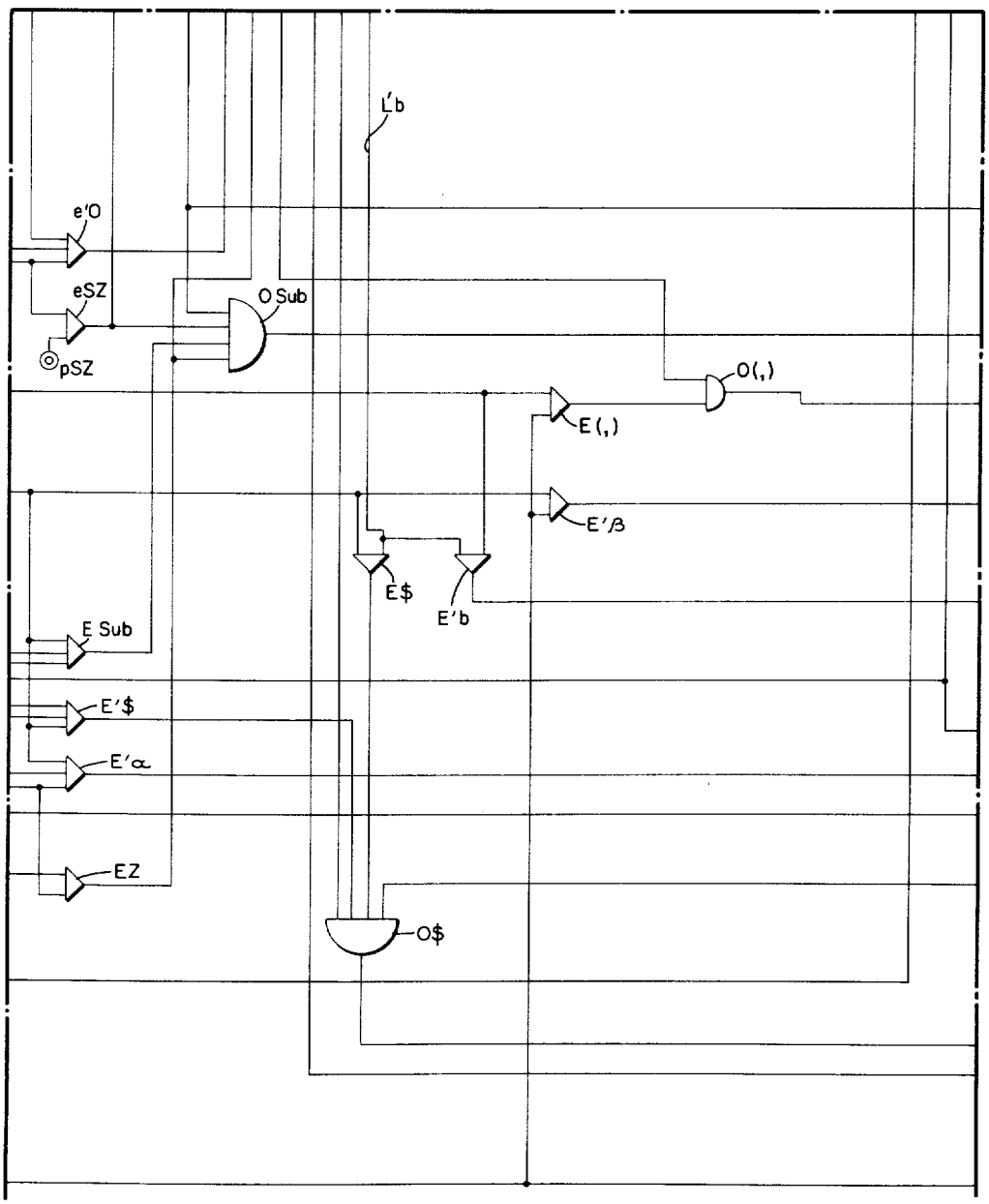
Figure 4V:
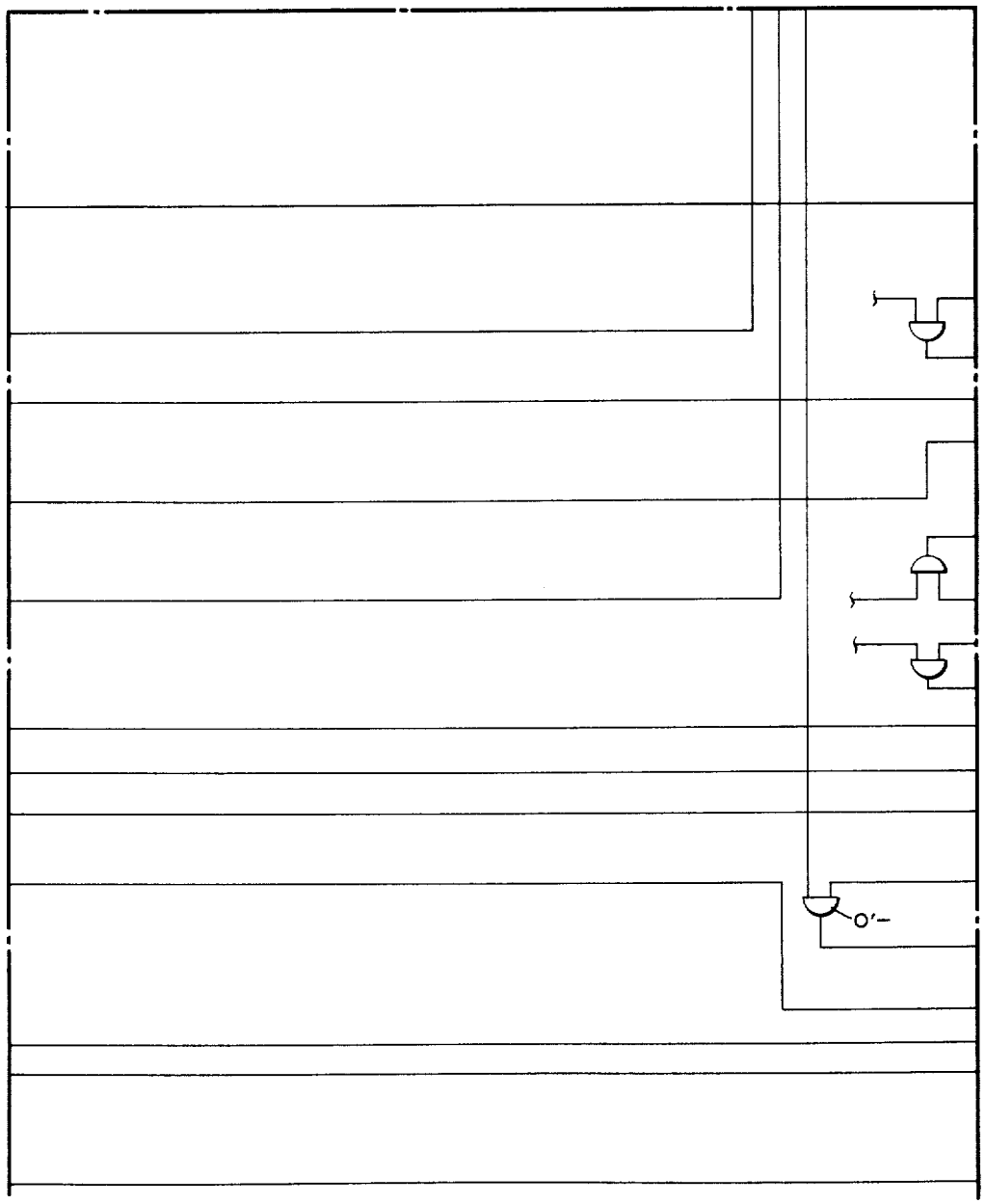
Figure 4W:
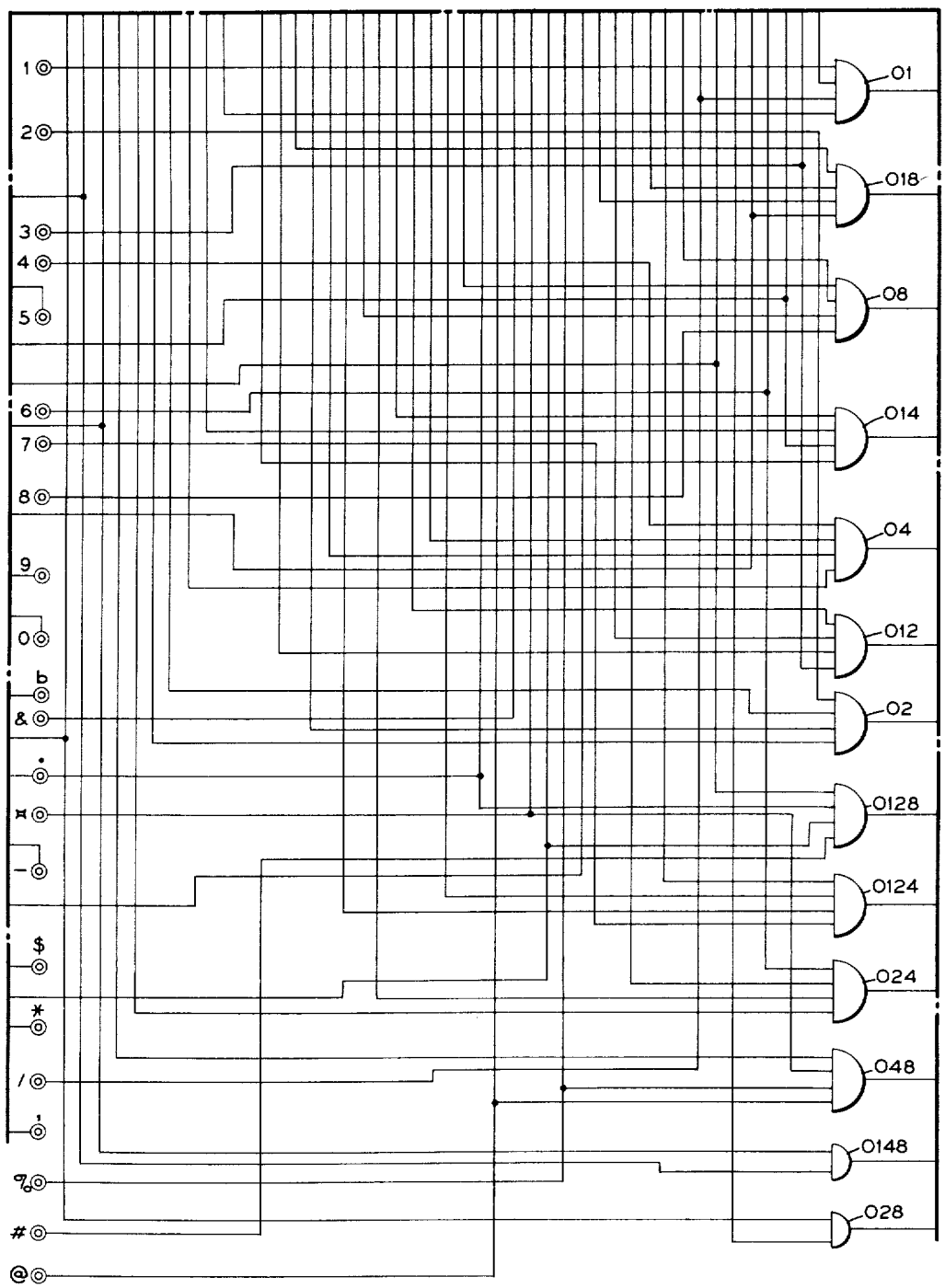
Figure 4X:
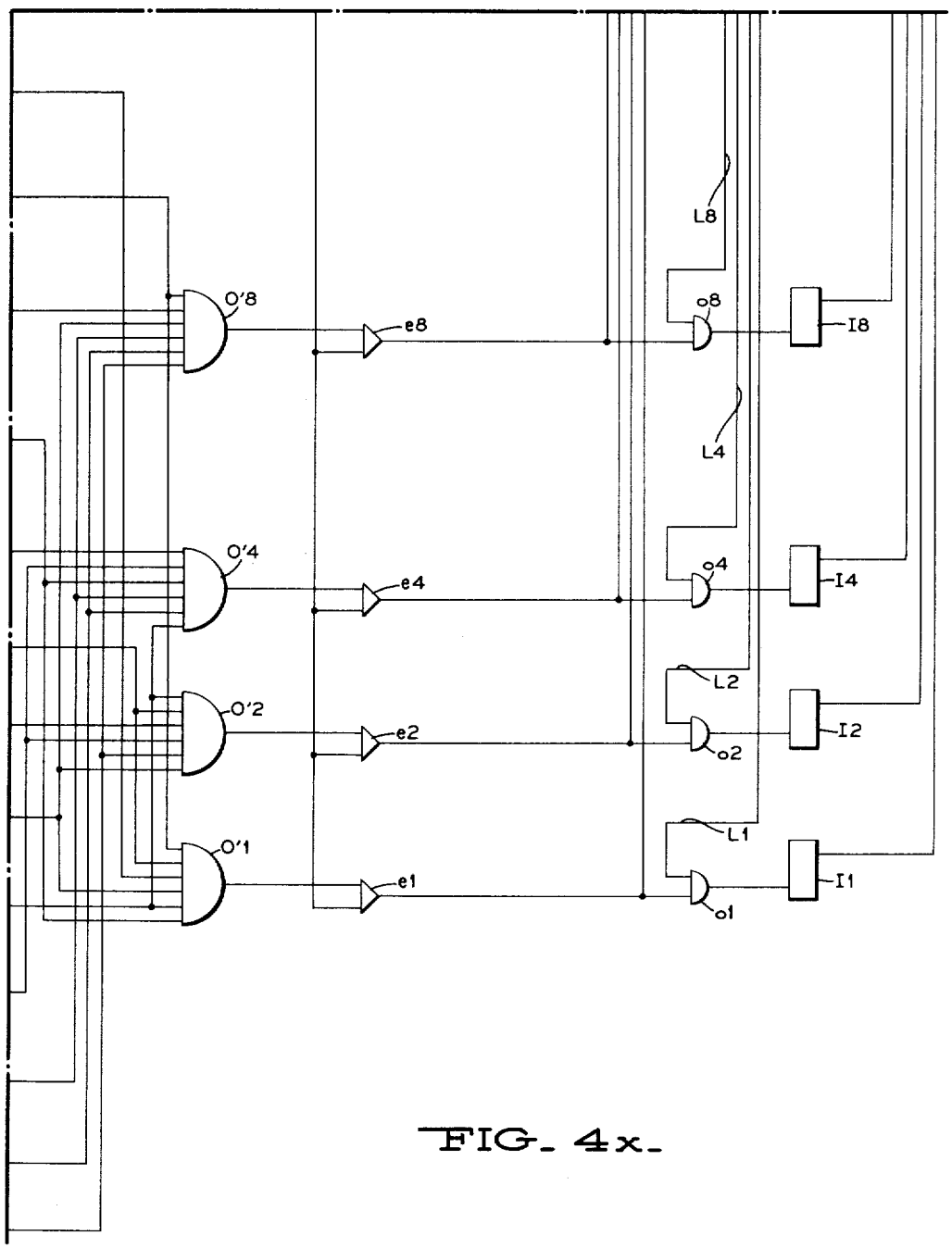

The elementary circuits, symbolically represented in FIGS. 4a through 4x, are explained in the following figures:

FIGS. 6 and 6a respectively show the symbol and the details of an example of a logical "AND" circuit.

FIGS. 7 and 7a respectively show the symbol and the details of an example of a logical "OR" circuit.

FIGS. 8 and 8a respectively show the symbol and the details of an example of a diode gate.

FIGS. 9 and 9a respectively show the symbol and details of an example of an inverter.

FIGS. 10 and 10a respectively show the symbol and details of a level setter.

FIGS. 11 and 11a respectively show the symbol and details of a two-input amplifier; FIG. 11b symbolically represents a one-input amplifier.

FIGS. 12 and 12a respectively show the symbol and details of a three-input trigger, one being binary; FIG. 12b symbocially represents a two-input trigger.

Figure 13:
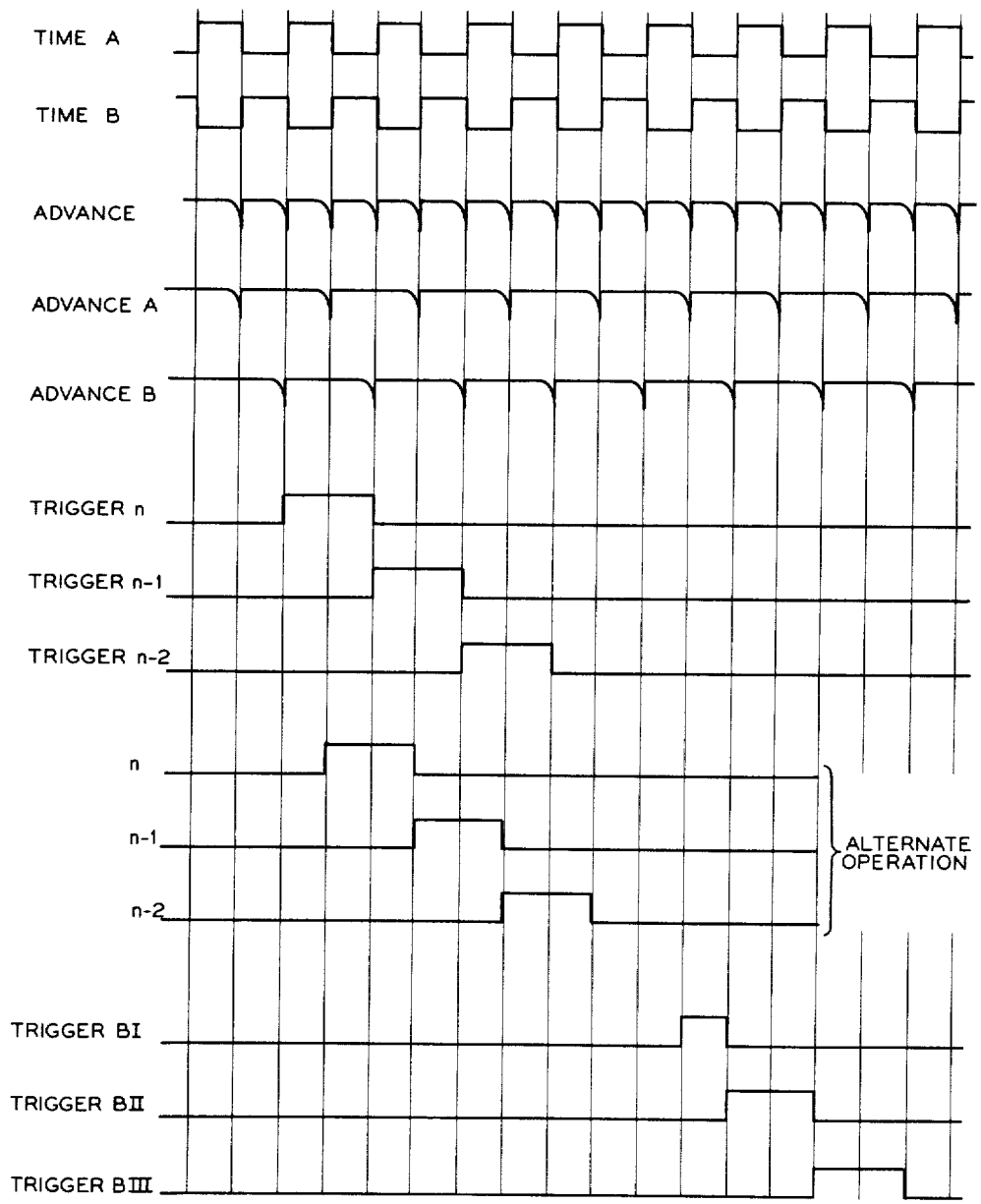

FIG. 13 shows a machine timing diagram.

GENERAL DESCRIPTION—INTRODUCTION

Figure 1:
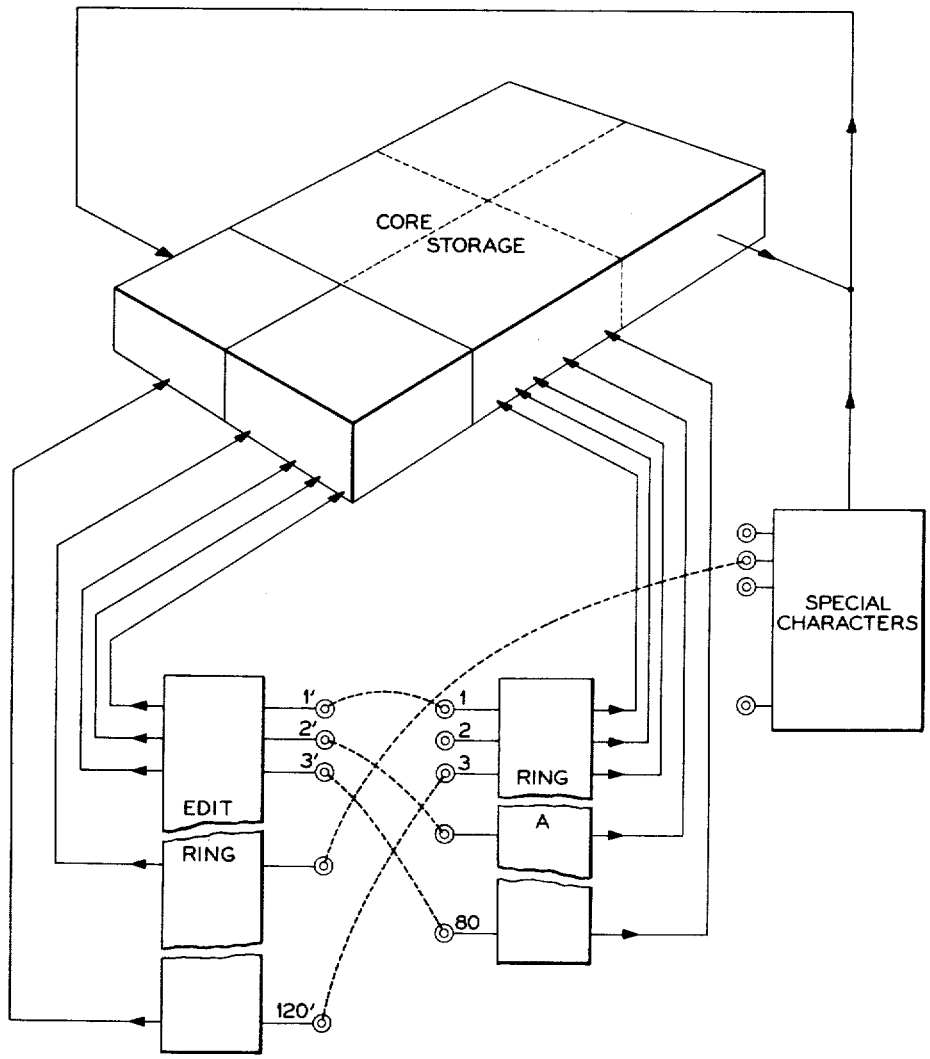

Referring first to FIG. 1, a general block diagram of editing apparatus for a data processing machine is shown. A core storage array is addressed by an edit ring and a second ring shown as Ring A. The edit ring sequentially addresses a fixed group of storage positions in the core storage array to enter data therein. Other positions of core storage are addressed by Ring A from which positions data are read out of core storage and entered back into core storage at the positions addressed by the edit ring. The edit ring has a plurality of exit hubs which are plug wired to control Ring A. Thus as the edit ring advances, Ring A is controlled to address selected positions of core storage.

The edit ring also controls a source of special characters such that the special characters may be inserted in core storage at the positions selected under control of the edit ring.

The edit ring first advances a complete cycle in one direction to transfer data and then advances a complete cycle in the opposite direction to retouch the data transferred.

Figure 2B:
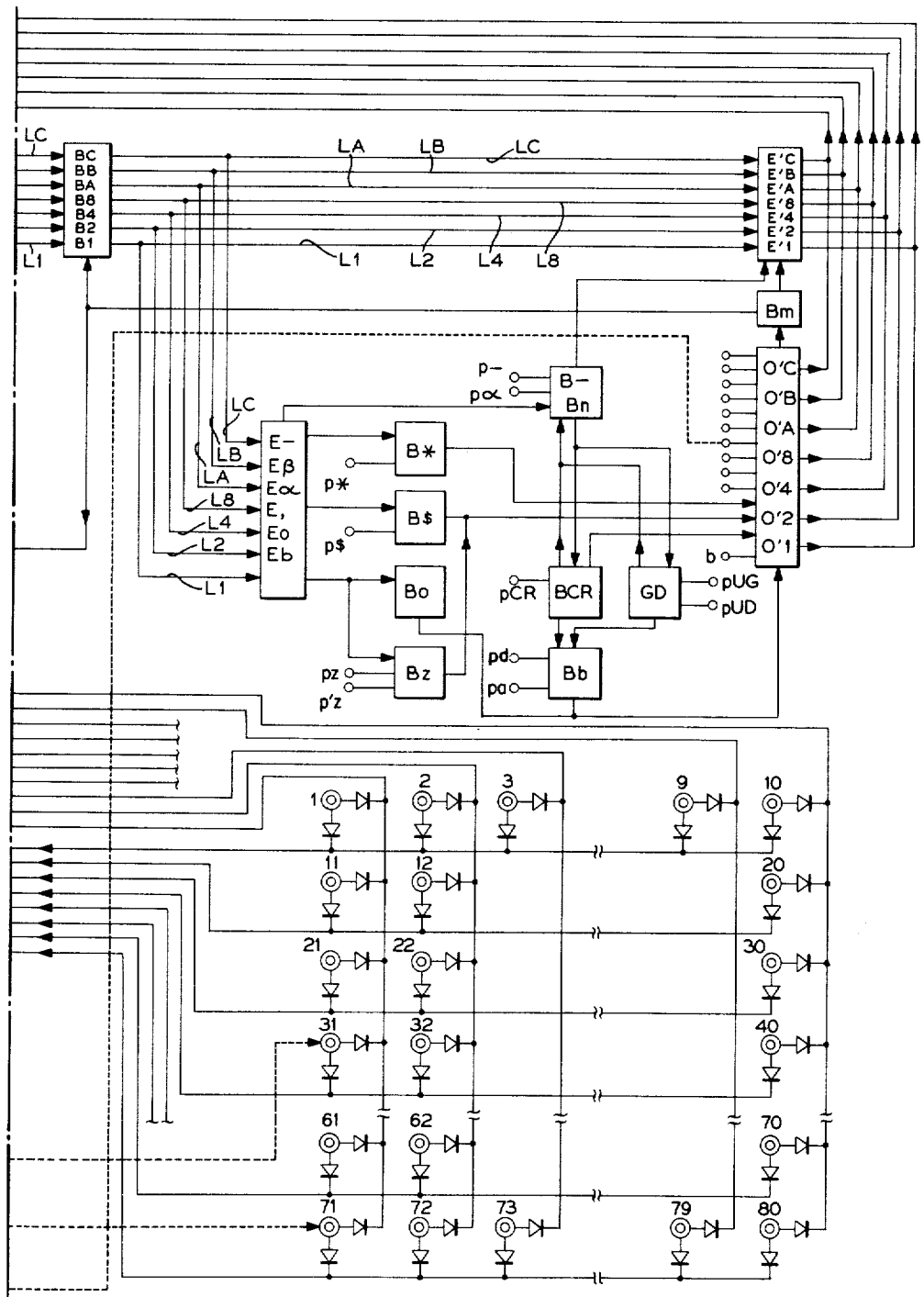
Figure 2C:
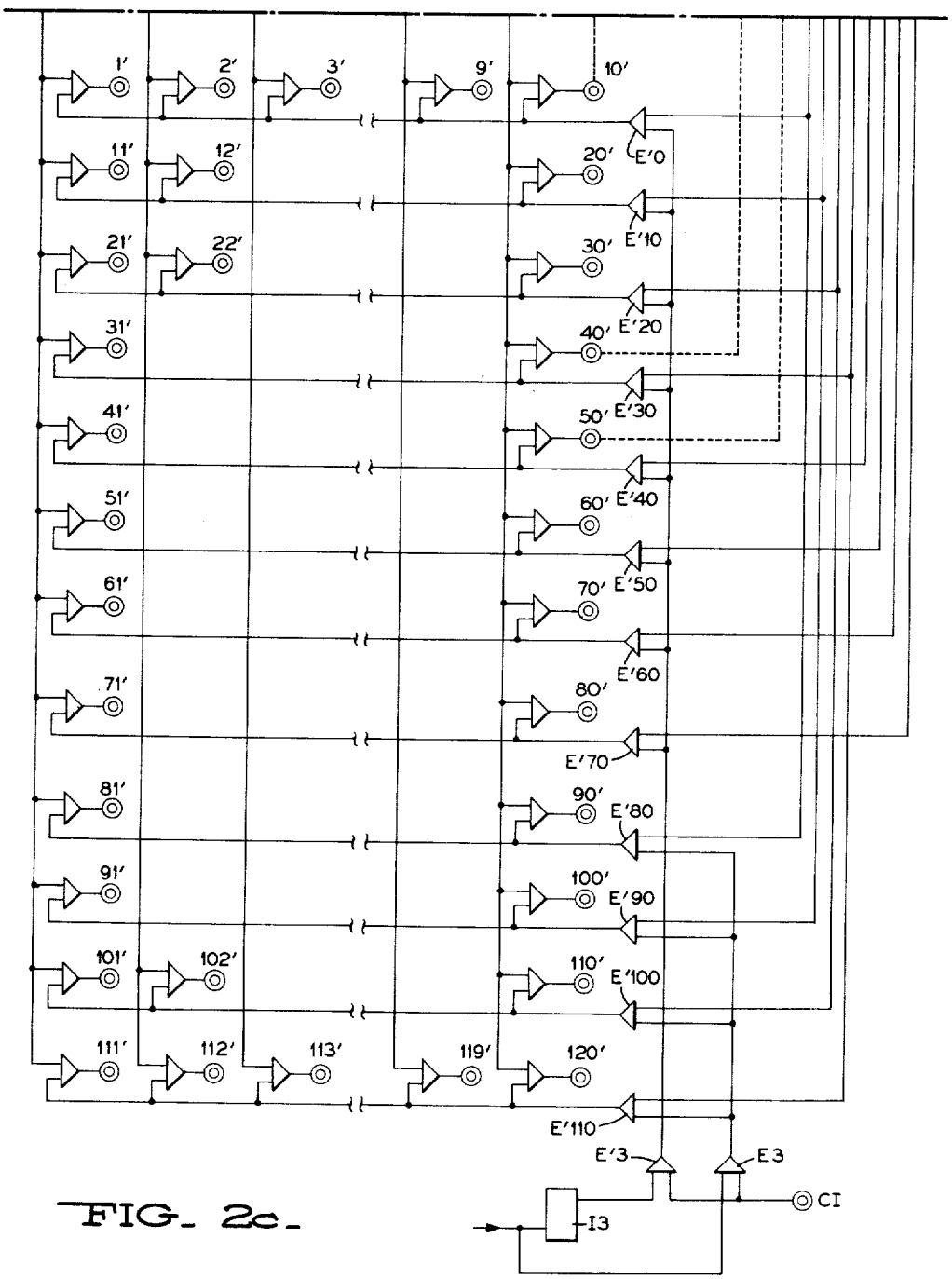

Referring next to FIGS. 2a through 2c the editing machine will be described functionally in more detail after which the construction and operation of the machine will be described in detail with reference to FIGS. 4a through 4x.

The present machine provides for the composition of an information line to be printed, punched, or in a general way reproduced according to any method. The composition of this information line is performed in a so-called output storage. The information which makes up the line is received from other storages of the machine, a computation operation, or input storage, etc., by a single transfer, but this information is not erased from the storage from which it proceeds; it is immediately regenerated in it, ready for a possible re-utilization. If the storage devices were constructed in such a way that the reading of the information did not erase or destroy it, it would have been unnecessary to re-record. In case the data to be transferred are not located together, the format of the line to be composed is established by a transfer together with a redistribution. The line composition may be completed with insertions or substitutions of information.

By way of example, the present machine constructs in the output storage the exact picture with all its details of what the operator intends to print, punch or reproduce according to any method. The printing, the punching or the reproduction of the line thus composed is performed in a single operation controlled by a single program. After the printing, for example, blanks are recorded in the output storage, i.e., the C bit which corresponds to a blank is recorded in all the positions of the output storage, and the output storage is then ready to receive the data of the following line.

The content of the output storage is composed during a first direct scanning, during which substitutions, insertions and transfers with or without arrangement may be performed, then retouched during a second scanning in the opposite direction during which only substitutions may take place.

The information line is composed in series, the insertions as well as the rearrangements are performed position by position during a single program controlled electronically through removable connections on the control panel.

The storages are preferably of the low access time type; and, for example, they are shown as made up of a magnetic core array of three dimensions. The magnetic cores may occupy two stable magnetic states marked 0 and 1. The information is recorded in the storages in the form of a seven element code, 1, 2, 4, 8, A, B, C.

According to this code, bits 1, 2, 4, 8 are the binary representation of digits 0 to 9; their combination with information elements A and B are used to represent the non-numerical characters and element C is used to check the parity (the number of information elements used to represent any datum being odd).

The magnetic cores may be assembled in any manner, for example in various storage groups; each one of these groups being composed of 80 distinct positions, and each position capable of storing any of the characters. To each position correspond 7 magnetic cores, so that a group, including for example 80 positions would be made up of 80×7 or 560 magnetic cores. Each one of the seven cores corresponds to one of the seven bits 1, 2, 4, 8, A, B, and C. The complete machine could, for instance, include 5 storage groups, and the part reserved for the output storage could comprise one, one and a half or two groups, i.e., it would allow the composition of a line of 80, 120 or 160 characters. According to the example shown in FIG. 2a, the storage is made up of groups M1, M2, M3, M4, M5 and M6. For example, each one of blocks M3 and M6 may include 40 positions, the others including twice as many. So that, according to this example the storage as a whole would comprise 400 positions arranged in a square of 20 by 20.

If the output storage is made up of groups M2 and M3, the composed line would thus include 120 characters.

All the positions of a storage group may be determined by two scanning devices: readout (A) and read-in (B), distributing distinct pulses A and B to scan respectively two areas A and B of the storage. Both areas A and B may be in the same group or in two distinct groups. Each one of these pulse distributing devices A and B may be made up of chain comprising a certain number of trigger stages (80, for example), as shown in our copending application Serial No. 643,369, filed March 1, 1957, or of the combination of two chains, one including $m$ triggers marked as units (for example, $m=10$ from 1 to 10) and the other including $n$ triggers marked as tens (for example, $n=8$ from 0 to 7) their combination allowing also to define 80 stages. According to the first example, each trigger stage is associated with the 7 magnetic cores of a position of the storage, and consequently determines the 7 information elements of the datum recorded in said position of the storage. When the trigger of a stage is "on," a datum may be either read or recorded into the 7 magnetic cores of the corresponding storage position. According to the second example, the combination of a tens trigger and of a unit trigger take the same part in determining a position of the storage. This example is shown in FIG. 2a; the triggers are marked U1, U2, U3, U4, U5, U6, U7, U8, U9 and U10 in the units chain of device A and U'1, U'2, U'3, U'4, U'5, U'6, U'7, U'8, U'9 and U'10 in the units chain of device B; D0, D1, D2, D3, D4, D5, D6 and D7 in the tens chain of device A and D'0, D'1, D'2, D'3, D'4, D'5, D'6 and D'7 in the tens chain of device B. The "on" state of triggers U4 and D6, for example, allows, during time A, the selection of position 64 of the storage; it is then possible to read or to record in it the 7 information elements of a datum.

The scanning chains thus mark the positions of a storage group. The choice of the storage group is selected through two so-called group selection chains including as many triggers as there are groups. Such chains are shown and described in our copending application (Docket 5588). The group selection chains are not shown in the figures.

For each one of the scanning chains, all the stages are "off" except one which is "on"; an advance pulse resets this stage and starts the following stage. Once the chain has started, its progression is automatic; it thus scans an area of the storage. Both devices A and B are interdependent. In its turn, each one of them progresses one stage to read or to record alternatively the 7 information elements making up a digit or a letter of a number, or a word of an A area, the elements of another digit (or letter) of the number or word of the B area, then those of the following digit (or letter) of A, and those of the following digit (or letter) of B, and so on.

Due to the difference in time of the advance pulses of pulse distributing devices A and B, their combination scans respectively two storage areas position by position, and thus allows the reading, one by one, of the data recorded in a determined area A and to record them in a second area B, to thus transfer the information from area A to area B.

The successive progression of both scanning devices A and B determines two times of operation, readout or A, and read-in or B. These two times overlap so that while a scanning chain is determining an address of the storage, the other chain progresses one stage and vice-versa.

Each one of these times A and B is subdivised into a certain number of elementary times for the reset, reading, checking, recording, etc. After the reading and recording in the storage position corresponding to the "on" stage of scanning device A, the reading and recording in the position corresponding to the "on" stage of device B takes place.

Each one of the 80 positions of a storage group corresponds to an input terminal common to both scanning devices A and B. These 80 terminals are marked 1, 2, 3, 4, . . . 79, 80; in FIG. 2b. One of these terminals, either in device A or in device B, puts the triggers of the stage on from which it is desired that the device starts. Hence, said terminal allows the reading and recording from the position corresponding to this stage. For example, a pulse arriving on terminal 31, allows the switching of the tens triggers D3 and D'3 of scanning chains A and B, and the switching of units triggers U1 and U'1. Let us assume that this starting pulse appears during a time A; only triggers D3 and U1 of both scanning chains A will switch on. The coincidence of on state of D3 and U1 determines position 31 of the selected storage group.

In the position determined by scanning device A, the 7 information storage elements read out of during the portion of time A reserved for reading are stored in a 7 trigger register B1, B2, B4, B8, BA, BB and BC which switch on or stay off according to whether the magnetic cores in the respective positions were in saturation state 1 or 0. The reading of the information contained in the cores occurs simultaneously with its erasing, and those of the 7 cores of the position read by scanning device A, which were in state 1, switch to saturation state 0, the others remaining in state 0. While scanning device A always determines the same address in the storage during the recording time, the information received at the output terminals of the 7 trigger register is regenerated in the same position of the storage over lines L1, L2, L4, L8, LA, LB and LC, of the regenerating device E'1, E'2, E'4, E'8, E'A, E'B and E'C under control of recording pulse generators G1, G2, G4, G8, GA, GB and GC. The trigger register is not reset, but retains the information read in time A during the following time B. Scanning device B determines a new position of the storage; the reading of the information elements stored in this position occurs simultaneously with their erasing, but they are not recorded in the trigger register. On the other hand by following the same way as previous, from lines L1, L2, L4, L8, LA, LB and LC to generators G1, G2, G4, G8, GA, GB and GC, the information which was contained in register B1, B2, B4, B8, BA, BB and BC is transferred in this new position during the portion of time B reserved for the recording. Then, the 7 triggers of the register are reset and the operation resumes, thus allowing the transfer of the information from the successive positions of an A storage area to the positions of another B area, while retaining it in the first area. The information transfer from one area to another may be according to our copending application (Docket 5588).

The B storage area covers all the positions of the line to be composed; it makes up the output storage; the information which is accumulated in it is the picture of the line to be reproduced and controls the output, printing, punching, etc. device.

According to the example shown in FIGURES 2a, 2b and 2c, the line to be edited comprises 120 characters (a blank being considered as a character). Therefore, it is necessary to gather the whole information within two groups of memories, one having 80 positions and the other 40 positions; for clearness sake, let it be assumed that the groups M2 and M3 make up the output memory. The accumulation of the 120 character information bits is performed serially, that is successively one character after the other; therefore device B is to scan in turn all the 120 positions of the output memory. The scanning device successively produces 120 pulses permitting to determine the 120 corresponding positions of the output memory. Such synchronism between the emitted pulse and the position reached is used to control the editing of a line, as will be explained further. Such pulses are available at output terminals referred as 1', 2', 3', . . . 119' and 120'. Some such terminals have been represented in FIGURE 2c. For example, the signal from the tens trigger D'6 is combined with the signal from unit trigger U'1 to produce output pulse 61 from scanning device B and to appear at the pulse emitting terminal indicated as 61' synchronously with the scanning of location 61 in memory group M2. The 40 pulses corresponding to the 40 locations of memory group M3 are available at terminals 81' to 120' the latter can emit pulses but if the logical "AND" circuits, designated by E'80, E'90, E'100 and E'110, have one input favored by the output signal from logical "AND" circuit E3. Such signal exists but if the controlled program is a print edit operation (terminal CI being energized) and if a pulse indicating that the data are to be stored in memory group M3 occurs simultaneously at the input of inverter I3. When there is no pulse at the input of inverter I3, there is a signal at the output of I3 which manifests that the 80 locations of memory group M2 are being scanned, and this signal favors logical "AND" circuit E'3 which in turn favors logical "AND" circuits E'0, E'10, E'20, E'30, E'40, E'50, E'60 and E'70 which favors the 80 logical "AND" circuits associated with the 80 emitting terminals 1' to 80'. These 120 terminals emit pulses but if the cabled program comprises an editing operation, the print edit terminal designated by CI is energized which favors either the 80 logical "AND" circuits associated with the 80 output terminals 1' to 80', or the 40 circuits associated to terminals 81' to 120'.

During each operation time B, the information transfer from register B1, B2, B4, B8, BA, BB, BC to the output memory position defined by the scanning device B is performed while remaining under the control of the plugboard and more precisely under the control of the series of 120 pulses emitted by scanning device B at the output terminals L' to 120'. These pulses redistribute the information coming from the working memory according to any order, or to effect any print edit operation: inserting one or more characters, such as floating dollar, check protection asterisk, blank, zeros suppress, maintaining zeros, offset or CR insertion according to the sign.

To control a redistribution of the information it is sufficient to connect one of the 120 output terminals of scanning device B with one input terminal. For example, let it be assumed that the connection shown in dotted lines in FIGURES 2a, 2b and 2c is realized between the emitting terminal 40' and the receiving terminal 71. The transfer of the information will normally be effected until the scanning device B senses position 40 of the output memory, i.e., triggers D'3 and U'10 are "on." At that moment, the pulse emitted from terminal 40' is applied through the flexible connection to terminal 71, runs through logical "OR" circuit SO to energize the skipping device SD which stops the scanning chains A in the storage position reached and restarts them from position 71, that is, triggers D7 and U1 are switched "on." This skip of the scanning chains A, under the control of scanning chains B redistributes the transferred information according to any predetermined order. In case it would be desired, this skipping may be simultaneous with a change of memory group, i.e., if, after transferring the information coming from some positions of a memory group, the operator desires to transfer the information coming from another group, the same pulse produced by the scanning device B simultaneously controls chains A restarting from the stage corresponding to the new desired position, and at the same time controls the change from one memory group to the other. This double control may be effected through a circuit C12 having one input and two outputs, such as that shown in FIGURE 2a. According to the represented example, an input of this circuit C12 is connected to the emitting terminal 10' and receives a signal when the chains B sense position 10; a first output signal is applied to the receiving terminal 31 and permits chains A to restart from stage D3 and U1 while a second output signal from circuit C12 control the change of memory groups. Such control may be as shown in our above-mentioned copending application (Docket 5588).

It is obvious that such circuits could be generalized and that the number of output signals could be increased. One might utilize for example such a circuit as an input signal produces 3 or more output signals if it is desired to control a sign detection for instance, or any other machine function, besides chains A skip and memory groups change.

The 120 output terminals of scanning device B emit pulses controlling the various functions of the editing machine. For example, let it be assumed that the operator wants to insert letter Z in position 50 of the line being edited; it will be sufficient to connect terminal 50' to terminal Z of the inserting device O'1, O'2, O'4, O'8, O'A, O'B and O'C. This connection is shown in dotted lines in FIGS. 2a, 2b and 2c. When scanning device B senses position 50, triggers D'4 and U'10 are switched "on"; a pulse appears at terminal 50' and is applied to terminal Z of the inserting device. The latter translates letter Z according to the seven bit code (thus code corresponding to letter Z is 1, 8 and A) and by means of pulse generators G1, G2, G4, G8, GA, GB and GC records such bits into the memory position 50 determined by scanning chains B. Further, such inserting device enables the following by means of hold trigger B$m$:

(1) To stop the information transfer from area A to area B, because hold trigger B$m$ prevents the regeneration device E'1, E'2, E'4, E'8, E'A, E'B and E'C from being favored and this switches off the transfer circuit.

(2) Trigger B$m$ is effective in preventing register triggers B1, B2, B4, B8, BA, BB and BC from being reset, thus the information which is to be kept and recorded in the position following that where character Z has been recorded, is not erased from the register.

(3) Trigger B$m$ stops the advance of the scanning chains A.

Hold trigger B$m$ fulfills these three functions whatever may be the character to be inserted and as long as there are characters to be inserted.

The inserting device O'1, O'2, O'4, O'8, O'A, O'B and O'C permits the insertion of all letters, digits or special character, such as: % . & , /.

The position wherein an insertion is taking place may be chosen at random. It may also be automatically determined in accordance with the quantity to be registered, for example when it is desired to insert the floating dollar, the character $ is to be inserted into the next position to the left of the high order significant digit of the quantity.

The insertion of a character may be conditional or not; it is conditional for instance when character — is only to be inserted if the quantity to be printed is negative; if the quantity is positive, a blank is to be recorded instead.

The machine comprises special code detecting devices E$b$, E$o$, E(,), E$\alpha$, E$\beta$, E—, . . . which, connected to the output of triggers B1, B2, B4, B8, BA, BB and BC of the register, are operative in detecting the existence of bits corresponding to a blank, a zero, a comma, $\alpha$, $\beta$, a minus (—). Besides it comprises a sign detecting device called B— B$n$. On the plugboard, terminal $p$— may be connected to one or more of the 120 output terminals of the scanning device B. When the corresponding position in the output memory is reached, the pulse emitted by said terminal is applied to $p$— and starts a sign detecting operation, i.e., that the sign of the quantity is registered in trigger B—. Further, via regeneration device E'A, E'B and E'C, trigger B$n$ erases bits A and B that could cause an error to be made by translating a number as a letter and corrects bit C according to the parity of the number of bits that might have been changed when bits A and B were suppressed. The operation of B$n$, that is, the numerical interpretation of all the data is carried on until a position is reached whose corresponding emitting terminal is connected to $p\alpha$. From this position the numerical interpretation is interrupted and the alpha-numerical interpretation is resumed.

The check protection asterisk inserting device B* and floating dollar inserting device B$ are controlled by terminals $p$* and $p$$, respectively, which receive the pulses emitted by the 120 terminals of the scanning device B.

The zero suppress device B$o$ erases zeros placed left of the first significant digit, and is controlled by the code detecting device, and more specifically by the zero detecting circuit E$o$, the comma detecting device E(,), and the blank detecting device E$b$. The B$o$ device is automatic, i.e., it works for all 120 positions of the output memory and therefore on the plugboard no input terminal corresponds to this device since it is useless to connect it to any of the emitting terminals. During the reverse scanning it allows the substitution of blanks for all zeros and commas on the left of the first significant digit.

The zero print device BZ allows zeros to be retained and recorded in the output memory between two positions according to the operator choice. The output terminals of scanning device B corresponding to these two positions must be connected in the plugboard with terminal $pZ$ and $p'Z$. Such device replaces bits 2, 8 and C which represent a zero by bit A, which represents a significant zero.

A blank inserting device B$b$ allows the insertion of a blank in a given position or a series of adjacent blanks between two given positions, or blanks under the control of other devices. The insertion of a single blank is controlled by means of terminal $b$, as was the insertion of other special characters. Inserting a series of blanks is controlled by means of two terminals $pd$ and $pa$ which are available on the plugboard and may receive pulses emitted by the output terminals of the scanning device B so as to determine the start and stop positions between which these blanks are to be inserted. Blank insertion is effected with priority on any other insertion.

The CR inserting device (CR being the first letters of the word "Credit") designated by BCR controls, through circuits O'1, O'2, O'4, O'8, O'A, O'B and O'C, the insertion of CR into the next position to the right or to the left of a quantity if said quantity is negative, and it controls the insertion of blanks instead of letters CR if such quantity is positive. In a similar way, the offset device called GD allows the printing of positive quantities in a number of positions while the negative quantities are printed to the right to these positions so as to align quantities having same sign; if the quantity is positive, blanks are to be inserted in the positions assigned to the negative quantities, and conversely. Thus, the blank inserting device B$b$ may be controlled by the devices BCR or GD wherewith it is connected. Besides insertion of CR and offset depending on the sign of the quantity, devices BCR and GD are related to the sign detecting device B— to initiate the recording of the sign; then in turn, B— controls the insertion of CR or of blanks and a right or left offset.

All the functions briefly mentioned through this chapter will be further described in special chapters. Only the general principles of the machine operation has been described with reference to FIGS. 2$a$, 2$b$ and 2$c$; the description of the various machine devices will be described with reference to the detailed FIGS. 4$a$ through 4$x$, wherein, for clearness sake, the same organs will be designated by the same references as in FIGS. 2$a$, 2$b$ and 2$c$.

The characteristics of all the basic elements of the machine: control, scanning, synchronization signal generators, arrangement of scanning chains, storage component circuits, storage field definition have been described with more details in copending applications: Serial No. 643,369, Filed March 1, 1957 (chains); Docket 5544 (input); Docket 5588 (field definition). It will be advisable to refer thereto for a better understanding of the explanation below.

INFORMATION TRANSFER

The basic print or punch editing operation is the transfer of a datum recorded in a given storage A field into a B field of the output storage. These fields A and B are defined through scanning devices A and B according to the method described in the copending application (Docket 5588). Let us assume that field A extends from start position $d$ to stop position $a$ and that field B extend from $d'$ to $a'$. Scanning devices A and B start respectively at the stages of the triggers corresponding to positions $d$ and $d'$, i.e., in chains A and B, the "tens" triggers and the "unit" triggers, which define positions $d$ and $d'$ switch "on." The output signals of said triggers allow, during the reading, the generation of a magnetic field $$-\frac{H}{2}-\frac{H}{2}=-H$$

in the seven cores of position $d$; said field produces a read signal on lines L'1, L'2, L'4, L'8, L'A, L'B and L'C (FIG. 4$i$) corresponding to the cores which occupied saturation state 1 and bring said cores back to state 0. During the recording, these triggers allow the generation in these 7 cores of a magnetic field $$+\frac{H}{2}+\frac{H}{2}=H$$

which switches to saturation state 1 the cores in which an inhibiting magnetic field $$-\frac{H}{2}$$

is not produced. During time A, the reset pulse applied to the left inputs of triggers B1, B2, B4, B8, BA, BB and BC (FIG. 4$j$) of the register switch them "off." Then a read pulse goes through the windings of the 7 magnetic cores of position $d$. The information read in these cores appear on the 7 lines L'1, L'2, L'4, L'8, L'A, L'B and L'C; the existence or the absence of signal on these lines corresponds to saturation state 1 or 0 of the 7 cores. The read signals go through logical "AND" circuits E1, E2, E4, E8, EA, EB, EC (FIG. 4$i$) (the second input of which is favored, during time A, by a signal from logical "OR" circuit OL (FIG. 4$b$), read amplifiers A1, A2, A4, A8, AA, AB and AC, and are applied to the right input of triggers B1, B2, B4, B8, BA, BB and BC (FIG. 4$j$). These 7 triggers make up the register where is kept the information read out of position $d$ of the storage; the signal appearing on the right outputs of the 7 trigger register makes up the picture of the information which has just been read.

In order to avoid losing this information, which may be reused, it is regenerated in the same position $d$ of the storage. For this, through lines L1, L2, L4, L8, LA, LB and LC, the right outputs of the register's triggers are connected to logical "AND" circuits E′1, E′2, E′4, E′8, E′A, E′B and E′C (FIG. 4g). The second input of these "AND" circuits is favored during time A by a signal from logical "OR" circuit O′I then from logical "AND" circuit $eI$. The signals from the register consequently go through logical "AND" circuits E′1, E′2, E′4, E′8, E′A, E′B and E′C, then logical "OR" circuits O1, O2, O4, O8, OA, OB and OC (FIGS. 4o and 4x), and are applied to the inputs of inverters I1, I2, I4, I8, IA, IB and IC. For each of information elements 1, 2, 4, 8, A, B, C to be recorded, there is signal at the input of the corresponding inverter, hence no output signal. The output signals of said inverters are applied to inhibition current pulse generators or inhibition core drivers G1, G2, G4, G8, GA, GB and GC (FIG. 4i) which respectively generate, in the windings of all the magnetic cores of the storage located on corresponding line 1, 2, 4, 8, A, B or C, inhibition magnetic fields $$-\frac{H}{2}$$

such that the presence of an inhibiting field in a core prevents said core from switching from saturation state 0 to state 1. In the 7 cores of position $d$ of the storage determined by a tens trigger and a unit trigger of scanning chains A, these triggers allow the generation of magnetic fields $$+\frac{H}{2}+\frac{H}{2}=+H$$

In those of the 7 cores for which no signal is to be recorded, an inhibiting field $$-\frac{H}{2}$$

is generated which holds the core in remnant state 0, since the total of magnetic field $$\frac{H}{2}+\frac{H}{2}-\frac{H}{2}$$

or $$\frac{H}{2}$$

is not sufficient to switch the core to saturation state 1. On the contrary for those of the 7 cores in which a signal is to be recorded, there appears no output signal from the corresponding inverter, and the pulse generator generates no inhibiting field; consequently, the corresponding core undergoes a magnetic field $$\frac{H}{2}+\frac{H}{2}$$

or H sufficient to switch it from saturation state 0 to state 1.

It is obvious that, if the storage had been made up of magnetic cores such that the reading of the recorded information does not occur simultaneously with its erasing it would have been unnecessary to record it again.

At the end of the first time A, the 7 bits which were present in position $d$ have been read out written in the trigger register, and rerecorded in the same storage position. During time B, these bits are recorded in position $d'$ determined by the tens triggers and unit triggers of scanning chains B. During time B, no reset pulse favors the slow input of diode gates P1, P2, P4, P8, PA, PB and PC (FIG. 4j); consequently, the 7 triggers B1, B2, B4, B8, BA, BB and BC of the register are not reset and the information read during the preceding time is held in it. A tens trigger and a unit trigger of scanning chains B determine position $d'$ of the storage, and allow the generation in the read windings of the 7 cores of position $d'$ magnetic fields $$-\frac{H}{2}-\frac{H}{2}$$

or $-H$. These magnetic fields switch back to saturation state 0 those among the 7 cores which were in state 1 and, by erasing the information which was recorded in them, allow it to be replaced with the information to be transferred. The read signals corresponding to these cores will appear on lines L′1, L′2, L′4, L′8, L′A, L′B and L′C (FIG. 4i) and will be applied to an input of logical "AND" circuits E1, E2, E4, E8, EA, EB and EC, but since these signals are not desired, they do not go through these circuits because the second input of said circuits is not favored during time B. As a matter of fact, if the controlled program is "transfer," "print edit" or "punch edit," a signal will appear on one of the three terminals Tr, CI, or Cp (FIG. 4b), hence on the output of logical "OR" circuit OTC, that is, on the input of inverter ITC. There will be no signal on the output of ITC nor to one of the inputs of logical "AND" circuit ETC; circuits E1, E2, E4, E8, EA, EB and EC (FIG. 4i) are not favored and the information read in position $d'$ is thus ignored; it is not applied to amplifiers A1, A2, A4, A8, AA, AB and AC nor to triggers B1, B2, B4, B8, BA, BB and BC (FIG. 4j) of the register. Thus during time B, the information appearing on the register's output is still that which was read during time A; it is this information which is recorded in position $d'$ of the storage. As previously explained for the rerecording in position $d$, the read signal follows the same way: it goes through logical "AND" circuits E′1, E′2, E′4, E′8, E′A, E′B and E′C (FIG. 4g), logical "OR" circuits O1, O2, O4, O8, OA, OB and OC (FIGS. 4o and 4x) and is applied to the inputs of inverters I1, I2, I4, I8, IA, IB and IC, then to inhibiting current pulse generators G1, G2, G4, G8, GA, GB and GC (FIG. 4i) but now, during the recording time, the 7 cores of position $d'$ are the ones which are determined by scanning chains B. The windings of these 7 cores consequently receive the recording currents which generate magnetic fields $$\frac{H}{2}+\frac{H}{2}$$

and which respectively proceed from the tens trigger and the units trigger of chain B. For those among the 7 cores of this position $d'$ in which no bit is to be recorded, the inhibition generators induce magnetic fields $$-\frac{H}{2}$$

which hold them in remnant state 0, while in those in which an information element is to be recorded, the absence of a signal on the output of the inverters corresponds to the absence of the inhibiting field, and these cores switch to saturation state 1.

All the digits, letters and special characters are translated into a code which allows the initiation of them in the storage with a certain number of bits chosen among 1, 2, 4, 8, A, B, C so that this number be odd; this has the advantage to allow, during any period of machine operation, the detection of an error, making it certain that the number of bits representing any character is not even. All the errors leading to a change of parity of this number will be detected, either those caused by the absence of a bit which should have been present, or those caused by the existence of a bit which should have been absent, whether this error concerns one bit or any odd number of bits. This parity check may be performed according to any well known method. It is possible, for instance, to determine whether the number of bits, during the recording of the character in the storage is compatible according to parity. This parity check may, for instance, be performed at the level of logical "OR" circuits O1, O2, O4, O8, OA, OB and OC and inverters I1, I2, I4, I8, IA, IB and IC.

At the end of the first cycle A and first cycle B, the information has been transferred from the storage position $d$ to position $d'$, while being regenerated in position $d$; the following cycle begins with a reset of the 7 trigger register, through diode gates P1, P2, P4, P8, PA, PB and PC (FIG. 4j). The register is now ready to receive the information read out of the following position $(d-1)$. Scanning chain A progresses one stage and determines as an address, position $(d-1)$ of the storage; the information read out of this position is first written in the register then recorded again in position $(d-1)$. Chain B progresses one stage and determines position $(d'-1)$; the information read out of this position is left aside and, in its place, is written the information contained in the register, i.e., that read from $(d-1)$.

Chains A and B keep up this progression and the transfer from one field to the other continues for all the successive positions, the information accumulating in field B, i.e., in the output storage, until chains B have scanned all 120 positions of the output storage; then they stop, thus causing scanning chains A to stop and the transfer to end.

In FIGS. 4p, 4q and 4r, scanning device A has been represented by three tens stages: triggers D0, D1 and D2, and by three unit stages: triggers U1, U2 and U3 as well as the connecting circuits between said triggers; scanning device B has been represented by three tens triggers: D'0, D'1 and D'2 and three unit triggers U'1, U'2 and U'3. It is quite obvious that the other triggers which are not shown, D3 to D7, U4 to U10, D'3 to D'7 and U'4 to U'10 as well as their interconnecting circuits, may be made up the same way. Some of input terminals 1, 2, 3, . . . 80 common to chains A and B, as well as some of output terminals 1', 2', 3', . . . 120' of B have been represented (FIGS. 4p, 4q and 4r), arranged and marked as in FIGS. 2b and 2c.

Output terminals 1' to 120' represented in FIG. 4r of scanning device B receive the output pulses only if the controlled program is a print edit, i.e., if terminal CI is energized. Other output terminals, which are not shown in the figures, would allow to receive the output signals from scanning device B if the controlled program were the editing of an information line to be punched, i.e., if it is terminal Cp which is energized. In print edit as well as in punch edit, the output terminals emit pulses synchronized with the position of the storage reached by the scanning, and allow to control any change in the information transfer toward this position. The signals from these terminals are eliminated during operating time of skip trigger BHI, in order to avoid that one of the signals, after controlling a skip, be wrongly interpreted. For this, the left output of BHI (FIG. 4h) is wired to an input of logical "AND" circuit $e'I$ (FIG. 4c) which may be favored only if BHI is off. Print edit control terminal CI is wired to the second input of $e'I$. The signal on the output of $e'I$ allows to favor either logical "AND" circuit E'3 and the 80 logical "AND" circuits associated with the 80 output terminals 1' to 80' or logical "AND" circuit E3 and the 40 logical "AND" circuits associated with terminals 81' to 120', whether that data is to be recorded in storage group M2 or M3, i.e., whether a signal appears on the output or the input of inverter I3.

The starting of the scanning devices, i.e., the switching on of a tens and of a unit trigger of device A or B, is performed through logical "AND" circuits $ed$ (FIG. 4p) an input of which is favored by a start pulse proceeding through line Ld and the other input by the terminals 1 to 80, which corresponds to this stage. The start signal proceeding from "AND" circuit $ed$ goes through "OR" logical circuit Op in order to energize diode gates Pp and switch "on" the triggers of the determined stage.

The progression in forward direction of device B (FIG. 4p), for example, is performed from right to left, i.e., from 80 to 1, successively from the right output of the on trigger through logical "AND" circuits Ep (an input of which is favored during time B through line TB) "OR" logical circuits Op, diode gates P'p to reset the trigger which is on, and Pp to switch the trigger on its left on. The progression takes place according to a similar principle in the tens and unit chains of scanning devices A and B, on each one of the corresponding progression pulses applied by lines Lp.

The scanning is performed in backward direction from 1 to 80, when the progression pulses appear no longer on line Lp and so called regression pulses appears on lines Lr; through diode gate P'r, the signal on the right output of the trigger on resets it, and through Pr it switches the following trigger on the right on.

Both operating times A and B are determined through trigger TAB, FIG. 4h. On the left output and on the right output of the trigger appear complementary signals shown in the time diagram, FIG. 13, time A corresponding to the left output (trigger TAB on); the signals determining times A and B are respectively applied on lines TA and TB.

Generator Gs comprises several triggers and allows to generate all synchronization and progression pulses necessary for the operation of the machine and of the print edit device in particular. Such a generator is described in the above-mentioned copending applications (Dockets 5544 and 5588), which determines elementary times which subdivise above-mentioned times A and B and which may be used in succession to synchronize, for example, the reset of the triggers, the reading of the storage information, the checking, the production of delay pulses, the recording of the information or any other function. Generator Gs generates as well a series of advance pulses for the scanning devices; these pulses are available on line La and may, for example, be negative as those shown in the time diagram.

Line La is wired to an input of logical "OR" circuits OTA and OTB (FIG. 4h). The right and left outputs of trigger TAB are respectively wired to the second input of OTA and OTB; the output pulses OTA and OTB make up advance pulses A and B. These pulses are available on lines T'A and T'B and are shown on the time diagram (FIG. 13). These advance pulses T'A and T'B are applied to the fast input of diode gates PAB and P'AB and are used to switch trigger TAB on or off in order to determine the limits of time intervals A and B.

Advance pulses A cause the progression of scanning device A, i.e., switches the "on" trigger of device A "off" and switches the following trigger "on" so that the triggers of device A are successively held on, first during a time B, then during the following time A. The same happens for advance pulses B and scanning device B, as shown in the time diagram (FIG. 13) in which trigger $n$ of scanning device B remains on during a time A, then during the following time B, trigger $(n-1)$ being on during both times A and B, which follow.

Obviously, other timing arrangements might be used, such as, for example, the one shown in the time diagram (marked "Alternate Operation" in FIG. 13), according to which the on time of trigger $n$ of scanning device B would first include a time B, then the following time A.

In FIG. 4i, all the storage groups have been marked with M and represented symbolically by a dotted line square, in which appear the 7 magnetic cores N1, N2, N4, N8, NA" NB and NC of a single position, for example, position 12 of storage group H2. It is quite obvious that all the positions of all the storage groups might be identical. When tens trigger D'1 and unit trigger U'2 of scanning device B are on, they determine position 12 of selected storage group M2, i.e., during B time the signals on the right output of D'1 and U'2 go through logical "AND" circuits Ep, logical "OR" circuits Op and favor an input of logical "AND" circuits EL and E'L (FIG. 4h) (the other input of which is favored, during the reading times, by a signal proceeding through line LL); they energize current pulse generators or core drivers GL and G'L and generate, during reading times B, magnetic fields $$-\frac{H}{2}$$

and $$-\frac{H}{2}$$

in the sense windings of the 7 cores of position 12; these magnetic fields do not modifiy the remanent state of the cores which were in state 0; on the contrary, they switch back to state 0 the cores which were in state 1, by generating an output signal on corresponding lines L'1, L"2, L'4, L'8, L'A", L'B or L'C. Then, during the recording times, the pulse from line Le favors an input of logical "AND" circuits Ee and E'e; the signals on the right output of D'1 and U'2 go through Ep, Op and Ee or E'e energize current pulse generators or core drivers Ge and G'e, and generate magnetic fields $$\frac{H}{2}+\frac{H}{2}=H$$

in the record windings of the 7 cores. The recording takes place in a core, i.e., its change from remanent state 0 to state 1 occurs only for those among the 7 cores in which an inhibiting magnetic field $$-\frac{H}{2}$$

is not generated simultaneously. The inhibiting current pulse generators or inhibition core drivers have been symbolically represented with squares marked G1, G2, G4, G8, GA, GB and GC (FIG. 4i).

It is quite obvious that this operation, described as mere indication, may be adapted to any other type of magnetic cores, to other information recording or reading methods, or pulse generators operating according to other principles. For example, other methods would relate to using: (1) core drivers GL and Ge (reading and recording) which generate current pulses of same direction, in opposite direction windings to apply successively, to the magnetic core, opposite magnetic fields —H, reading, and +H, recording; (2) core drivers producing in the same windings current pulses of opposite direction; (3) a limited number of core drivers, each for supplying in common the cores of several positions, and several switches controlled by the scanning devices so that, when a position is reached by the scanning device, the corresponding switch make and the core driver generate the magnetic field in the 7 cores of this position. The core drivers and the switches may be of any type, for example, of the tube or transistor type, or made up of a magnetic core matrix.

TRANSFER WITH REDISTRIBUTION (FIGS. 4h, 4p, 4q AND 4r)

In a general manner, in the working storage, the information is not arranged the way it should be printed or punched. In this case, the transfer of the information contained in field A, toward field B or output storage, must occur together with a redistribution. The line is edited in series, the data are accumulated in order in the successive positions, the storage field determined by chain B covers all the positions of the line to be edited, i.e., the scanning of field B is continuously performed from the extreme right position up to the last position left of the output storage.

Each time, and it is the general case, when, during the programs preceding the print edit, it was not possible to join together the words which are to be read out of the working storage, in order to enter them into the output storage, scanning device A, which determines the outgoing quantities, must be conditioned by scanning device B which scans the area in which the line is being composed.

The conditioning of a chain to the other is described in our copending application Serial No. 643,369, filed Mar. 1, 1957. This conditioning enables the scanning chain A to perform skips controlled by chain B. It means that both chains A and B progress normally, until in chain B a determined stage, for example 40, is switched on. Then the output signal of triggers D'3 and U'10 of chain B controls the stopping of chain A and its restart from any stage, for example 71. For this, it is sufficient to wire output terminal 40' of chain B (output of both D'3 and U'10 triggers) to input terminal 71 which is common to both chains A and B; see dotted line connection in FIGS. 2a, 2b and 2c (and FIGS. 4p, 4q and 4r). The stage 71 selected for this connection will be the one which determines the position on the extreme right of the new storage to be transferred.

In case the new field to be transferred is not in the same storage group, the chain A skip control must occur together with a group change control. For this (see FIGS. 2a, 2b and 2c), the control pulse emitted for example by output terminal 10' of triggers D'o and U'10 of chain B is applied through a circuit C12 which permits the feeding of two pulse receiving terminals, one of them 31 used as previously to determine the storage position, while the other defines the new storage group.

Between the moment when chain A is stopped and the one when it starts again from the new position, the progression of chain B stops for a while and the transfer of the information contained in the last position determined by chain A is not transferred in field B. Then, both chains progress normally and the information transfer resumes as previously described, unless the information redistribution requires a new skip control.

The skip device comprises essentially 3 skip triggers BI, BII and BIII logical "OR" circuit SO and logical "AND" circuit Se (FIGS. 4h, 4p, 4q and 4r).

No matter which input terminal of the scanning devices is energized by the skip control, a signal is applied to one of the 8 inputs (which corresponds to the 8 series of ten) of logical "OR" circuit So, and goes through it. It is the signal on the output of So which allows the detection of a skip control and which switches the skip device on. For this, it is applied to an input of logical "AND" circuit Se. The 3 other inputs of Se are favored when the 3 following conditions are met:

(1) The control program is "print edit" or "punch edit," a signal proceeding from terminal CI or CP through logical "OR" circuit OIP (FIG. 4c).

(2) The skip device is not on, a signal proceeding from the left output of skip trigger BII (FIG. 4h).

(3) The start control has already occurred.

The signal on the output of Se is applied on the slow input of diode gate PI; the first advance pulse A applied through line T'A to the fast input of PI switches skip trigger BI "on." The right output of BI is wired to the slow input of diode gate P'I; the first advance pulse B, applied through T'B to the fast input of P'I resets trigger BI and switches trigger BII on. The right output of BII is wired to the slow input of diode gate P'II; the following advance pulse B applied through line T'B to the fast input of P'II switches trigger BIII on and BII off. The output of BIII is wired to the slow input of diode gate P'III and the following advance pulse B switches trigger BIII off. The three triggers BI, BII and BIII are now off and the skip device is back in its original state ready to respond to a new skip control.

As a conclusion, when a skip is controlled, the three triggers BI, BII and BIII are switched successively on; they are switched off when the following one is switched on. The "on" times of the three triggers BI, BII and BIII are shown in the time diagram (FIG. 13).

The main purpose of these three triggers is:

(1) To reset scanning device A; for this, to switch off the "on" triggers.

(2) To stop the progression of scanning device B; for this, it is sufficient to eliminate advance pulses B until scanning device A is relocated.

(3) To restart scanning device A from the stage determined by the established connection (stage 71 according to the given example, the dotted line connection shown in FIGS. 4p, 4q and 4r). In order to switch tens trigger D7 and units trigger U1 of scanning device A, the signal on the right output of trigger BI goes through logical "OR" circuit Od and allows, through line Ld, the application of a start pulse to all logical "AND" circuits ed, the second input of circuits ed corresponding to a series of tens 7 and to units 1 being favored by input terminal 71.

(4) The information proceeding from the last position reached by scanning device A must not be transferred in field B of storage; for this, the read pulses are eliminated when trigger BI is "on."

Skip triggers BI and BII directly operate on timing generator Gs in order to obtain an additional advance pulse for scanning device A, or to eliminate an advance pulse for scanning device B. This operation is explained in detail in copending application Serial No. 643,369. During the "on" time of trigger BII which includes a time A and a time B, the information from the new position A is transferred in storage position B.

Other information proceeding from another control could also be recorded in the position in which the skip is controlled, for example, an insertion of symbol "—," minus. The other purposes of these three triggers BI, BII and BIII and more particularly those which allow simultaneously control of a skip and another function from the same output terminal of the scanning device will be described in the corresponding chapter.

Insertion of Characters

All the letters, digits and special characters such as, for example, & . $ , / , %, etc., may be inserted in the line to be composed, in any position as desired by the operator. To each one of these characters, corresponds a terminal marked A, B, C, D, E . . . X, Y and Z, 1, 2, 3, 4 . . . 8, 9, 0, b (blank) . $ & @ %, etc. (FIGS. 4n and 4w).

It is possible to insert either a single character or several successive characters in order to make up a word, TOTAL, for example, or a group of words.

The insertion of a character may be conditional or not. For example, the insertion of sign "—" may be controlled unconditionally or the operator may wish that sign "—" be printed only if the quantity is negative; in this case, it is the machine which detects the sign of the quantity and determines whether the sign "—" must be inserted or not.

The position in which this insertion takes place may be either determined in advance or depend upon the quantity. For example, the doller $ character may be inserted in a fixed position or on the left of the high order significant digit of the quantity.

At this point, only the unconditional insertions in determined positions will be described, the others will be described hereinbelow.

The insertion relates, during the transfer of a storage field A to a B field, to stopping this transfer during as many cycles as there are characters to be inserted and to record in field B the desired characters. Consequently, the insertion of a character stops the progression of scanning chains A, while preventing the reset of the register which keeps the information read in the last position reached by chains A so that after the insertions, the information kept in the register be recorded in field B. Then chain A resumes its progression and the transfer goes on until a new exception, eventually wired. These functions will be performed as well if the insertion is controlled by the wired connection as if the insertion occurs automatically, i.e., is controlled by one of the devices described in further chapters, and which allow such operations as "floating dollar," CR insertion, etc.

In order to insert a character, Z for example, in a position such as position $x$ of the storage, it is sufficient to connect with a flexible wiring the output terminal of the stage $x$ triggers of scanning device B to the terminal corresponding to the selected character Z. The output terminals of scanning chain B are pulse emitters, the terminals corresponding to the characters to be inserted are pulse receivers; consequently, it is possible to wire one same "characters" terminal to two or more different terminals of chain B. These connections will allow the same character to be inserted into various positions of the line.

When the started program is a print or punch edit operation, scanning chain B starts from the extreme right position of the line to be composed and once started, it progresses toward the left from position to position and scans the storage up to the end of the line. Hence, all the output terminals of all the stages of chain B will emit successively synchronized pulses upon the scanning of the storage corresponding position. When scanning chain B reached position $x$ of the storage, the pulse emitted by the chain will travel from the terminal corresponding to stage $x$ to the terminal marked Z. This pulse goes through logical "OR" circuits OA and O18, then O'A, O'1 and O'8 (FIGS. 4o and 4x), letter Z being translated in the storage by bits 1, 8 and A. The output signals from O'A, O'1 and O'8 go through logical "AND" circuits eA, e1 and e8, the second input of which is favored through logical "AND" circuit EI; as a matter of fact, a signal appears on the output of EI, if, during a time B, the two following conditions are met together:

(1) There is no blank to be inserted. As a matter of fact, as it will be explained in the blank insertion chapter, a blank to be inserted has priority on the control of any other function. The corresponding signal proceeds from the left output of blank insertion trigger Bb (FIG. 4m).

(2) A "print edit" or "punch edit" program has been controlled from terminals CI or CP through logical "OR" circuit OIP (FIG. 4c).

In order to record a Z in position $x$, among the 7 cores of the storage position $x$, cores 1, 8 and A must switch from remnant state 0 to state 1. Starting from the output of logical "AND" circuits e1, e8 and eA, bits 1, 8 and A, corresponding to letter Z to be inserted in position $x$ of the storage area B, go on exactly as if it were the transfer of letter Z from the register toward position $x$; this means that signals 1, 8 and A proceeding from "AND" circuits e1, e8 and eA go through logical "OR" circuits O1, O8 and OA, and are applied to the input of inverters I1, I8 and IA (FIGS. 4o and 4x). A signal appears only on the output of inverters I2, I4, IB and IC; corresponding inhibition current pulse generators G2, G4, GB and GC (FIG. 4i) apply to the windings of the cores corresponding to bits 2, 4, B and C an inhibiting magnetic field $$-\frac{H}{2}$$

at the same time, the tens and unit triggers of scanning chain B allow to generate fields $$+\frac{H}{2}+\frac{H}{2}$$

in the 7 cores of the storage position $x$. As a conclusion, cores 1, 8 and A of position $x$ switch to saturation state 1; letter Z has been inserted.

During the cycles preceding this cycle $x$ of chain B, scanning chain A has reached a position of field A of the storage; as during a normal transfer, the information read in this position of field A has been written in the 7 trigger register, then regenerated in the same position of field A. However, when chain B reaches position *x* of the storage, the signals corresponding to the bits to be inserted must be recorded, in this case 1, 8 and A; they go through logical "AND" circuits *e*1, *e*8 and *e*A then logical "OR" circuit OI (FIG. 4*o*), the 7 inputs of which are wired to the outputs of the 7 logical "AND" circuits *e*1, *e*2, *e*4, *e*8, *e*A, *e*B and *e*C. Consequently, there will be a signal on the output of OI no matter what the character to be inserted is, i.e., no matter what the bits to be recorded in the storage are, even if there is a single bit to be recorded, for example, if it is desired to insert digit 8 which is represented by single bit 8.

The signal on the output of logical "OR" circuit OI performs two functions:

(1) It prevents the information written in the 7 trigger register, and which has just been read out of field A, from being recorded in position *x* of the storage.

(2) It switches hold trigger B*m*, on in order to stop the progression of scanning chain A, by eliminating the advance pulses of this chain, and prevents the resetting of triggers B1, B2, B4, B8, BA, BB and BC of the register, in order to keep in it, the information to be recorded, when the insertions are over.

(1) The signal on the output of logical "OR" circuit OI is applied to the input of inverter II (FIG. 4*g*). The output of II is wired to an input of logical "AND" circuit E′I, the second input of which is favored during time B. If there is a character to be inserted, there is a signal on the input of II, there is no signal on the output of II, hence no signal on the output of E′I nor to that of logical "OR" circuit O′I, nor on the output of logical "AND" circuit *e*I; and an input of logical "AND" circuits E′1, E′2, E′4, E′8, E′A, E′B and E′C (FIG. 4*g*) is not favored any longer. Consequently, during times B, the signals from registers B1, B2, B4, B8, BA, BB and BC may no longer be recorded in position *x* of the storage, since lines L1, L2, L4, L8, LA, LB and LC are interrupted.

In position *x* of the storage, the character to be inserted is recorded, while the information proceeding from the register may not be recorded any longer. On the contrary, if there were no character to be inserted, there would have been no signal on the output of OI, nor on the input of inverter II, but then, there would have been a signal on the output of II; this signal would have gone through "AND" circuit E′I and "OR" circuit O′I in order to be applied to an input of logical "AND" circuit *e*I. The second input of *e*I is favored when the current program is a transfer, a print or punch edit; as a matter of fact, through the control wiring of this program a pulse is applied to one of input terminals T*r*, CI or CP respectively transfer, print edit and punch edit. When one of these two last programs is controlled, there is a signal on the output of "OR" circuit OIP (FIG. 4*c*) and when one of the three is controlled, there is a signal on the output of "OR" circuit OTC, and it is this signal which favors the second input of *e*I. The third input of *e*I is wired to the output of inverter IR (FIG. 4*o*) for resetting the output storage; this input is favored when no signal is applied to the input of IR, i.e., as long as the line composition is lasting. Inverter IR will be described in chapter "output storage reset." The output signal from *e*I favors logical "AND" circuits E′1, E′2, E′4, E′8, E′A, E′B and E′C which consequently allow, during time B, the recording in field B of the information from the register.

During time A, when the controlled program is a transfer or an editing, an input of "AND" circuits E′1, E′2, E′4, E′8, E′A, E′B and E′C is favored, in a similar way, by the signal which exists during time A, which is through line TA applied to the second input of "OR" circuit O′I and which successively goes through O′I and then "AND" circuit *e*I.

As a conclusion, the information read in a position of field A of the storage and written in the register is always rerecorded in the same position of field A, while its transfer toward a position of field B is allowed only if there is no character to be inserted. But, immediately after the insertion of the character or characters is over, the information transfer from field A to field B, interrupted during the insertion, resumes, beginning with the recording in B of the last information read in A; but to perform this function, this information is to be kept in the register.

(2) Duty of hold trigger B*m* (FIG. 4*g*): A signal appears on the output of logical "OR" circuit OI (FIG. 4*o*) only if there is a character to be inserted; this signal is applied to an input of logical "AND" circuit E*m*. Circuit E*m* receives three other signals, a first signal which exists only during the forward scanning of the storage and does not exist during the backward scanning, since during backward scanning, substitutions may occur, but no insertions (through line L′*d* this first signal proceeds from the output of inverter I′*d* (FIG. 4*l*), the input of which receives during the backward scanning a signal applied by line L*i*); a second signal which does not appear for the positions in which a skip has been controlled, which proceeds from the left output of skip trigger BI (FIG. 4*h*) and which appears for all the positions in which no skip has been controlled in order to avoid any confusion between skip and insertion control; finally a third signal which exists only if no substitution has been controlled. This third signal proceeds from inverter I*sub* output (FIG. 4*n*), the input of which is wired to logical "OR" circuit O*sub* output (FIG. 4*u*).

The four possible cases of character substitution are grouped on the four inputs of this circuit O*sub*, they will be considered in the following chapter. If there is a substitution of character to be performed, there will be a signal on the output of O*sub* and no signal on the output of I*sub*; "AND" circuit E*m* will not be favored. On the other hand, if there is no substitution to be performed, there will be no signal on the output of O*sub* hence a signal on the output of I*sub* which will favor the corresponding input of E*m*. Consequently, a signal will appear on the output of E*m* if, during the forward scanning and in the absence of a skip control, there is an insertion and no substitution to be performed; this signal favors the slow input of diode gate P*m*. A pulse proceeding from the timing generator G*s* and applied to the fast input of P*m* switches hold trigger B*m* on (FIG. 4*g*). Trigger B*m* is reset through diode gate P′*m* the slow input of which is favored, in the absence of skip control, by the signal from the left output of skip trigger BIII, and the fast input of which, wired through line T′A to the output of logical "OR" circuit OTA (FIG. 4*h*) receives the progression pulses of scanning device A (see time diagram, FIG. 13). Trigger B*m* is switched back on during each one of the insertions to be performed. As soon as there is no more insertion to be performed, none of the 7 inputs of OI receives any signal; there is no signal on the output of E*m*, diode gate P*m* is not favored any longer, hold trigger B*m* no longer switches "on" but remain "off."

Trigger B*m* is on while chain B scans the positions in which an insertion is controlled, in the selected example, position *x* of the storage. A signal is available on the left output of B*m* only if B*m* is off; this signal favors an input of logical "AND" circuit E′*m* (FIG. 4*b*). The other inputs of E′*m* are favored during time B, through line TB; during the absence of skip control by the signal on the left output of skip trigger BII and by the output signal of "OR" circuit OTC (FIG. 4*b*), when the controlled program is a transfer, or print or punch edit.

The signal on the output of E′*m* favors the slow input of the 7 diode gates P1, P2, P3, P4, PA, PB and PC (FIG. 4*j*); their outputs, wired to the left inputs of register triggers B1, B2, B4, B8, BA, BB and BC allow to reset them, when an advance pulse reaches the fast input of these gates, through line L'a. Thus, when trigger B*m* is "off," the content of the register is erased after each cycle B; on the contrary, when B*m* is "on," no signal goes through E'*m*; diode gates P1, P2, P4, P8, PA, PB and PC are not favored any longer; the triggers of the register are not reset and the information read during the preceding cycle being no longer erased, it is kept in the register as long as there are characters to be inserted.

In addition to keeping in the register the information read in field A when stage $x$ switches "on" in chain B, trigger B*m* allows scanning chain A to stop on the position it occupies, while chain B continues its progression normally. For this, it is sufficient to apply to chain A its advance pulses, through a logical "AND" circuit not shown in the figures. This logical "AND" circuit has an input favored by the signal on the left output of B*m* hence, the advance pulses are applied to chain A only if B*m* is off, i.e., if there is no character to be inserted.

In the example which is explained, letter Z has been inserted in position $x$ of field B of the storage, but it is quite obvious that any other letter, digit or character could have been inserted in it; it would have been sufficient to wire the output terminal of scanning devices B corresponding to position $x$ to terminal corresponding to the selected character. To each digit, letter and character which can be inserted, corresponds a terminal; all these terminals marked A, B, C, ... Y, Z, 1, 2, ... have been represented in FIGS. 4*n* and 4*w*; they are wired to inputs of 20 logical "OR" circuits O1, O2, O4, O8, OA, OB, OC, O12, O14, O18, O24, O38, O48, O124, O128, O198, OAB, OAC, OABC. Each one of these 20 "OR" circuits is marked by letter O with a symbol which corresponds to the bits that this circuit allows to record; thus, for example "OR" circuit O124 allows the recording of bits 1, 2 and 4. These 20 logical "OR" circuits allow a translation according to code 1, 2, 4, 8, A, B, C of the signal corresponding to a character. Thus, for example, the terminal corresponding to character F is wired to an input of "OR" circuits OABC and O24, thus recording bits 2, 4, A, B and C because letter F is translated by code 2, 4, A, B and C. The outputs of these 20 "OR" circuits are combined with the inputs of 7 logical "OR" circuits O'1, O'2, O'4, O'8, O'A, O'B and O'C (FIGS. 4*o* and 4*x*), which respectively allow the recording of bit 1, 2, 4, 8, A, B or C. Thus, the output of "OR" circuit O124 is wired to an input of "OR" circuits O'1, O'2 and O'4 as well, the output of OA is wired only to the input of O'A. It is quite obvious that the transformation of a character according to code 1, 2, 4, 8, A, B and C could have been performed according to many other methods, or through logical "OR" circuits differently combined.

The insertion of a character may also be made in several locations; thus, if the operator wishes to insert letter F into positions $x$, $y$, $z$, of the storage, he will wire terminal F to the output terminal of the three stages of $x$, $y$, $z$, of scanning chain B. He can thus insert complete words; for example, if he wants to insert word TOTAL between positions $x$ and $(x+4)$ of the storage, he will join T to the output terminals of stages $x$ and $(x+2)$ of chain B, in order to insert T into both positions $x$ and $(x+2)$;

the terminal corresponding to letter O is joined to terminal $(x+1)$;
the terminal corresponding to letter A is joined to terminal $(x+3)$ and
the terminal corresponding to letter L is joined to terminal $(x+4)$.

The versatility of this insertion device, and more particularly the possibility to insert the same character into several positions of the line allows, for example, during the transfer of a number from the working storage to the output storage, them to be separated in three figure periods and the separation may be indicated, as desired, with a dot, a comma or a blank. Thus for example, let us assume that number 6543210 written in field A of the storage is to be transferred to field B, while inserting a comma between digits 2 and 3 and another between 5 and 6 in order to print number 6,543,210. Let us assume that digit 0 must occupy position $x$ of field B of the storage; the operator wires terminal "," corresponding to the comma to output terminals $(x-3)$ and $(x-7)$ of scanning chain B. The transfer of the first 3 numbers is normally performed, 0 is recorded in position $x$, 1 in position $(x-1)$ and 2 in position $(x-2)$.

Then, during time A digit 3 is read out and written in the register; scanning chain B reaches now position $(x-3)$; then bits 1, 2, 8, A, C corresponding to the comma are inserted in position $(x-3)$; this insertion prevents the recording of digit 3 in position $(x-3)$; it stops the progression of chain A and does not erase digit 3 from the register. When chain B reaches position $(x-4)$, digit 3 is recorded in it, then digit 4 in position $(x-5)$ and digit 5 in position $(x-6)$. Again, when chain B reaches position $(x-7)$, a comma is inserted, and then the transfer resumes normally.

*Character Substitution*

During the transfer of the information recorded in a field A of the storage toward a field B, if the insertion of a character C between two other joined character CG and CD has been controlled, character C to be inserted takes the place of one of the two, the one on the left, CG which is itself offset one additional position to the left, thus causing for the remaining information to be transferred, an offsetting of one position to the left. In order to reach this result, the insertion of C prevents the recording in field B of character CG and hold trigger B*m* switched on, stops the progression of scanning chain A, and maintains during this cycle the information corresponding to character CG in the register.

The substitution of a character C' with another one, C, differs from an insertion (even though character C to be substituted is recorded in the position which character C' would have occupied if there had been a transfer), because this character C' must not be recorded in the following position of field B. Consequently, C replaces C' which is ignored. The substitution of C' with C, leads, as for an insertion, to record character C and to prevent the recording of character C', but hold trigger B*m* must not be switched on because it is unnecessary to keep in the register the information corresponding to character C' and to stop progression of chain A.

A substitution somewhat corresponds to a change of code. During the forward scanning, there are 4 possible cases when substitutions are controlled; they are:

(1) Bits 1, 4, 8, B and C representing a character indicated with $\varphi$ are inserted in place of digit 0 (code 2, 8, C) of a blank (code C).

(2) A zero (code 2, 8 C) is replaced with a blank (code C).

(3) A zero (code 2, 8, C) is replaced with a significant zero (code A).

(4) In the floating dollar insertion device $ $\alpha$ or $\beta$ are substituted for a blank, a zero or a comma, excepted if the insertion of a blank, a dot or a comma has been controlled, in order to give priority to the insertion over the substitution.

To each one of these 4 cases, corresponds an input of logical "OR" circuit O*sub*; these cases will be explained with more details in further chapters.

It is quite obvious that if there existed other cases when, during the forward scanning, a character must be substituted for another, these substitution controls should be grouped with the 4 previous ones to other inputs of "OR" circuit O*sub* (FIG. 4*u*). Each time a substitution is controlled, a signal appears on the output of circuit O*sub*. This signal is applied to the input of inverter I*sub* (FIG. 4*n*). The output of I*sub* is wired to an input of logical "AND" circuit E*m*. If a substitution is to be performed, this input of E$m$ is consequently not favored; if there is no substitution to be performed, this input is favored.

As for an insertion, the bits of character C to be substituted for character C' are applied through one or more of the 20 logical "OR" circuits and of the 7 logical "OR" circuits O'1, O'2, O'4, O'8, O'A, O'B and O'C which convert a character in elementary information signals according to the selected code (FIGS. 4$o$ and 4$u$). As for an insertion, these signals allow recording in the storage of the selected character; moreover, they are applied to the 7 inputs of logical "OR" circuit OI (FIG. 4$o$). Consequently the existence of a single of these signals causes a signal on the output of OI. As previously explained, a signal proceeding from OI through inverter II prevents, during time B, the favoring of logical "AND" circuits E'1, E'2, E'4, E'8, E'A, E'B and E'C (FIG. 4$g$); hence prevents recording character C' in field B. But, in opposition to what happens for the insertion and even though the signal proceeding from OI favors a second input of logical "AND" circuit E$m$, no signal may come out of E$m$ if there is a substitution to be performed, since the input of E$m$, wired to the output of I$sub$, is not favored. The absence of a signal on the output of E$m$ prevents the favoring of diode gate P$m$ and thus trigger B$m$ is not switched on. Since B$m$ stays off, there is a signal on the left output of B$m$, and this signal favors an input of logical "AND" circuit E'$m$ (FIG. 4$b$). The other inputs of E'$m$ (see "character insertion" chapter) are favored during time B, in the absence of skip control, by a signal controlling the transfer, print edit, or punch edit, and proceeding from logical "OR" circuit OTC. The output signal of E'$m$ favors the slow inputs of diode gates P1, P2, P4, P8, PA, PB and PC (FIG. 4$j$). The fast inputs of these gates receive a synchronized pulse at the end of time B; this pulse appears on the output of these gates and is applied to the left inputs of triggers B1, B2, B4, B8, BA, BB and BC of the register and resets them, thus erasing the bits corresponding to character C' which had been read out of field A and recorded in the register during previous time A.

Since hold trigger B$m$ has not been switched on, the progression pulses of chain A are not interrupted and chain A keeps on progressing. The substitution having been performed this way; character C replaces character C' and C' is ignored.

*Check Protection Asterisk (FIGS. 4j and 4k)*

During the editing of a line to be printed, it is usual to insert protection asterisks ahead of the quantity to be printed in order to avoid the falsification of the printed quantity.

Let us assume that quantity, blank 0 0 0 0 1 2 0, recorded in a storage is to be transferred into the print storage. The following quantity is to be printed * * * * * 1 2 0, i.e., all the blanks, all the zeros and all the commas on the left of the high order significant digit must be replaced with asterisks (*).

For this, the output terminal of scanning chain B corresponding to the highest order position on the left of the field to be transferred is wired to the terminal marked check protection asterisk $p^*$. During forward scanning, from right to left, in this position, a special code marked $\varphi$ is written. During backward scanning, a trigger B* is switched on as soon as code $\varphi$ is read out of the reached position; and from this position, an asterisk is printed in place of all the zeros and commas. Trigger B* is reset by the first significant digit.

During the reading of a position, in which a 0 had been recorded, logical "AND" circuit E$o$ (FIG. 4$j$) would have received a signal on its 6 inputs, respectively $\bar{1}$, 2, $\bar{4}$, 8, $\bar{A}$ and $\bar{B}$, since 0 corresponds to code 2, 8 and C. Signals 1, 2, 4, 8, A, B, $\bar{1}$, $\bar{2}$, $\bar{4}$, $\bar{8}$, $\bar{A}$ and $\bar{B}$ proceed from the register respectively from the right and left outputs of triggers B1, B2, B4, B8, BA and BB. Hence, a signal would have appeared on the output of E$o$. In the same manner, if, in a position, had been recorded a blank which corresponds to code C, logical "AND" circuit E$b$ would have received a signal on its 6 inputs $\bar{1}$, $\bar{2}$, $\bar{4}$, $\bar{8}$, $\bar{A}$ and $\bar{B}$ wired to the left outputs of triggers B1, B2, B4, B8, BA and BB of the register. The outputs of both "AND" circuits E$o$ and E$b$ are wired to both inputs of logical "OR" circuit O$bo$; on the output of O$bo$, the existence of a signal will show either the presence of a 0, or the presence of a blank in the position reached by scanning chain A.

This signal is applied to one input of logical "AND" circuit E$\varphi$. The other input of this circuit E$\varphi$ being wired to terminal $p^*$, receives a signal through the flexible connection which joins terminal $p^*$ to the terminal corresponding to the position from which it is desired to introduce the check protection asterisks.

During the forward scanning of the storage, i.e., during the right to left scanning, the existence of a blank to be transferred in this determined position will result in a signal on both inputs of E$\varphi$, hence on the output of E$\varphi$. Also, the existence of a 0 in this position will result in a signal on the output of E$\varphi$.

During the forward scanning, the signal on the output of E$\varphi$ performs 2 functions: (1) It prevents, through logical "OR" circuit O$sub$ (FIG. 4$u$) the switching on of hold trigger B$m$ (FIG. 4$g$), because $\varphi$ must be substituted and not inserted; hence, it is not necessary to keep in the register what was in place of $\varphi$. (2) It leads to substitute to the blank or zero previously recorded, a special code marked $\varphi$ for more convenience. $\varphi$ is represented by 1, $\bar{2}$, 4, 8, $\bar{A}$, B and C. In order to insert signal $\varphi$ in the storage, the output of E$\varphi$ is wired to an input of both logical "OR" circuits O148 and OBC (FIGS. 4$n$ and 4$w$); the first one transmits a signal to logical "OR" circuits O'1, O'4 and O'8 and the second one to circuits O'B and O'C so that signals 1, 4, 8, B and C which correspond to $\varphi$ will be inserted.

The output of logical circuits O'1, O'2, O'4, O'8, O'A and O'B (FIGS. 4$o$ and 4$x$) is respectively wired to an input of logical "AND" circuits $e$1, $e$2, $e$4, $e$8, $e$A and $e$B. The second input of these "AND" circuits receives a signal from the output of logical "AND" circuit EI which results in the absence of a blank to be inserted during recording time B. It is quite obvious that, if a blank had been inserted, there would have been a signal on the right output of trigger B$b$ (FIG. 4$m$) no signal on the left output, nor on the output of EI, logical circuits $e$1, $e$2, $e$4, $e$8, $e$A and $e$B would not have been favored.

Let us assume that there is no blank to be inserted; circuits $e$1, $e$2, $e$4, $e$8, $e$A and $e$B are favored; signal $\varphi$ to be inserted corresponds to a signal on the output of circuits $e$1, $e$4, $e$8, $e$B and $e$C, to the absence of signal on the output of inverters I1, I4, I8, IB and IC; and current pulse generator or core drivers G1, G4, G8, GB and GC (FIG. 4$i$) will not generate inhibition pulses on lines 1, 4, 8, B and C of the magnetic cores. Inhibition currents will appear only on lines 2 and A and signal $\varphi$ will be recorded in the storage.

During backwards scanning, when the chain reaches the position in which $\varphi$ has been inserted, bits 1, 4, 8, B and C will be read out, logical "AND" circuit E$\varphi$ (FIG. 4$k$) will receive a signal on its 6 inputs 1, $\bar{2}$, 4, 8, B and $\bar{A}$, a signal will appear on the output of E$\varphi$, on the output of logical "AND" circuit E'$\varphi$, the second input of which is favored through line L$i$ by a signal which stays on during backwards scanning, and on the output of diode gate P* favored by a pulse from the synchronizing generator G$s$ and will switch trigger B* on. The signal on the output of E'$\varphi$ is also applied to an input of logical "OR" circuit O*; for the position in which signal $\varphi$ had been inserted, there is a signal on the output of O*, and this signal means that, in this position, a check protection asterisk is to be substituted for code $\varphi$. Starting from this position, trigger B* being on, for all the following positions, the zeros and commas will be replaced with protection asterisks. As a matter of fact, logical "AND" circuit E* has an input wired to the right output of trigger B* and is consequently favored when B* is on, i.e., for all the positions to the right of a $\varphi$. The other input of E* wired to the output of "OR" circuit O$o$; it receives a signal for all the positions in which a zero or a comma were recorded; as a matter of fact, these two inputs of circuit O$o$, are wired to both outputs of logical "AND" circuits E$o$ and E(,): the 6 inputs of E$o$ correspond to code 0, i.e., $\bar{1}$, 2, $\bar{4}$, 8, $\bar{A}$ and $\bar{B}$ and the 6 inputs of E(,) correspond to the comma code 1, 2, $\bar{4}$, 8, A, $\bar{B}$. The output of logical "AND" circuit E* is wired to an input of "OR" circuit O*; the third input of O* is wired to terminal * which allows to insert an asterisk. The signal on the output of O* means that the information is to be replaced with a check protection asterisk, i.e., to record codes 4, 8 and B; this substitution signal will appear from the position wired with a flexible connection to terminal $p*$, and will stay on for all the following positions in which a zero or a comma were recorded. This signal stops when the trigger B* is switched off, i.e., on the first position in which either a significant digit or a blank appear. A blank in a position may:

(1) Either proceed from the existence of a blank detected by logical "AND" circuit E$b$ the 6 inputs of which receiver signals $\bar{1}$, $\bar{2}$, $\bar{4}$, $\bar{8}$, $\bar{A}$ and $\bar{B}$ since the blank corresponds to code C alone; or (2) Proceed from a blank to be inserted through line L$b$ (the blank insertion will be explained further on). These two blank insertion possibilities are combined in logical "OR" circuit O$b$. The existence of a significant digit in a position is deduced from the absence of a zero, a blank, a signal $\alpha$ and a signal $\beta$. Signals $\alpha$ and $\beta$ have been thus indicated for more convenience; they will be explained in the "floating dollar chapter." The existence of a zero corresponds to a signal on the output of "AND" circuit E$o$ $\bar{1}$, $\bar{2}$, $\bar{4}$, $\bar{8}$, $\bar{A}$ and $\bar{B}$, the existence of a blank corresponds to a signal on the output of "AND" circuit E$b$ $\bar{1}$, $\bar{2}$, $\bar{4}$, $\bar{8}$, $\bar{A}$ and $\bar{B}$, a signal $\alpha$ corresponds to a signal on the output of "AND" circuit E$\alpha$ ($\bar{1}$, 2, $\bar{4}$, 8, A, $\bar{B}$) and $\beta$ corresponds to a signal on the output of "AND" circuit E$\beta$ 1, 2, 4, 8, A, $\bar{B}$. The first two are combined in "OR" circuit O$bo$ then combined to the other two in "OR" circuit O$bo\alpha\beta$. The existence of a signal on the output of O$bo\alpha\beta$ results in the existence of a blank, of a zero, of signal $\alpha$ or $\beta$ and corresponds to the absence of signal on the output of inverter I$s$. The simultaneous absence of blank, zero, $\alpha$ and $\beta$ consequently results in the existence of a significant digit in this position; it corresponds to the absence of signal on the output of O$bo\alpha\beta$ and to the presence of a signal on the output of inverter I$s$. The output of inverter I$s$ is wired to an input of "OR" circuits O$bs$, the other input of O$bs$ being wired to the output of "OR" circuit O$b$. The signal on the output of O$bs$ will correspond to the existence of a blank or a significant digit; it will be used to switch off trigger B* through logical "AND" circuit $e*$ the other input of which is favored if B* is on, and through diode gate P'*.

Once trigger B* is reset, the asterisk may no longer be inserted, unless terminal $p*$ is wired to a further position.

The substitution of the asterisk for signal $\varphi$ and for zeros and commas which follow this $\varphi$ is obtained through the signal on the output of "OR" circuit O*. This signal is applied to "OR" circuits O48, OB, O'4, O'8 and O'B because * corresponds to code 4, 8 and B. The output of O'4, O'8 and O'B is wired to "AND" circuits $e$4, $e$8 and $e$B which are favored if there is no blank to be inserted.

The signal on the output of $e$4, $e$8 and $e$B corresponds to the absence of signal on the output of inverters I4, I8 and IB, and corresponding pulse generators G4, G8 and GB will not generate inhibition pulses on magnetic core lines 4, 8 and B. The inhibition pulses will appear on lines 1, 2, A and C, and character * will be recorded into all the positions of the storage, until trigger B* is switched off by a blank or the first significant digit.

FLOATING DOLLAR DEVICE (FIGS. 4$j$, 4$k$, 4$l$, 4$t$ and 4$u$)

This device functions to print character $ immediately on the left of the first significant digit, i.e., that of the highest order. This position being not fixed, this function is called floating dollar operation. In the described example, it is possible to print character $ but it is quite obvious that it may easily be extended to the printing of any other character such as F (Francs), L (Sterling Pound), etc.

The amount to be printed is recorded in an area wherein the position furthest left must be a blank so as to permit its replacement by $ in case the amount would fill the whole available area. Thus, in any application, the area is preceded with a blank.

Several cases may be met:

(1) The recorded amount fills the whole area except the first position, for example:

blank 1,234,567.89

It must be printed: $1,234,567.89.

(2) A comma is in the position immediately on the left of the first significant digit:

blank 0,000,123.4

This amount must be printed: $123.4.

(3) A zero is immediately on the left of the first significant digit:

blank 0,000,012.34

This amount must be printed: $12.34.

(4) The recorded amount is less than 1. Therefore, the first significant digit is the parting sign between the whole part and the decimal part and is called the decimal point. A zero being immediately on the left of the decimal point, considered as first significant digit, the amount: blank 0,000,000.12 must be printed $.12. This case may be compared to the preceding case, if a decimal point is considered as a significant digit. It is sufficient to assume that in a numerical area the only non-significant digits are zero, comma and blank.

In the preceding examples, character $ is replacing a blank, a comma or a zero if they appear on the left of a significant digit.

The operation of this floating dollar device is entirely automatic. For a given storage field, it is simply started by means of a flexible connection which relates terminal $p$$ to the output terminal of the scanning chain B corresponding in this area to the lowest order.

During the forward scanning, i.e., from right to left, all the characters blank, zero or comma placed immediately on the left of a significant digit are respectively replaced by codes $, $\alpha$ and $\beta$. Then, during the reverse scanning, the first code $, $\alpha$ or $\beta$ is printed $ whereas all the following characters which can only be $\alpha$ or $\beta$ are respectively replaced by 0 or (,). In the following example:

Blank 01,004,600.75 for that storage field, it is the terminal corresponding to 5 which is connected to $p$$. After the forward scanning, the record is manifested under the form:

Blank $\alpha$1,0$\alpha$4$\beta$60$\alpha$.75

The code $\alpha$ which is situated most on the left is replaced by $. Code $\beta$ and the other codes $\alpha$ are replaced by (,) and 0. The quantity printed after the reverse scanning is: $1,004,600.75.

The print offset is controlled by a signal from logical "OR" circuit O$d$ (FIG. 4$l$); the output from O$d$ is connected to the input of inverter I$d$ (FIG. 4$t$), the output of I$d$ is connected to one input of $e$$ logical "AND"

circuit *e$*. Hub *p$* is connected to the second input of *e$*. When there is no print offset control signal, there appears a signal at the output of I*d* and an input of *e$* is favored. During the forward scanning of the storage terminal *p$* receives a pulse when the position most on the right of the storage field is reached. This pulse runs through "AND" circuit *e$* and then is applied to the slow input of diode gate P$ (FIG. 4*t*). The quick input of P$ receives advance pulses from chain A. The output of gate P$ is connected to the right input of trigger B$, to switch it on. Trigger B$ is switched off when the forward scanning operation reaches a position wherein a blank had been registered, i.e., the last area position. Said position is determined by means of logical "AND" circuit E*b* (FIG. 4*j*) the six inputs of which are connected to the left outputs of register triggers B1, B2, B4, B8, BA and BB. The signal at the output of P'$ switches trigger B$ off, when the scanning reaches the last position which is necessarily a blank. Trigger B$ may as well be switched off through diode gate P"$ which receives a pulse corresponding to the beginning of the backward scanning. As a conclusion, trigger B$ keeps "on" during the forward scanning of the storage fields where a floating dollar character may be printed, i.e., the fields wherein the position situated most on the right has been connected to hub *p$*. The signal appearing at the right output of trigger B$ is applied to an input of logical "AND" circuit EG (FIG. 4*t*). The second input of EG is favored by a signal which exists but if a significant digit is read from the position reached by the scanning chain. The existence of the significant digit is determined by the non-existence of a non-significant digit. The four inputs of logical "OR" circuit O*ns* (FIG. 4*t*) are connected respectively:

(1) to terminal ",", for inserting character comma, (2) to the output of logical "AND" circuit E*o*, the six inputs of which correspond to code $\bar{1}$, 2, $\bar{4}$, 8, $\bar{A}$, $\bar{B}$, that is 0.

(3) to terminal *b* for inserting a blank.

(4) to the output of logical "AND" circuit E*b*, the six inputs of which correspond to code $\bar{1}$, $\bar{2}$, $\bar{4}$, $\bar{8}$, $\bar{A}$ and $\bar{B}$, that is a blank.

Both last cases are distinct, one corresponding to the blank to insert and the other to the blank read out of the storage. On the other hand, the comma can result but from an insertion and the zero but from reading out of the storage.

At the output of the logical "OR" circuit O*ns* (FIG. 4*t*) the absence of signal indicates the existence of a significant digit and corresponds to the existence of a signal at the output of inverter I'*s*. The output signal from I'*s* is applied to an input of logical "OR" circuit O*s*; the other input of O*s* being connected to terminal "." which is used to insert the decimal point. At the output of O*s* there is a signal but if a significant digit or a decimal point has to be recorded in the position reached, said signal is applied to the input of inverter I*ns* and at one input of logical "AND" circuit EG (FIG. 4*t*).

If a zero, a comma or a blank was to be printed on the left of a significant digit, the following code α β and $ must be substituted to 0, comma and blank respectively.

On another hand, the second input of the EG being connected to the right output from trigger B$, there is a signal occurring at the output of EG but if both following conditions are simultaneously satisfied:

(1) Trigger B$ is "on."

(2) A significant digit or a decimal point must be printed in the addressed position. During the transfer of the information read out of the following position, the output signal from EG favors diode gate PG, the quick input of which receives advance pulses from chain B and is used to switch trigger BG on, on the termination of the read-out of a position storing a significant digit, during the following position read-out. Therefore, trigger BG is on during the read out of a position on the left of a significant digit or of a decimal point; it is off during the read out of the position on the left of a non-significant digit; for BG is switched off by the output pulse from diode gate PG the quick input of which receives advance pulses from chain B and the slow input connected to the output of inverter I*ns* receives a signal only if the read digit is not significant: zero, comma or blank.

Thus, trigger BG is "on" while characters zero, comma and blank may be replaced by α β and $, by means of corresponding logical "AND" circuits E'α, E'β, E$ and E'$ (FIG. 4*u*). The two logical circuits E$ and E'$ are used for replacing a blank with character $ the first one corresponds to the case when $ replaces a blank to be inserted, and the second when it replaces a blank already recorded into the storage.

E'α, E'β, E$ and E'$ are connected on one hand to the right output of BG, on the other hand: to the output of "AND" circuit E*o*, to terminal "," for inserting the comma, to the output of blank inserting "OR" circuit O'*b* through line L'*b* and to the output of AND circuit E*b* respectively.

The indications zero or blank read out from the storage must be clearly differentiated from the indications: comma, point or blank, from the corresponding terminal ".", ",", or *b* for which insertions are to be made. For an insertion control must be done prior to any other control; therefore the three terminals ".", ",", and *b*, are connected to the three inputs of a logical "OR" circuit O*i*. There is a signal appearing at the output of O*i* (FIG. 4*t*) only if one of these characters is to be inserted; in such a case, there does not appear a signal at the output of the inverter I*i* "AND" circuits E'α, E'$ and E*sub* are not favored. For example, in the position situated on the left of a significant digit and having stored a zero, if a comma is to be inserted, there will appear a signal at the output of O*i*, none at the output of I*i*, AND circuit E'α will receive two signals, one from BG, the other from circuit E*o*, the absence of signal at the third input of E'α will prevent 0 being replaced by code α, but AND circuit E'β will receive on both its inputs a signal from BG and another from terminal ",", and in this position, the comma will be replaced by code β.

If there is neither comma, nor point nor blank to be inserted, no signal appears at the output of I*i*, AND circuits E'α, E'$ and E*sub* are favored: zero may be replaced by α and a blank by $. Referring to logical AND circuit E*sub* the three inputs of which are connected to the output of BG, O*ns* and I*i* there will appear a signal at the output of E*sub* only for the positions on the left of a significant digit where no character is to be inserted, and where a zero or a blank must be replaced by a dollar sign. Thus the output signals from E*sub* indicates the existence of a character dollar to be substituted. It is applied to logical "OR" circuit O*sub* (FIG. 4*u*) which prevents the switching "on" of hold trigger B*m* and allows the advance of chain A, for sign $ must be substituted and not inserted; thus, it is useless to keep in the register the bits indicating the zeros and blanks which were recorded therein (see corresponding chapters; Insertion and Substitution).

The output signal from E'β applied to logical OR circuits O148 and OAC (FIGS. 4*w* and 4*n*) then O'1, O'4, O'8, O'A and O'C permits the insertion of code β: 1, 4, 8, A, C instead of the comma to be inserted. On the contrary, if trigger BG is off, there will appear a signal on the left output of BG; this signal is combined to that from terminal "," at both inputs of AND circuit E,. In this case, character β is not to be inserted instead of the comma and the signal at the output of E, runs through "OR" circuit O, then logical "OR" circuits O128 and OAC then O'1, O'2, O'8, O'A and O'C because the code for the comma is 1 2 8 A C.

The output signal from E$ applied to logical "OR" circuit O$ then to "OR" circuits O128 and OBC, then O'1, O'2, O'8, O'B and O'C allows the insertion of code $: 1 2 8 B C instead of the blank to be inserted. But if trigger BG is off, the signal from the left output of BG is combined with the signal controlling the insertion of a blank from "OR" circuit O'b through line L'b, at both inputs of "AND" circuit E'b. Then character $ is not to be inserted instead of the blank, and the signal at the output of E'b runs through "OR" circuits OC and O'C to insert code C which represents a blank.

The output signal from circuit E'$ is also applied to logical "OR" circuit O$ to replace the blank with code $. In that case $ replaces a blank recorded into the storage and not, as previously, a blank to be inserted; the operation to be effected is the replacement of an already existing information and not the insertion of a new information. In the case of a blank read out of the storage, it is useless to consider the case when BG is off, for if the blank read out of the storage must not be replaced by $, the blank is automatically transferred in zone B of the storage.

Code α is similarly substituted for code 0 read from the memory. Through "OR" circuits O28 and OA then O'2, O'8 and O'A, the output signal from E'α permits the replacing of zero by code α: 2, 8 and A.

On the termination of the forward scanning, the zeros, commas and blanks situated on the left of a significant digit have been replaced by α, β and $. During the backward scanning, that is from left to right, for each field, the first of the special character α, β or $ is replaced by code $ (first character means the character which in a certain field is in the position most on the left and which will be reached first during the backward scanning). The following characters which are necessarily α or β are translated back into 0 or ",". Indeed in a given field there will be at the utmost one single blank on the left of a significant digit; if it does exist, it is that blank which is the first special character and which has to be replaced by $. The α and β characters following it have to be translated back as 0 and ",". If there is none, it is the first α or β which must be replaced by $, the other α or β being translated back as 0 and ",". It is trigger Bαβ (FIG. 4k) that is used for this function. Bαβ is switched on either by a pulse indicting the existence of a blank and issued from logical "AND" circuit Eb logical "OR" circuit Ob through diode gate Pαβ, either via diode gate P'αβ by a pulse indicating the beginning of the backward scanning. Bαβ is switched "off" by the first pulse from inverter Is through diode gate P''αβ, said pulse corresponds to the signal which appears at the output of inverter Ix when a significant digit has been registered into the position read. Inverter Is has been described in chapter entitled "Check Protection Asterisk."

If the first special character reached by the reverse scanning is sign $, it is still transferred to memory area B, without undergoing any change. The following position being necessarily a significant digit, since $ is replacing a blank situated on the left of a significant digit, the signal from inverter Is will switch Bαβ off. The voltage at the left output of Bαβ is applied to an input of logical AND circuits eα and Eβ. The special characters α and β read out of the following positions of the storage field are detected by means of logical circuits Eα and Eβ. The output from Eα is connected to the other input of eα, the output of Eβ to the other input of eβ. The output of eα is connected to an input of logical OR circuit Oos (FIG. 4l), the output of which being connected to logical OR circuits OA then O'A allows to record a significant zero represented by bit A instead of α. Thus each code α is replaced by 0.

Replacing of code β by a comma is effected in the same way; the signal from the left output of Bαβ favors an input of logical AND circuit eβ; whenever code β is detected, the signal corresponding to the output of Eβ runs through eβ logical OR circuit O (,) (FIG. 4u) OR circuits O128 and OAC then O'1, O'2, O'8, O'A and O'C to register code comma: 1, 2, 8, A and C into the printing storage.

If the first special character reached by the backward scanning is not sign $, it means that the blank which was stored in the position most on the left of the storage field was not adjacent on the left to a significant digit. Thus this blank has not been replaced by sign $; when this position is read, a signal appears at the output of AND circuit Eb and favors gate Pαβ. Through line L'a, the advance pulse of the scanning chains which runs through Pαβ switches trigger Bαβ on. The right output from trigger Bαβ favors an input of AND circuit E''$. Through line Li a second input of E''$ is favored during the backward scanning. The third input of E''$ which is connected to the output of OR circuit Oαβ receives a signal indicating the existence of either code α or code β, since both inputs of Oαβ are connected to the outputs of AND circuits Eα and Eβ. The first detected special code α or β will run through E''$, OR circuit O$ then OR circuits O128 and OBC then O'1, O'2, O'8, O'B and O'C to record into the storage the information bits of character $: 1, 2, 8, B, C,. After having replaced special code α or β by sign $, the following position will be read. As α and β have been recorded on the left of a significant digit, in the backward scanning the following position will be necessarily storing that significant digit, and the signal corresponding to the output of inverter Is will favor gate P''αβ and will switch trigger Bαβ off. The left output signal from Bαβ favors AND circuits eα and eβ, and the special codes α and β which follow the first α or β just replaced by $, are respectively replaced by a significant zero and by a comma, by means of OR circuits Oos and O, as was explained a few lines above.

Trigger Bαβ is kept off until the end of the storage field scanning. A blank recorded in the following storage field will cause a signal to appear at the output of Eb and through Pαβ will switch trigger Bαβ on, making it possible, in case the connection of terminal p$ has also controlled the starting of the floating dollar device in this following field, to print again character $ immediately on the left of the high order significant digit recorded in said field.

BLANK INSERTION (FIGS. 4l AND 4m)

In editing an information line, the blank insertion device allows either to record a blank in a predetermined position of the printing storage or to insert a series of successive blanks.

The blank inserting function is done with priority over any other function of print editing.

To have the blank insertion device operating, there are provided three terminals designated as blank terminal b, blank starting pd and blank stop pa. But, otherwise than by connecting terminals b, pd and pa, it is possible to record blanks either in a given storage position or in a series of successive storage positions. As a matter of fact the recording of a blank may be controlled by the non-significant zero suppressing device, that is on the left of a given number; a blank is then to be substituted to a zero in the storage position wherein the zero to be suppressed was stored. On the left of the high order significant digit, the zero suppress device may as well remove the commas parting the three figures periods which therefore have also to be replaced by blanks. The sign detection device permits control of either the minus sign, CR character (credit) or blank insertions, if the quantity being positive characters minus and CR are not to be inserted. The sign detection device may as well control an offset in such a way that in some columns the creditor amounts are printed, whereas in other columns debitor amounts are printed; then that print offset must be done simultaneously with a blank insertion control, in the columns where the quantity is not printed.

To the four inputs of logical "OR" circuit O'b (FIG. 4m) there are applied signals which correspond to the various possibilities of blank insertion:

(1) Signals from terminal b, when said terminal is related through a flexible connection to the output terminal of the scanning chain B corresponding to the position where a blank is to be registered.

(2) Signals from the right output of trigger Bb which is switched on when a series of blanks is to be inserted.

(3) Signals logical "OR" circuit O"b and which will be studied in the chapters entitled "Zero Suppress" and "Sign Detection."

(4) The offset controlling signals from "OR" circuit Od. This circuit will be described in chapter entitled "Print Offset."

Thus, circuit O'b gathers all the various blank insertion controls, and the output signal from O'b is applied to the inputs of two logical "AND' circuits E$ and E'b described in the chapter entitled "Floating Dollar Device." If the second input of E$ is favored, that is if trigger BG is on, which corresponds to a position on the left of a significant digit, the blank is replaced by code $. On the other hand, if BG is off, E'b is favored and the blank is inserted by means of logical "OR" circuits OC and O'C, then logical "AND" circuit eC, to record bit C. The signal from eC switches on hold trigger Bm to maintain in the 7 trigger register the information which was read out and will be recorded later on. Through line Lb the blank insertion signal from O'b and the blank read signal from "AND" circuit Eb are combined in "OR" circuit Ob to effect other control functions: First in the floating dollar device:

(1) During the forward scanning, to switch trigger B$ off so as to stop the floating dollar control, when a blank does appear, that is at the end of a storage field.

(2) During a backward scanning, a blank switches on trigger Bαβ, so as to replace the first code α or β by $; and Second in the zero suppress device: During the backward scanning to switch on trigger Bo in order to suppress all the zeros following a blank.

Trigger Bb is switched on when there is to insert a series of successive blanks. When Bb is on, the signal appearing at the right output of Bb and applied to an input of "OR" circuit O'b operates as explained previously, permitting to insert blanks in all adjacent positions, and functions as previously, until trigger Bb is reset.

Bb is switched on, from the position following that where terminal pd is connected to that where terminal pa is connected. Terminal pd thus determines the starting of the blank insertion device, whereas terminal pa causes it to stop.

But the starting and stopping of the blank insertion trigger Bb may as well be controlled by the information offset device (see corresponding chapter). The output signal of this device is provided by two "OR" circuits, Od and Oa (FIG. 4l), the former determining the starting of the insertion of blanks caused by the offset, and the latter controlling the stop thereof. A blank is inserted in all the positions comprised between the starting and stopping positions. The signal appearing at the output of Od is combined with that from terminal pd in logical "OR" circuit O'd. The existence of either of these signals favors the slow input of diode gate Pb and the advance pulse A from line T'A which crosses Pb will switch trigger Bb on and start the blank insertion.

The insertion will stop in the position where the stop terminal pa is connected. The signal reaching terminal pa favors diode gate P'b; the advance pulse B, from line T'B runs through P'b and resets Bb. There are three other diode gates P'2, P'3 and P'4 the output signals of which allow to reset Bb and to stop the blank insertion.

The slow input of gate P'2 is connected to the output of "OR" circuit Oa. If the offset device controls a blank insertion stop, the output signal from Oa favors P'2 and the advance pulse A from line T'A will run through P'2 and reset Bb.

On the backward scanning initiation, there appears a signal at the output of gate P'3 which resets trigger Bb.

A signal appearing at the right output of skip control trigger BI favors the slow input of diode gate P'4 and advance pulse B from line T'B is used to reset Bb. Said gate P'4 is provided to stop a successive blank insertion, when a skip control has been performed.

When Bb is reset no signal appears at the right output of Bb, thus no blank is inserted; a signal appears at the left output of trigger Bb. Said signal appears but if there is no blank to insert, and permits any other insertion. On the contrary the absence of such signal indicates the existence of a blank to be inserted, and prevents from performing any other insertion. As a matter of fact the left output of Bb is connected to an input of logical "AND" circuit EI (FIG. 4o) an input of which is favored by one of the print edit terminals CI or punch edit terminals CP, another input is favored during times B through line TB. The output signal from EI is applied to an input of logical "AND" circuits e1, e2, e4, e8, eA and eB; thus these are favored when there is no blank to be inserted and they allow to record any other bit. On the contrary, when a blank or a series of blanks is to be inserted, no signal appears at the output of EI, circuits e1, e2, e4, e8, eA and eB are no more favored, only eC may be favored, only code C may be inserted, and thus the blank insertion has priority on any other recording. Such priority is effective as soon as trigger Bb is switched on again and can be interrupted only by the resetting of Bb.

ZERO SUPPRESS AND ZERO PRINT DEVICES (FIGS. 4t AND 4u)

Each storage field being preceded with a blank, said blank automatically starts a device of non-significant zero suppression, i.e., it erases all zeroes and commas parting the three figure periods, which are on the left of the high order significant digit.

There are two kinds of zeros differentiated by the machine:

The significant zeros, the code of which is A, and which are printed 0 by the machine.

The non-significant zeros, having 2, 8 and C as a code, which are ignored, that is replaced by code C blanks.

The zero suppressing device operates during the backward scanning, it starts as soon as there appears a signal corresponding to a read blank or a blank to be inserted into the storage. It allows to suppress all the zeros and all the commas as far as the first read significant digit. This operation is automatic and need not be cabled, that is the reason why there is no terminal controlling this device.

The zero suppressing device is primarily constituted by trigger Bo (FIG. 4t). This trigger is switched on by a signal from either diode gate Po or P'o. The slow input of Po is connected to the output of logical "OR" circuit Ob and receives a signal when a blank is read or must be inserted; Po quick input receives through line L'a advance pulses from the scanning chains. P'o slow input is connected to ground, so that P'o is always favored and a pulse corresponding to the beginning of the reverse scanning and which appears at its quick input runs through P'o to switch on Bo. The right output of Bo is connected to an input of logical "AND" circuit eo which thus is favored during the scanning of all the positions which are on the right of a blank and on the left of a significant digit. The second input of eo receives through line Li a signal but during the reverse scanning. The third input of eo is connected to the output of logical "OR" circuit Oo, described above in the chapter entitled "Check Protection Asterisk" (both inputs of Oo, are connected to the outputs of "AND" circuits Eo and E(,), the 6 inputs of which receive the storage readout signals $\bar{1}$, 2, $\bar{4}$, 8, $\bar{A}$ and $\bar{B}$ and 1, 2, $\bar{4}$, 8, A and $\bar{B}$, since zero corresponds to bits 2, 8 and C and the comma to code 1, 2, 8, A and C). The signal appearing at the output of eo thus indicates the existence of a zero or a comma in a position on the right of a blank and on the left of a significant digit during the backward scanning; to said zero or comma there must be substituted a blank and the signal at the output of eo runs through logical "OR" circuit O"b, then O'b so as to insert a blank according to the process described in the chapter entitled "Blank Insertion."

Trigger Bo is switched off by a pulse from diode gate P"o, the slow input of which is favored by a significant digit and its quick input through line L'a receives advance pulses from the scanning chains. The signal indicating the existence of a significant digit is provided by inverter Is (as described in chapter entitled "Check Protection Asterisk") when signals corresponding to $a$, $\beta$, zero and blank are simultaneously absent at the input of Is. When Bo is switched off a signal is applied from the left output of Bo to an input of "AND" circuit e'o, if a zero code 8 + 2 is read in any storage position, a signal will appear at the six inputs $\bar{1}$, 2, $\bar{4}$, 8, $\bar{A}$ and $\bar{B}$ of "AND" circuit Eo therefore at the output of Eo and will be applied to another input of "AND" circuit e'o; the third input of e'o is favored through line Li during the backward scanning. If these three conditions: existence of a zero, backward scanning, trigger Bo switched off are simultaneously satisfied, the zero is on the right of a significant digit; it must not be replaced by a blank; it must be printed and therefore it must be registered as a significant digit, that is with code A. The signal from e'o indicating the existence of a significant zero runs through logical "OR" circuit Oos, which permits to insert code A, after its having run through "OR" circuit OA and O'A successively, as described above in chapter entitled "Floating Dollar Device."

The operation of this automatic device for suppressing non-significant zeros, is started by a blank; however, there are three special cases:

(1) It is desirable to suppress zeros, but there was no room to record the blank starting the zero suppressing trigger Bo on the very left of the field.

(2) Zeros are wanted to be printed, in spite of a blank on the left of the storage field.

(3) Zeros are wanted to be printed in spite of the existence of several blanks in the storage field. The two latter cases may happen, for example when it is desired to print catalogue, stock, index numbers wherein the zeros on the left have a special meaning and have not to be replaced by blanks.

*First special case.*—Suppression of zeros, in spite of the absence of a blank, on the very left of a field, controlling the zero suppressing device. There is provided a terminal designated as zero suppression terminal psz (FIG. 4u). This hub is related through a flexible connection to the output terminal of the scanning chain B which corresponds to the position most on the left of the field where it is desired to suppress zeros. If in this storage position, a zero had been recorded during the forward scanning, the readout of this zero will correspond to a zero appearing at the six inputs of logical "AND" circuit Eo (FIG. 4j) and to the output of Eo which is connected to an input of logical "AND" circuit esz. The other input of esz being connected to terminal psz is favored when scanning chain B reaches the position from which zeros are desired to be suppressed. The output signal of esz has two functions: first, esz output being connected to an input of logical "OR" circuit O"b, it runs through O"b then O'b, E'b and Oc so as to record a blank in the storage (according to the process described in chapter entitled "Blank Insertion"), the insertion of bit C suppresses the signals which would permit a zero recording (as described in chapter entitled "Blank Insertion"). At the same time as a zero is replaced by a blank, the output signal from esz runs through logical "OR" circuit Osub and permits a substitution, i.e., prevents hold trigger Bm to be switched on and consequently allows restoration of triggers B2, B8 and BC of the register, as it is useless to maintain the information corresponding to code 0.

Upon the termination of the forward scanning, a blank has replaced a zero in the desired position. During the backward scanning the operation will be the same as in the general case described previously, that is, when the scanning will reach the position where this blank has just been recorded, the blank reading signal will put on trigger Bo and will start the zero suppressing device in the storage field.

*Second special case.*—Though there is a blank on the very left of the storage field it is desired to maintain the zeros recorded from a given location of the field. There is provided a terminal designated as "Zero Print Terminal" p'z (FIG. 4t). This terminal is related through a flexible connection to the output hub of scanning chain B corresponding to the field position from which it is desired to maintain the zeros situated on its right. This exception to the general case is specially advantageous when it is desired to print a decimal number, for example 0.5 and that it is necessary to maintain the zero of the whole part thereof. During the forward scanning, when the scanning chain B reaches the position connected to hub p'z, the signal runs through logical "OR" circuit Oz (FIG. 4t), then favors an input of logical "AND" circuit Ez, the other input of which is connected to the output of Eo. If a zero is read in this position the output signal from Eo will run through Ez and permit to substitute a significant zero (code A) to the zero recorded (code 2 + 8 + C). Therefore, on one hand, the output signal from Ez runs through "OR" circuit Osub then, through inverter Isub, prevents hold trigger Bm from being switched on, which allows to restore triggers B2, B8 and BC in the register thus preventing the maintenance of these zero bits. The output signal from Ez runs through Oos to record the bit A of the significant zero into the storage, through "OR" circuit OA, the recording of said code A providing a signal at the output of "OR" circuit OI (FIG. 4o) does not permit to record the read zero (code 2 + 8 + C) into the storage. After this replacement of a non-significant zero by a significant zero, during the backward scanning the zero suppressing automatic device will operate as described in the general case, blanks will be substituted to every zero, from the position of the blank situated most on the left, to the first significant digit. The connection with terminal p'z causes the zero on the right of which it is desired to print the other zeros to become significant. Thus, the first significant digit met during the backward scanning will be that significant zero which has been recorded during the forward scanning; the corresponding signal switches off trigger Bo (FIG. 4t) from this position through gate P"o. The left output of Bo favors logical "AND" circuit e'o and all the zeros situated on the right of this position are replaced by significant zeros. In short, the connection between hub p'z and the output terminal of the scanning chain B corresponding to a given position permits, during the forward scanning, the replacing of a zero by a significant zero, and during the backward scanning to print the zeros situated on its right.

*Third special case.*—It is wanted to print all the zeros between two given positions, in spite of the existence of several blanks in the storage field. This exception to the general case is interesting when it is wanted to print catalogue or stock numbers comprising a certain number of blanks and zeros in the same storage field and wherein the zeros having a signification must not be replaced by blanks. For example, let it be assumed that the digit to be printed is 001 02 03. During the backward scanning, every blank would risk to switch on trigger B$o$ and each time to start the zero suppressing automatic device, so that there would be printed 1 2 3. To avoid such suppression, there is provided a hub designated $pz$ which jointly used with hub $p'z$ described in the second special case, permits printing all zeros recorded between two determined positions. $pz$ being connected to the output terminal of the scanning chain B corresponding to a lower order position than the position connected to $p'z$, that is on its right. The device for maintaining zeros between two positions is substantially constituted by zero maintaining trigger B$z$ and three diode gates P$z$, P'$z$ and P"$z$. The slow input of gate P$z$ is related to terminal $pz$, that of gate P'$z$ to terminal $p'z$ and that of P"$z$ to ground. Thus gate P$z$ is favored during the forward scanning, when the scanning chain reaches the position from which the zeros are desired to be significant; P'$z$ is favored when the chain reaches the position up to which significant zeros are desired; P"$z$ is always favored. When P$z$ is favored, through line T'A an advance pulse from chain A runs through P$z$ and switches on trigger B$z$. The signal at the right output of B$z$ runs through logical "OR" circuit O$z$ and according to the process described in the second special case allows to replace all read zeros by significant zeros. When scanning chain B reaches the position connected to $p'z$ the gate P'$z$ is favored, an advance pulse from chain B runs through P'$z$ and switches B$z$ off. B$z$ may as well be reset at the beginning of the backward scanning, through P"$z$. At the end of the forward scanning, all the zeros comprised between the two positions connected to $p'z$ and $pz$ respectively are replaced by significant digits (code A); during the backward scanning the zero suppressing automatic device will operate as described in the general case, but will be inoperative upon the significant zeros, which thus will be printed.

INSERTION OF AN ADDITIVE "ELEVEN" (X OVER)
(FIGS. 4$d$ AND 4$e$)

This device permits to insert an eleven in the desired position, said information element being added to the information already stored in this position. It permits, when for example the thus edited line of information controls the punching of a card, the performation of the "eleven or X row" in certain columns left to the choice of the operator. This function is often used when it is desired to edit an information line which is to be punched in a card and more particularly for summary punch. It is quite obvious that instead of punching additive "elevens" it could be chosen to add the perforations in one or more other rows of the card, for example the "twelves row"; the device would then permit the insertion of additive "twelves." This additive perforation may be used either to characterize a special card (for example the master card) or to designate a negative quantity, or any other function. In the storage, it is bit B which corresponds to a perforation 11 performed in a card. This inserting device thus permits in one or more positions to add bit B to the information elements already existing. When the information line has been edited and that it controls the punching device, the just inserted additive bit B is so interpreted that B is translated by a perforation 11 in the card. It is obvious that this addition of bit B could alter the parity of the bit numbers recorded in the position ($s$) and it is necessary to take account of this in order to eventually correct bit C which depends on this parity; thus simultaneously with the addition of a B there is a verification and a correction of bit C.

There are provided two hubs, one designated as $p$11 (FIG. 4$e$) which permits in an unconditional way the addition of an eleven in the desired position and the other designated $p'$11 which records an 11 in the desired position but if certain conditions are satisfied, for example, the insertion of an 11 may be conditioned by the sign of the quantity to be registered, so that the 11 is added but if the quantity is negative. These hubs may be related by a flexible connection to any or several of the 120 output terminals of the scanning device B. When device B reaches the corresponding position, the signal issued by this terminal energizes the control hubs of the 11 inserting device.

Hub $p'$11 is connected to one input of logical "AND" circuit $e$11 which thus is favored during the scanning of the position where it is desired to insert an 11. The second input of $e$11 receives a signal from the right output of sign recording trigger B—; it is favored but if the quantity sign is negative. A signal appears on $e$11 output if both inputs are favored simultaneously. It is quite obvious that if the signal corresponding to the existence of any other condition had been applied to the second input of $e$11, the output from $e$11 would have existed for the chosen position, only if this condition had been satisfied.

Thus, the existence of a signal at the output of $e$11, just as the existence of a signal at terminal $p$11, results in controlling an unconditional insertion of 11; therefore, the outputs from $e$11 and hub $p$11 are connected to both inputs of logical "OR" circuit O11. The output signal from O11 is applied to an input of logical "AND" circuit E11, the second input of which receives, through line TB, a signal which lasts during times B. Thus, a signal appearing at the output of E11 means first that bit B is to be recorded (corresponding to 11), and secondly that eventually bit C is to be corrected (in case the parity has been altered through the inseration of a B). The output signal from E11 is applied to an input of logical "OR" circuit O'11 (FIG. 4$g$) which it crosses, then to an input of logical "AND" circuit E'B of the regeneration device after which the signal runs through the normal way OB, IB, GB (FIGS. 4$n$, 4$o$ and 4$i$) successively, to record bit B into the storage in the desired position. As to the correction of bit C, it has to take place but if the parity of the number of bits has been altered, that is if bit B did not exist. For in all other cases: if bit B is not to be inserted, or if it is to be inserted though it existed previously the parity of the bit numbers is not alterated. The two following conditions: absence of bit B and control of its insertion are sensed by means of two signals applied to both inputs of logical "AND" circuit C'$ch$, the former being provided by the right output of trigger BB (FIG. 4$j$) of the register, through line 1B, "AND" circuit $e'$B (FIG. 4$g$) then inverter I11, the latter from the output of logical "AND" circuit E11. The ouputs from I11 and E11 are connected to both inputs of C'$ch$. When both these conditions are simultaneously satisfied, there appears a signal at the output of logical "AND" circuit C'$ch$ and this signal controls the change of bit C, i.e., if C existed, it has to be suppressed, if not, it has to be recorded, so that the number of bits is always odd. This bit C change control is combined with another bit C change control which could eventually occur during a sign detection and the suppression of bits A and B, which such detection causes. That combination of two C change control permits to effect a change of C code only if a single C change has been controlled; for if two C changes have been simultaneously controlled, it results in no change at all, the parity being kept the same. The combination of both C change control will be studied in the following chapters.

SIGN DETECTION—INSERTION OF MINUS, CR CHARACTERS—PRINT OFFSET IN ACCORDANCE WITH THE SIGN
(FIGS. 4$d$, 4$e$, 4$f$, 4$g$, 4$l$ AND 4$m$)

These devices are provided to edit the print line while inserting minus sign — or CR characters (credit) on the right or on the left of the quantity to be printed, if it is negative. They also allow printing of positive quantity in a certain number of columns, while other columns are intended to receive it if it is negative.

It is quite obvious that these minus and CR inserting devices insert blanks when the quantity is positive. In the offset device, the two fields which are to receive the read information must be adjacent, said information being printed in one of them, whereas there are registered but blanks in the other.

There are provided a number of hubs, a terminal for controlling the insertion of CR or minus sign $pCR-$ on the right of the amount to be printed, and two sets of two terminals $jG$ and $j-$, connectable with a jumper, a set $jG$ controlling the insertion of CR or of minus on the left, and the latter $j-$ controlling the insertion of $-$. For the offset, a hub $pUD$ determines the unit position in the right field while a second hub $pUG$ determines the unit position in the left field; normally the left field receives the debitor amounts, whereas the right field receives the creditor amounts. A set of two terminals designated as $jD$ allows to interchange therebetween. The fields may be readily interchanged through a jumper short-circuiting the terminals of set $jD$ so as to print the debitor amounts on the right and the creditor amounts on the left. To effect such CR and $-$ inserting functions or offset function, it is compulsory to detect the sign of the quantity to be registered; therefore, hubs $pCR-$ and $pUD$ which start these functions simultaneously control the sign detection. There is provided an additive terminal, $p-$ which also starts the sign detection device. This terminal may be related through a removable connection to an output terminal of scanning chain B corresponding to any position, and then receives a pulse when scanning chain B reaches this position.

Figures 3, 5:
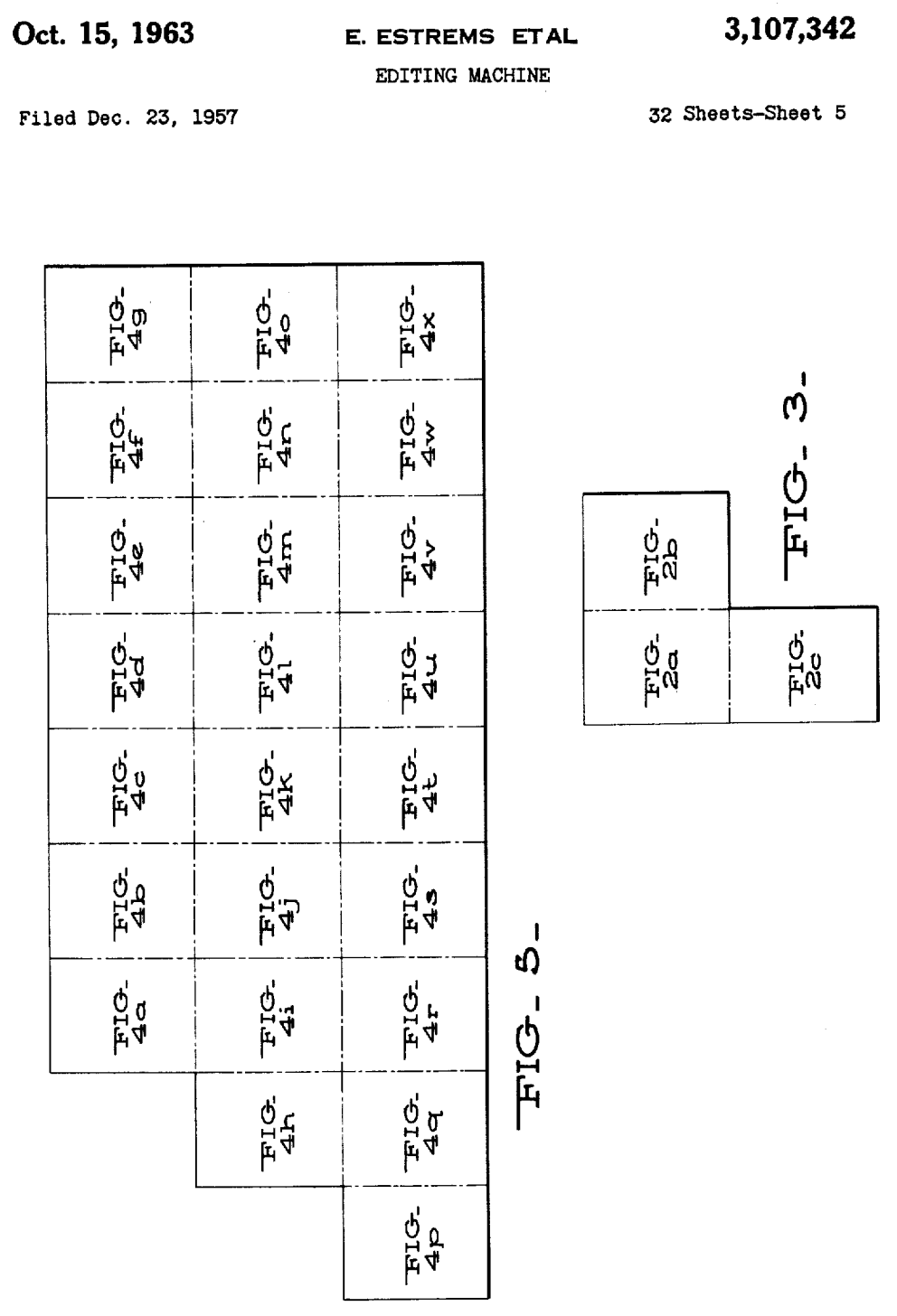

A negative quantity is recorded into the memory by bit B registered in the unit position of the memory field. Bit B may correspond to a perforation in card row 11 or else be inserted by the arithmetical part of the machine. Thus, bit B is read simultaneously with the digit registered into the memory in this position; it is necessary to avoid their combination to be interpreted as an alphabetical character. For example, there would not be any difference between figure $-1$ and letter J both having 1, B, C as a code. Similarly, $-3$ and L would be both coded 1, 2, B. But the operator knows the storage fields which are to receive the numerical characters and those for alphabetical characters. If it is a numerical area, the operator will translate $\overline{3}$ by printing figure 3 and either CR or $-$, or by printing the quantity in different columns.

Figure 41:
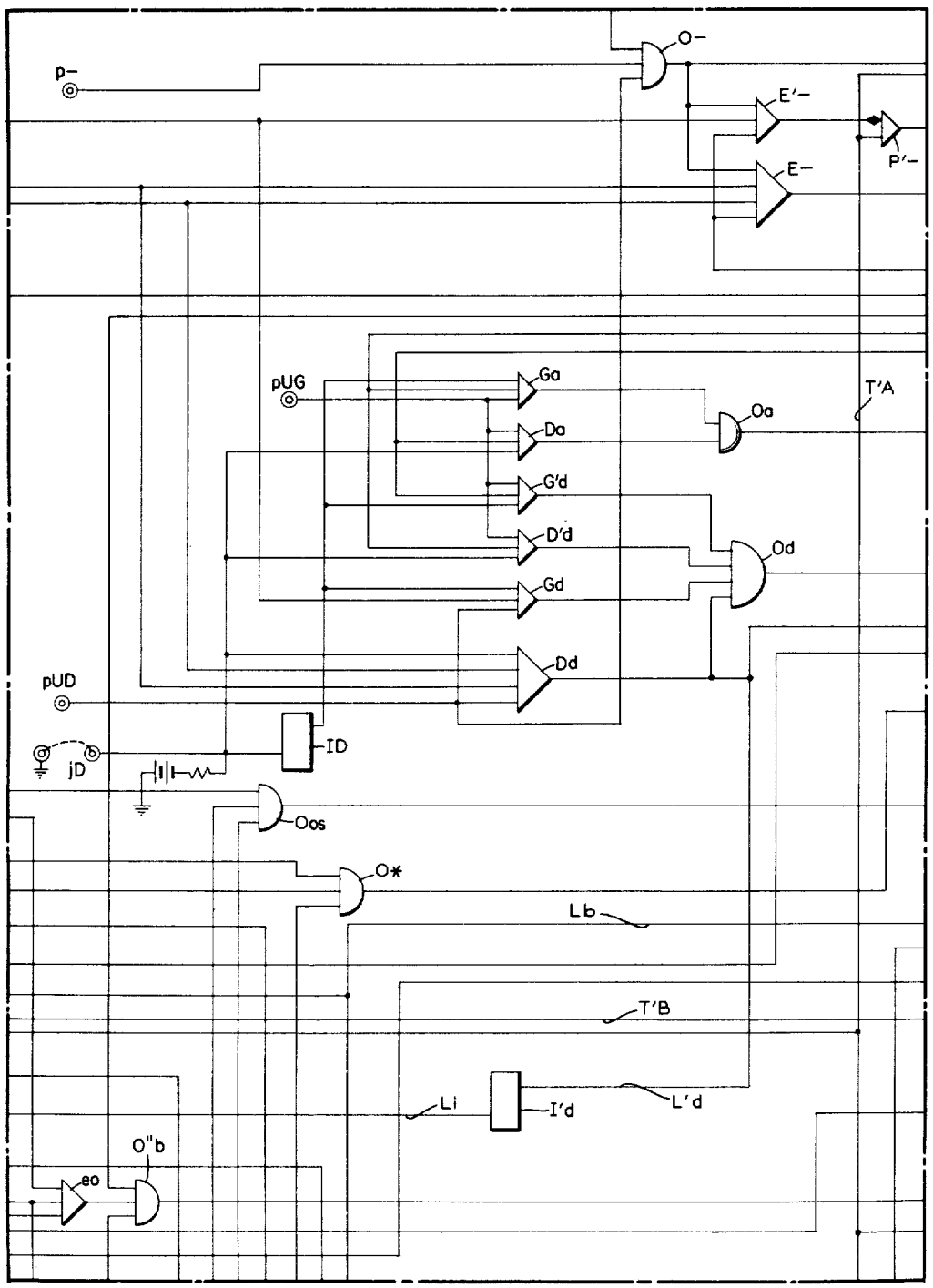

The sign detection device may be started by the operator which controls the CR or $-$ insertion, the offset or the sign detection, terminals $pCR-$, $pUD$ or $p-$ when he knows a field to be numerical. The sign detection device senses the presence or absence of the sign in the determined position; the sign is recorded in a trigger $B-$ where it is stored until another sign detection. Sign trigger $B-$ is switched on but by a negative sign; besides, to avoid all confusion between numerical and alphabetical characters, the sign detecting device starts a suppression of bits A and B which lasts up to the program end or as far as a position connected to an alphabetical terminal $pd$. This suppression of bits A and B is automatically accompanied with a correction of bit C; since C has been chosen so that the total number of bits representing a digit or a character is odd, it is necessary to make for the fact that the suppression of A and B may change the parity, so C is to be corrected, to prevent the parity check device from detecting an error that would stall the machine. Such suppression of bits A and B is necessary because, if the sign is not erased, the printing of the unit position would correspond to a letter. If the information proceeding from the arithmetical part of the machine is only composed of digits, it is not the same in the input memory where the numerical information punched in a card may be combined to perforations on rows 11 or 12 for instance, to characterize various types of cards, and in that case, the suppression of bits A and B would be indispensable. The sign detection (registering in sign trigger and suppression of A and B) may be indifferently controlled either by hub $pCR-$ which controls CR or $-$ insertion on the right side, or by hub $pUD$ which controls the offset, or by sign detection hub $p-$. One of these three hubs must be connected to the output hub of the scanning chain B which corresponds to the unit position of the storage field, that is to the position where the sign is recorded as bit B. The three hubs $pCR-$, $pUD$ and $P-$ are connected to the three inputs of logical "OR" circuit $O-$ (FIG. 41). The signal at the output of $O-$ initiates the suppression of bits A and B and permits to record the sign in trigger $B-$.

1—SUPPRESSION OF BITS A AND B—CORRECTION OF C (FIGS. 4d, 4e, 4f AND 4g)

The output signal from $O-$ favors the slow input of diode gate $Pn$; through line T'A, the progression pulse A runs through $Pn$ and switches on numerical trigger $Bn$ which erases bits A and B, while it is on. When numerical trigger $Bn$ is on, the only bits 1, 2, 4, 8 and C read out of storage field A may be recorded into field B. The readout information is translated as a purely numerical information. Trigger $Bn$ remains "on" up to the moment when it is switched "off" by a pulse from alphabetical terminal $pd$ through diode gate $P'n$; as soon as $Bn$ is switched off, bits A and B are no more suppressed, and the alphabetical translation is resumed until trigger $Bn$ is switched on again.

When $Bn$ is on, the signal appearing at the right output of $Bn$ favors logical "AND" circuit $En$, through line TB the second input of $En$ receives a signal which lasts during time B, the output signal from $En$ is applied to the input of inverter $In$. $In$ output is connected to an input of both logical "AND" circuits $e'A$ and $e'B$. The signals read out of storage field A are amplified by amplifiers A1, A2, A4, A8, AA, AB and AC, then recorded in to corresponding triggers B1, B2, B4, B8, BA, BB and BC of the register. The signals corresponding to bits A and B are applied via line LA and LB, from the right output of triggers BA and BB to the second input of logical "AND" circuits $e'A$ and $e'B$. During time B, while recording into storage field B. circuits $e'A$ and $e'B$ are not favored and line LA and LB interrupted, if there does not appear a signal at the output of $In$; thus if there is a signal appearing at the input of $In$ and at the right output of $Bn$; i.e., bits A and B are not recorded into the storage field B when trigger $Bn$ is on. Conversely, diode gate $P'n$ is favored when scanning chain B reaches a position connected to alphabetical terminal $pd$, $Bn$ is switched off, there is no signal at the right output of $Bn$ nor at the input of $In$; there appears a signal at the output of $In$ which favors "AND" circuits $e'A$ and $e'B$ and permits to keep bits A and B, thus to interpret alphabetical information. During a cycle A, an input of $En$ being never favored, there cannot be any signal at the input of $In$, thus the signal appearing at the output of $In$ during the whole cycle A, favors an input of "AND" circuits $e'A$ and $e'B$; lines LA and LB are not interrupted, which permits during cycle A, to record all bits, A and B included, in storage field A.

But during times B this suppression of bits A and B must be accompanied with a check of code C which depends upon the parity, thus may be altered when A and B are suppressed. In case both bits A and B are suppressed together, the parity is not altered, in case neither A nor B exists, this suppression causes no change, but if only bit A or bit B exists and is suppressed the parity is altered and bit C must be changed: if it does exist, it must be erased, and if not, it must be generated. The code C correction control device is substantially composed of an exclusive "OR" circuit, i.e., a circuit having two inputs and producing an output signal if a signal appears at one only of these two inputs. The exclusive "OR" circuit is composed of a logical "OR" circuit O'AB, an inverter IAB and two logical "AND" circuits EAB and Cch. The right outputs of triggers BA and BB are connected to the inputs of both circuits O'AB and EAB. The output of EAB is connected to the input of IAB. The outputs of En, IAB and O'AB are connected to the three inputs of "AND" circuit Cch. Thus, there will be a signal at the output of Cch if the three following conditions are satisfied simultaneously:

(a) Bits A and B are to be suppressed, if they exist, signal from En.

(b) Bits A and B do not exist simultaneously, signal from IAB.

(c) Bit A, bit B or both A and B exist, signal from O'AB.

These three conditions are sufficient to cause a change of bit C and the signal appearing at the output of "AND" circuit Cch controls the change of code C. As described in chapter entitled "Insertion of an Additive Eleven," the output signal of logical "AND" circuit C'ch, controls as well as the change of C. Both C correction controls are combined so as to perform a change of the C code if only one C correction is controlled; if both C corrections are controlled or if none of them occurs, C is not changed. This function is performed by means of an exclusive "OR" circuit (FIG. 4e) comprising logical "OR" circuit Och, inverter I'ch and both logical "AND" circuits ech and e'ch. Outputs of Cch and C'ch are connected to the inputs of both circuits Och and ech. The output of ech is wired to the input of I'ch. The outputs of I'ch and Och are connected to both inputs of e'ch. There will be a signal at the output of e'ch, if one bit C change has been controlled, and only one, owing to either the suppression of bits A and B or to the adjunction of an "eleven" perforation. The existence of a signal at the output of e'ch corresponds to a parity alteration; bit C must be corrected: if it did not exist, C has to be recorded and if it existed, C must be suppressed.

The two possible cases wherein bit C must be recorded, are the following:

(1) Bit C did not exist and must be changed.

(2) Bit C did exist and is correct.

In the first case, the output signal from e'ch which corresponds to the C correction control is applied to an input of logical "AND" circuit E'ch and the signal at the left output of register trigger BC which corresponds to the absence of C is applied to the second input of E'ch. When both these conditions are met simultaneously, both inputs of E'ch are favored, the output signal from E'ch runs through logical "OR" circuit Co and permits to record bit C, through "AND" circuit E'C, "OR" circuit oC, inverter IC and core driver GC.

In the second case, the output of e'ch being connected to the input of inverter Ich and the output of Ich to an input of Ech, the absence of signal at the output of e'ch corresponds to a correct C and to the existence of a signal at the output of Ich; the signal at the right output of register trigger BC corresponds to the existence of a C: such signal is applied to the second input of Ech. The output signal from Ech crosses "OR" circuit Co and allows, as in the first case, to record bit C.

In the other two possible cases:

(1) C exists but must be changed.

(2) C does not exist and no change is to be effected, bit C is not recorded.

2—SIGN RECORDING IN TRIGGER B— (FIG. 4m)

Besides bits A and B suppression and code C correction resulting therefrom, the output signal from circuit O— starts a sign detection and recording into sign trigger B—. Trigger B— is switched "on" if the sign is negative and B— remains "on" until the program controls a new sign detection which could eventually change the state of B—. Similarly, if the sign is not negative, trigger B— is switched "off" and will eventually be switched "on" only during the following sign detection.

If the sign read in a position is negative, code B, in the register, read trigger BB is on, while BA is off. The signals appearing at the right output of BB and at the left output of BA favor two inputs of logical "AND" circuit E— (FIG. 4l). A third input of E— connected to the left output of blank inserting trigger Bb is favored during the scanning of the positions where blanks are not to be inserted. The fourth input of E— is favored by the output signal from O—, i.e., for the positions where a sign detection is controlled. Thus, circuit E— is used to detect the sign because when the four preceding conditions are met simultaneously, a signal indicating the existence of a negative sign appears at the output of E—, and this signal favors the slow input of diode gate P— (FIG. 4m). P— quick input receives through line T'A advance pulses from chain A; the pulse corresponding with the favored state of P— slow input, switches trigger B— on. Thus, the on state of B— corresponds to the existence of a negative sign. Trigger B— is used to record the detected sign and to keep it stored; thus the sign so recorded is kept determined and may be used for all the field positions. Trigger B— remains "on" until a position is reached where another sign detection control senses the absence of a negative sign and switches the trigger "off." As a matter of fact, the minus sign being detected by the existence of bit B and the absence of bit A: $\overline{A}$, B; the absence of minus sign will be detected by all the other possible combinations of bit A and B. The other combinations are AB, A$\overline{B}$ and $\overline{AB}$, the dash over the bit indicating the absence of such an element. A signal corresponding to these last three possibilities is generated at the output of logical "OR" circuit OA$\overline{B}$ (FIG. 4j) the two inputs of which are related to the right output of read trigger BA and at the left output of BB. No signal will appear at the output of OA$\overline{B}$ for the positions where sign minus $\overline{A}$B has been recorded. A signal will appear for all the positions where there is no minus sign; this signal is applied to one of the three inputs of logical "AND" circuit E'— (FIG. 4l). Both other inputs of E'— receive, as was the case for E—, the signal from the left output of blank inserting trigger Bb for the positions where blanks are not to be inserted and the control signal for a sign detection from O—. The output signal from E'— favors the slow input of gate P'—. The quick input of P'— receives, through line T'A advance pulses from chain A; the pulse corresponding with the existence of a signal at the output of E'—, resets trigger B—. The sign trigger then records the absence of a negative sign.

3—CR CHARACTER AND MINUS SIGN INSERTION (FIGS. 4d AND 4c)

When the information corresponding to the minus sign or to the absence of sign is stored in trigger B—, it is available at the right and left outputs of B—. This information may be used for inserting characters CR, —, or for the offset. Generally when the quantity to be printed is negative, CR is inserted on the right, but the device readily allows the printing of CR on the left of the quantity; as well, minus sign may be printed on the right or on the left of the quantity. It is quite obvious that it is not possible to print simultaneously minus sign and CR characters. If the quantity to be printed is not negative, trigger B— is off, and in the position which is to store the — sign or in the two positions which are to receive C and R, it is necessary to record the code corresponding to the blank once or twice. Thus, the CR or — printing device is controlled by sign trigger B—.

The operator may meet with four combinations, the first one being the general case, and the three other special cases:

To print CR on the right of the amount,

To print — on the right of the amount,
To print CR on the left of the amount,
To print — on the left of the amount.

There are terminal pCR— and two sets of two terminals designated as minus terminals j— and left terminals jG. Each set is provided with jumpers which allow to connect both terminals. Set j— permits to select between CR and — and set jG between the printing on the right and on the left. More precisely, if both terminals of j— are related, character — is printed, and if they are disconnected, characters CR are printed. If jG is short-circuited, the printing is effected on the left; if not, it is done on the right. Terminal pCR— determines the position where characters CR or — have to be printed; for that reason, terminal pCR— has to be wired by a flexible connection to the output terminal of scanning chain B corresponding to the position where the R (of CR) or the minus sign is to be printed. Particularly, pCR— must be wired to the unit position in case CR or — have to be printed on the right. To avoid to connect the unit position of a field with hub pCR— and at the same time with hub p— which controls a sign detection, the CR or — insertion on the right automatically starts a sign detection. While the printing of CR or — on the left does not start a sign detection, that is if a jumper short-circuits both terminals of the left set jG, the sign detection is not automatic; to be started, terminal p— has to be connected to the output terminal of scanning chain B corresponding to the unit position of the quantity to be printed.

In case the printing of CR on the right or on the left, it will suffice to connect pCR— to the position where it is desired to print the R, and automatically character C will be printed in the adjacent left location.

(a) *Insertion of CR on the right of the quantity.*— As this is the most frequently desired case, it needs a minimum number of connections. As a matter of fact, it is sufficient to wire by a flexible connection hub pCR— to the output hub of scanning chain B corresponding to the unit position. Both jumpers are removed, so that, for each set j— and jG, no connection is made between both terminals. One of the terminals of jG is wired to ground, the other to the input of inverter IG; likewise one of the terminals of set j— is connected to ground and the other is connected to the input of inverter I—. If no jumper is used, no signal is applied to the inverter input, and a signal appears at the inverter output. An output signal from IG means that the characters CR must be printed on the right of the quantity and is applied to an input of logical "AND" circuit Ed, favoring it thereby. When the unit position of the quantity to be printed is reached by scanning chain B, the pulse reaching terminal pCR— favors the second input of logical "AND" circuit Ed; the output signal from Ed runs through logical "OR" circuit O— to start a sign detection and a bit A and B suppression, according to the previously described process. Thus, the sign detection is automatically controlled when it is desired to print CR or — on the right, and this automatic characteristic permits to avoid to connect the two hubs pCR— and p— to the same terminal of scanning chain B. The control pulse which reached hub pCR— effects other functions. It permits the insertion of character R or a blank according whether the sign trigger is on or off. As a matter of fact, it favors an input of logical "AND" circuit ER and it runs through logical "OR" circuit bo to favor an input of logical "AND" circuit eb. The second inputs of ER and eb are wired to the right and left outputs of sign trigger B— respectively; either one or the other is favored according whether trigger B— is on or off. Circuit ER is provided with a third input which being connected to the output of inverter I— is favored, since no jumper short-circuits both terminals of set j—, and since thus no signal is applied to the input of I—. The output signal from circuit ER runs through logical "OR" circuit OR (FIG. 4m); the second input of OR is related to terminal R which permits to insert character R. The output signal from OR runs through logical "OR" circuits O18, OB, O'1, O'8 and O'B, so as to store bits 1, 8 and B into the storage. The recording of these bits prevents from recording the digit previously placed in the unit position into the storage, by means of logical "OR" circuit OI and "AND" circuits E'1, E'2, E'4, E'8, E'A, E'B and E'C; it switches on hold trigger Bm which stops the advance of the storage scanning chain A, and prevents the restoration of the register triggers B1, B2, B4, B8, BA, BB and BC, wherein there had been recorded the bits of the unit position. Thus, these triggers keep the unit digit stored.

If sign trigger B— is off, the signal appears at the left output of B—, the quantity to be printed is not negative, CR is not to be recorded but two blanks instead. The output signal from "AND" circuit eb runs through "OR" circuits O"b (FIG. 4l) then O'b, "AND" circuit E'b, "OR" circuits OC and at last O'C which allows to record into the memory the bit C corresponding to a blank. As was seen previously for the insertion of character R, the insertion of a blank prevents, through "OR" circuit OI and "AND" circuits E'1, E'2, E'4, E'8, E'A, E'B and E'C, from recording into the storage the digit existing in the unit position; it switches on hold trigger Bm which stops the advance of storage scanning chain A and prevents the resetting of triggers B1, B2, B4, B8, BA, BB and BC, so as to keep in the register the information corresponding to the unit position.

The signal occurring on hub pCR— when scanning chain B reaches the unit position performs another function; it switches on trigger BCR, which permits for the negative amounts to record bits corresponding to character C in the position on the left of that wherein character R had been recorded, and for the positive amounts, BCR permits to record bits corresponding to a blank.

As a matter of fact, hub pCR— is wired to an input of logical "AND" circuit eCR; the second input of eCR is related to the output of inverter I—. Thus, both inputs of eCR are favored when hub pCR— receives a pulse, since no jumper is short-circuiting the two terminals of set j—. The output signal from eCR favors the slow input of diode gate PCR, the quick input of PCR receives advance pulses from output storage scanning chain B; the output pulse from PCR will thus be posterior to the recording of character R and will be used to switch on trigger BCR during the scanning of the position on the left of R. The right output signal from BCR is applied to an input of both logical "AND" circuits ECR and e'CR and of logical "OR" circuit bo, which are then favored during the scanning of the position on the left of R. The second input of ECR is connected to the right output of trigger B—; if the sign of the quantity is negative, the signal appearing at the output of ECR runs through "OR" circuit OCR (FIG. 4m), the second input of OCR being connected to terminal C which permits to insert character C. This signal is used to record into the position on the left of R bits 1, 2, A, B and C which correspond to letter C. This insertion of letter C as all preceding insertions prevents from recording the information read out of the storage, that is the digit in the unit position, also prevents it from being erased from register triggers B1, B2, B4, B8, BA, BB and BC and besides stops the advance of memory scanning chain A. According to a process similar to that described in accordance with the preceding position, if trigger B— had been off, there would have been no signal at the output of ECR, letter C would not have been inserted, but the signal appearing at the right output of BCR which runs through "OR" circuit bo and favors an input of logical "AND" circuit eb, and the signal at the left output of B— which favors the second input of eb produces a signal at the output of *eb* and this signal, as previously, controls the insertion of a blank.

The signal at the right output of BCR favors an input of "AND" circuit *e'*CR, the signal corresponding to the absence of a skip control is derived from the left output of skip trigger BIII and favors the second input of *e'*CR. The output signal from *e'*CR favors the slow input of gate P'CR. The advance pulse from the output storage scanning chain B runs through P'CR and switches trigger BCR off. When letters R and C have been inserted, in case the quantity is negative, or when two blanks have been inserted in case the quantity is not negative, the information read out of the unit position, registered and stored in register triggers B1, B2, B4, B8, BA, BB and BC is recorded into the storage on the left of the position where C has been recorded. Then, the storage scanning chain A resumes its advance and the transfer of the quantity is normally performed, position by position, from field A to field B, in the same way as a transfer performed after one or more insertions.

(b) *Insertion of character "—" on the right of the amount.*—Hub pCR— is wired through a flexible connection to the output terminal of the scanning chain B corresponding to the unit position, that is that where the sign had been recorded. A jumper short-circuits both terminals of set *j*—, but none is short-circuiting the two terminals of set *jG*.

In that case as well, it is useless to connect hub *p*— to the unit position, since the sign detection and recording, and bits A and B suppression device is automatically started during the unit position scanning by the pulse from hub pCR—. The absence of a jumper short-circuiting both terminals of set *jG* corresponds to the absence of a signal at the input of inverter IG; the output signal from IG favors an input of logical "AND" circuit E*d*; the pulse from pCR— runs through circuit E*d*. As was explained when CR was to be inserted on the right, the output signal from E*d* starts a sign detection and a suppression of bits A and B.

The jumper which connects both terminals of set *j*— permits the application of a signal at the output of inverter I— and to favor an input of logical "AND" circuit *e*—. No signal will appear at the output of inverter I— and "AND" circuits ER and *e*CR having a non-favored input, character R is not inserted and trigger BCR is not switched on. The second input of circuit *e*— is favored by the pulse from hub pCR—. If the sign of the quantity is negative, trigger B— is on and its right output favors the third input of circuit *e*—. The output signal from *e*— runs through logical "OR" circuit O'— (FIG. 4*v*); the second input of O'— being connected to terminal "—" which controls the insertion of character "—". The output signal from O'— runs through logical "OR" circuits OB then O'B and records into the memory bit B which corresponds to character "—". On the contrary, if the quantity is not negative, trigger B— is off and its left output favours an input of *eb*; the second input of *eb* is favoured by the output pulse from OR circuit *bo* and derived from hub pCR—, and the output signal from *eb* is used to record bit C, i.e., to insert a blank. Be it inserted a blank or character "—", in both cases this insertion coincides with a stop of the scanning chain A and with the recording into the trigger register of the digit read out of the unit position. During the following cycle, this digit is recorded in the storage position situated on the left of this blank or of this "—", and then the scanning chain A resumes its advance.

(c) *Insertion of characters CR on the left of the quantity to be printed.*—Hub pCR— must be connected to the output terminal of scanning chain B corresponding to the position where an R is to be printed. A jumper must connect the two terminals of set *jG*, but the two terminals of set *j*— are not short-circuited. As the sign of the quantity to be printed is stored in the unit position, to record such sign it is necessary to connect hub *p*— to the output terminal of scanning chain B corresponding to the unit position, since the sign detection and the suppression of bits A and B is no more automatically started by pCR—; as a matter of fact, the output signal from AND circuit E*d* is absent since the connection between both terminals of *jG* permits the application of a signal at the input of inverter IG, thus there is no signal at the output of IG and an input of logical AND circuit E*b* is not favoured.

During the scanning, from the unit position, the sign is recorded in trigger B—; then the quantity to be transferred is normally recorded; when the scanning chain reaches the position wherein character R is desired to be printed; hub pCR— favours an input of AND circuits ER, *e*CR, *e*— and AND circuit *eb*, through OR circuit *bo*, while the sign is already recorded into trigger B—. The absence of a jumper between both terminals of *j*— permits through inverter I—, to favour an input of ER and *e*CR; on the contrary an input of *e*— will not be favoured.

If trigger B— is on, the quantity is negative, and the third input of ER is favoured also; the signal at the output of ER is used to insert character R.

If trigger B— is off, the signal appearing at the left output of B— favours an input of *eb*, and the bit corresponding to the blank will be recorded into the storage.

Moreover, the signal at the output of *e*CR favours the slow input of gate PCR, so that trigger BCR will be switched on by the advance pulse from the storage scanning chain B, i.e., as in the general case, trigger BCR is on during the recording into the position on the left of that where R has been recorded (or the blank, if the quantity is positive). In this position trigger BCR either inserts character C if the quantity is negative through AND circuit ECR, or inserts a blank if the quantity is positive, through OR circuit *bo* then AND circuit *eb*, and through AND circuit *e'*CR it conditions its resetting. It is quite obvious that in this particular case as well as in the preceding cases, any insertion of a blank or of a character is followed with the stop of the scanning chain A, of the recording and of the maintenance of the read out information in the trigger register.

(d) *Insertion of character "—" on the left of the quantity to be printed.*—Hub pCR— is connected to the output terminal of scanning chain B corresponding to the position where "—" is to be printed. A jumper is connecting both terminals of set *jG* and another jumper is connecting both terminals of set *j*—. Both inverters IG and I— receive a signal at their input and provide no output signal. The absence of a signal at the output of IG prevents AND circuit E*d* from being favoured. The sign detection being no more automatically detected, it is necessary to connect hub *p*— to the output terminal of scanning chain B corresponding to the unit position, i.e., where the quantity sign is stored. Being sensed from the unit position, the sign is recorded into trigger B— and is still recorded when the chain reaches the position where "—" is to be printed. The jumper short-circuiting the two terminals *j*— favours an input of logical AND circuit *e*—. The absence of a signal at the output of I— prevents AND circuits ER and *e*CR from being favoured and the absence of signal at the output thereof prevents character R from being inserted and trigger BCR from being switched on, thus character C from being inserted. If trigger B— is on, character "—" is inserted through circuit *e*— and if B— is off it is a blank which is inserted through "OR" circuit *bo* then "AND" circuit *eb* in the position where "—" was to be printed. Just after this insertion, the storage scanning chain A resumes its advance.

4—OFFSET DEVICE

This device is used to print a quantity in a certain field, if it is positive, whereas another field is provided for printing that quantity if it is negative; so that if it is desired to make out a bill of accounts, all the positive quantities are aligned in a number of columns, while other columns are assigned all the negative quantities. The two fields which are to receive the positive and negative quantities may be either adjacent or separated by a certain number of blanks. According to its sign the information is printed in one of the two fields while in the other field only blanks may be registered.

Generally, the left field is assigned the debitor amounts, i.e., the positive quantities, while the right field is affected to creditor amounts or negative quantites. But the offset device readily permits, by means of a two terminal set jD and of a jumper short-circuiting the two terminals, the interchange of the arrangement, thus to print the positive quantities on the right and the negative quantities on the left. Besides set jD, there are provided two hubs which determine the unit position of the two right and left fields; these hubs are designated pUD and pUG. To control the offset device, these hubs must be wired through a flexible connection to the output terminals of the scanning chain B corresponding to the unit position of the right and left fields. It is necessary to connect also hub pa which controls the switching off of the blank inserting device to the output terminal of the scanning chain B which corresponds to the last position, that is that on the very left in the left field; this connection puts off the blank inserting and offset devices, when the scanning of both fields is terminated. Eventually, if the two fields are not adjacent, it is necessary to start blank insertions immediately after the right field scanning; thus, the output terminal of the scanning chain B corresponding to the position immediately on the left of the right field is connected to hub pd which starts the successive blank inserting device; if the two fields are adjacent such connection is useless.

If it is desired to operate simultaneously the CR or "—" inserting device and the print offset device, as only blanks may be inserted between the two fields, the following requisites are to be met: (a) if it is desired to print negative quantities on the right, characters CR or "—" have to be registered on the right of the quantities corresponding thereto; (b) if the negative quantities are printed on the left, CR or "—" must be registered on the left of the quantities they characterize.

To operate the offset device, it is absolutely necessary to know the sign; therefore, hub pUD which defines the unit position of the right field where the sign of the quantity is recorded, at the same time controls the starting of the print offset device, and automatically starts the sign detection device. Thus, hub pUD is wired to an input of CR circuit O—, the output signal of which controls a sign detection (see corresponding chapter). Thus, from the first position reached by the forward scanning the sign is recorded into trigger B— wherein it is kept until a new sign detection control; moreover bits A and B are suppressed in order to avoid all confustion, between letters and figures, and bit C is corrected in accordance with the suppression of A and B. The automatic sign detection from the right field unit position is such as to avoid simultaneously connecting hubs p— and pUD to the same terminal.

GENERAL CASE

The positive quantity must be printed on the left. No jumper short-circuits the two terminals of set jD, no signal is applied to the input of inverter ID, the signal appearing at the output of ID favors an input of the three logical "AND" circuits Gd, G'd and Ga. A second input of Gd is connected to hub pUD, thus it is favored when the scanning chain B reaches the unit position of the right field. The third input of Gd is connected to the output of "OR" circuit OAB̄ (this circuit being described in the chapter concerning the sign detection) which has an input connected to the left output of trigger BB and another connected to the right output of trigger BA; there appears a signal at the output of OAB̄ but if the read quantity is not negative, and this signal favors the third input of "AND" circuit Gd. The output signal from Gd means that the quantity is positive, therefore has to be printed on the left, while blanks are to be inserted in the right field starting from the position reached. The signal at the output of Gd runs through logical "OR" circuit Od, then "OR" circuits O'b and O'd, the two latter having been described in chapter "Blank Insertion." O'b controls the insertion of a blank, whereas O'd switches on trigger Bb and thus starts successive blank insertions. As all preceding insertions, this blank insertion stops the advance of the storage scanning chain A, maintains in the trigger register the information read out of the right field unit position, but interrupts the record into the storage. These blank insertions must be stopped when the storage scanning chain B reaches the left field unit position where the quantity must be recorded; therefore, logical "AND" circuit Ga receives a signal on its three inputs, one being connected to the output of inverter ID, another to hub pUG and another to the left output of sign trigger B—; the output signal from Ga runs through logical "OR" circuit Oa and stops the blank insertion by switching trigger Bb off. As soon as these blank insertions are stopped the storage scanning chain A resumes its advance, the information transfer from field A to field B is normally resumed and thus the positive quantity is recorded in the left field.

Let it be assumed that the read quantity is negative, when the memory scanning chain B reaches the right field unit position, no blank insertion is controlled, and the transfer of the negative quantity is thus effected to the right field. On the contrary, when the scanning chain B reaches the left field unit position, logical "AND" circuit G'd operates to start the blank inserting device. As a matter of fact, the three inputs of G'd are favored, one by the right output signal of the sign trigger B—, since the quantity is negative, another by the output signal from inverter ID since the operator wants to print the positive quantities on the left, and the third one by hub pUG when the left field unit position is reached. The output signal from G'd runs through logical "OR" circuit Od and permits to start a blank insertion as explained above. This blank insertion will be effected for all the positions of the left field and will stop only in the position having the corresponding terminal connected to hub pa which controls the resetting of trigger Bb and the stopping of blank insertions.

SPECIAL CASE

The positive quantity must be printed on the right. A jumper is placed so as to short-circuit both terminals of set jD; the signal applied to the input of inverter ID favors an input of the three logical "AND" circuits Dd, D'd and Da; conversely, there is no output signal at the output of inverter ID and the three "AND" circuits Gd, G'd and Ga are no more favored.

If the read quantity is positive, it must be printed on the right. When the right field unit position is reached, the blank insertion device is not started, the information is normally transferred in the right memory field. But when the left field unit position is reached, the second input of "AND" circuit D'd is favored by the pulse from hub pUG. As the third input of D'd is also favored by the signal at the left output of trigger B—, since the quantity is positive, a signal appears at the output of circuit D'd. This signal crosses "OR" circuits Od then O'b and O'd and starts the insertion of a series of blanks in the whole left field. This insertion is stopped by the pulse which reaches hub pa and which resets trigger Bb when the left field scanning is ended.

If the read quantity is negative, it must be printed on the left, and blanks have to be inserted in the right field. When the right field unit position is reached, the corresponding pulse from hub pUD favors an input of "AND" circuit Dd. The other inputs of Dd are also favored by the left output of trigger BA and the right output of trigger BB which corresponds to the existence of a bit B and to the absence of bit A, that is a negative sign. The output signal from D$d$ runs through logical "OR" circuit O$d$ and as previously starts successive blank insertions in the right field; these insertions will stop the advance of the storage scanning chain A. The blanks are inserted until the storage scanning chain B has reached the left field unit position; then hub $p$UG favors the second input of "AND" circuit D$a$; the third input of D$a$ is also favored by the right output of sign trigger B—, since the quantity is negative. The output signal from D$a$ runs through circuit O$a$ stops the blank insertion by resetting B$b$. The blank insertion stops and then the information is transferred from area A to area B.

In the above described device, when the scanning chain B reaches the right field unit position, hub $p$UD which is connected to an input of "OR" circuit O— starts a sign detection and recording into trigger B—, and for all the positions in the left and right fields, the used sign is that provided by sign trigger B—. However, for the unit position of the right field, the used sign is directly read from register triggers BA and BB. It is quite obvious that if it is desired to use the sign recorded into B— for all the positions of both fields, the very first included, i.e., the right field unit position; it would be enough to record the sign in trigger B— at a time preceding the recording the storage of the information to be stored in the unit position. Thus, the sign recording in B— would be synchronized by a pulse which occurs previously to the pulse controlling the recording in the storage.

RESTORATION OF THE OUTPUT STORAGE (FIGS. 4$n$ AND 4$o$)

After the forward scanning and the backward scanning of all the positions of the output storage, the line edit is terminated. The information then stored makes up the exact picture of the line to be displayed. The display device starts to insure the printing, the perforation and reproduction of this information line.

When the display operation is performed, the information recorded in the output storage is to be erased, so as to reset it and permit an edit of the information line to be reproduced in the following cycle therein. To restore the output storage, information corresponding to a blank replaces the information recorded in all the positions. For it would not be possible to suppress all the bits, because, according to the chosen code, a total absence of information bits would not be compatible and would start the error detecting device since the total number of bits must be odd. A blank is represented by the single bit C which thus has to be recorded in all the positions of the output storage, while preventing the recording of the other bits: 1, 2, 4, 8, A and B.

The signal indicating the printing or the perforation end is applied to an input of logical "OR" circuit $o$C (FIG. 4$n$) and to the input of inverter IR (FIG. 4$o$). The absence of an output signal from IR prevents the favoring of an input of logical "AND" circuit $e$I (FIG. 4$g$), which in turn does not favor an input of logical "AND" circuits E′1, E′2, E′4, E′8, E′A, E′B and E′C of the regeneration device, lines L1, L2, L4, L8, LA, LB and LC are interrupted. Inverters I1, I2, I4, I8, IA and IB are applied no input signals, whereas only the input of inverter IC receives the signal indicating the end of the display. There appears no signal at the output of IC. All inhibition core drivers are energized except GC, and thus bit C only is successively recorded in all the positions of the output storage.

Even though the invention described above is more particularly applied to magnetic core storages and the editing of an information line to be printed, the general principle which is related may also be applied to any other data storing device, and the edited line may be punched in a card or in a tape, or recorded in any displaying device.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine a storage array having a plurality of addressable positions, a first addressing ring adapted to be selectively positioned to selectively address said addressable positions, a second addressing ring for sequentially addressing a predetermined group of said addressable positions, electrical terminals selectively connectable from said second addressing ring to said first addressing ring for selectively controlling said first addressing ring for addressing selected positions of said storage array, and means for transferring data from positions addressed by said first addressing ring to positions addressed by said second ring.

2. In a data processing machine a first storage array having a plurality of addressable positions, a second storage array having a plurality of addressable positions, a first addressing ring adapted to sequentially address positions of said plurality of positions of said first storage array, a second addressing ring for sequentially addressing said plurality of positions of said second storage array, a plugboard comprising a plurality of terminals, first and second groups of said terminals being associated with said first and second addressing rings, respectively, said second addressing ring being selectively connectable through said terminals to said first addressing ring for interrupting the operation of said first addressing ring, and means for transferring data from addressed positions of said first storage array to addressed positions of said second storage array.

3. In a data processing machine a first data storage array having a plurality of addressable positions, a second data storage array having a plurality of addressable positions, a first addressing ring adapted to sequentially address positions of said first storage array, a second addressing ring for sequentially addressing said plurality of positions of said second storage array, a plugboard comprising a plurality of electrical terminals, said terminals selectively connectable from said second addressing ring to said first addressing ring for sequentially transferring data from sequentially addressed positions of said first storage array to sequentially addressed positions of said second storage array, a source of selectable data, said second addressing ring being selectively connectable through said electrical terminals to said source for selecting data from said source, means for transferring selected data from said source to an addressed position of said second storage array, and said second addressing ring being selectively connetable to others of said terminals for interrupting the operation of said first addressing means upon the selection of data from said source by said second addressing ring.

4. In a data processing machine a first data storage array having a plurality of addressable positions, a second data storage array having a plurality of addressable positions, a first addressing ring adapted to be selectively positioned to selectively address positions of said first storage array, a second addressing ring for addressing said plurality of addressable positions of said second storage array, electrical terminals selectively connectable from said second addressing ring to said first addressing ring for selectively positioning said first addressing ring, and means for transferring data from addressed positions of said first data storage array to addressed positions of said second data storage array.

5. In a data processing machine a first data storage array having a plurality of addressable positions, a second data storage array having a plurality of addressable positions, an addressing ring adapted to be selectively positioned to address a corresponding position of said first storage array, a stepping ring having a plurality of stages, means for sequentially advancing said stepping ring through said plurality of stages to sequentially activate successive stages, means connecting each stage of said stepping ring to a corresponding position in said second storage array for addressing successive positions in said second storage array as corresponding stages of said stepping device are activated, a plugboard comprising a plurality of electrical terminals, said terminals selectively connecting stages of said stepping ring to said addressing ring to position said addressing means according to the selective connection upon the activation of said connected stages, and means for transferring data from addressed positions of said first storage array to addressed positions of said second storage array.

6. In a data processing machine a first data storage array having a plurality of addressable positions, a second data storage array having a plurality of addressable positions, a first stepping device having a plurality of stages, means for sequentially activating successive stages of said stepping device, means connecting each stage of said stepping device to a corresponding addressable position in said first storage array for sequentially addressing the positions corresponding to the sequentially activated stages of said stepping device, a second stepping device having a plurality of stages, means for sequentially activating the successive stages of said second stepping device, means connecting each stage of said second stepping device to a corresponding addressable position in said second storage array for sequentially addressing the positions in said second storage array corresponding to the sequentially activated stages of said second stepping device, a plugboard comprising a plurality of electrical terminals, said terminals selectively connecting stages of said second stepping device to stages of said first stepping device to set said first stepping device to the stage connected to an active stage of said second stepping device, and means for transferring data from addressed positions of said first storage array to addressed positions of said second storage array.

7. In a data processing machine a first data storage array having a plurality of addressable positions, a second data storage array having a plurality of addressable positions, a first stepping device having a plurality of stages, means for sequentially activating successive stages of said first stepping device, means connecting each stage of said first stepping device to a corresponding addressable position in said first storage array for sequentially addressing the positions of said first storage array corresponding to the sequentially activated stages of said first stepping device, a second stepping device having a plurality of stages, means for sequentially activating the successive stages of said second stepping device, means connecting each stage of said second stepping device to a corresponding addressable position in said second storage array for sequentially addressing the positions in said second storage array corresponding to the sequentially activated stages of said second stepping device, a plugboard comprising a plurality of electrical terminals arranged in groups, a first group of said terminals selectively connecting stages of said second stepping device to stages of said first stepping device to set said first stepping device to the stage connected to an active stage of said second stepping device, a source of special character manifestations, a second group of said terminals selectively connecting stages of said second stepping device to said source for selecting a character manifestation in accordance with the connection and the active stage of said second stepping device, means for transmitting selected character manifestations from said source to said second data storage array, means for transferring data from addressed positions of said first data storage array to addressed positions of said second data storage array, and said second stepping device being connected to a third group of said terminals for interrupting the stepping of said first stepping device upon the selection of a special character manifestation whereby a special character manifestation may be interposed between data transferred from said first data storage array.

8. In a data processsing machine a first data storage array having a plurality of addressable positions, a first ring having a plurality of stages for addressing a corresponding plurality of addressable positions in said first storage array and adapted to be set to any stage by a signal applied to that stage, means for advancing said first ring from a stage at which it is set through successive stages, a second data storage device having a plurality of addressable positions, a second ring having a plurality of stages for addressing a corresponding plurality of addressable positions in said second storage array, means for sequentially advancing said second ring through said plurality of stages, means for transferring data from positions addressed by said first ring to positions addressed by said second ring, a source of special characters having a plurality of terminals each corresponding to a special character, said source adapted to manifest a special character in response to a signal on the corresponding terminal, means for selectively connecting stages of said second ring to said terminals to apply signals to said terminals as said second ring advances through the stages connected thereto, and means for transmitting special character manifestations from said source to positions of said second storage array addressed by said second ring.

9. In a data processing machine a first data storage array having a plurality of addressable positions, a first ring having a plurality of stages for addressing a corresponding plurality of addressable positions in said first storage array and adapted to be set to any stage by a signal applied to that stage, means for advancing said first ring from a stage at which it is set through successive stages, a second data storage device having a plurality of addressable positions, a second ring having a plurality of stages for addressing a corresponding plurality of addressable positions in said second storage array, means for sequentially advancing said second ring through said plurality of stages, means for transferring data from positions addressed by said first ring to positions addressed by said second ring, a source of special characters having a plurality of terminals each corresponding to a special character, said source adapted to manifest a special character in response to a signal on the corresponding terminal, means for selectively connecting stages of said second ring to said terminals to apply signals to said terminals as said second ring advances through the stages connected thereto, means responsive to said second ring advancing through a stage selectively connected to one of said terminals for interrupting the operation of said means for advancing said first ring, and means for transferring special character manifestations from said source to positions of said second storage array addressed by said second ring.

10. In an editing machine a first data storage array having a plurality of addressable positions, a first ring having a plurality of stages for addressing a corresponding plurality of addressable positions in said first storage array and adapted to be set to any stage by a signal applied to that stage, means for advancing said first ring from a stage at which it is set through successive stages, a second data storage device having a plurality of addressable positions, a second ring having a plurality of stages for addressing a corresponding plurality of addressable positions in said second storage array, means for sequentially advancing said second ring in a first direction through said plurality of stages, means for transferring data from positions addressed by said first ring to positions addressed by said second ring during the advance of said second ring in said first direction, means for selectively connecting stages of said second ring to stages of said first ring to apply signals to the connected stages of said first ring as said second ring advances in said first direction through the stages connected thereto, and means for sequentially advancing said second ring in a second direction through said plurality of stages.

11. In an editing machine a first data storage array having a plurality of addressable positions, a first ring having a plurality of stages for addressing a corresponding plurality of addressable positions in said first storage array and adapted to be set to any stage by a signal applied to that stage, means for advancing said first ring from a stage at which it is set through successive stages, a second data storage device having a plurality of addressable positions, a second ring having a plurality of stages for addressing a corresponding plurality of addressable positions in said second storage array, means for sequentially advancing said second ring in a first direction through said plurality of stages, means for transferring data from positions addressed by said first ring to positions addressed by said second ring during the advance of said second ring in said first direction, means for selectively connecting stages of said second ring to stages of said first ring to apply signals to the connected stages of said first ring as said second ring advances in said first direction through the stages connected thereto, and means for reading out the data from positions addressed by said second ring during the advance of said second ring in said second direction.

12. In an editing machine a first data storage array having a plurality of addressable positions, a first ring having a plurality of stages for addressing a corresponding plurality of addressable positions in said first storage array and adapted to be set to any stage by a signal applied to that stage, means for advancing said first ring from a stage at which it is set through successive stages, a second data storage device having a plurality of addressable positions, a second ring having a plurality of stages for addressing a corresponding plurality of addressable positions in said second storage array, means for sequentially advancing said second ring in a first direction through said plurality of stages, means for transferring data from positions addressed by said first ring to positions addressed by said second ring during the advance of said second ring in said first direction, means for selectively connecting stages of said second ring to stages of said first ring to apply signals to the connected stages of said first ring as said second ring advances in said first direction through the stages connected thereto, means for reading the data out from positions addressed by said second ring during the advance of said second ring in said second direction, and means responsive to data read out during the advance of said second ring in said second direction for altering subsequent data read out.

13. In an editing machine a first data storage array having a plurality of addressable positions, a first ring having a plurality of stages for addressing a corresponding plurality of addressable positions in said first storage array and adapted to be set to any stage by a signal applied to that stage, means for advancing said first ring from a stage at which it is set through successive stages, a second data storage device having a plurality of addressable positions, a second ring having a plurality of stages for addressing a corresponding plurality of addressable positions in said second storage array, means for sequentially advancing said second ring in a first direction through said plurality of stages, means for transferring data from positions addressed by said first ring to positions addressed by said second ring during the advance of said second ring in said first direction, means for selectively connecting stages of said second ring to stages of said first ring to apply signals to the connected stages of said first ring as said second ring advances in said first direction through the stages connected thereto, means for reading the data out from positions addressed by said second ring during the advance of said second ring in said second direction, signal generating means, means responsive to said signal generating means for altering predetermined data read out from second storage array, and means responsive to said predetermined data for disabling said signal generating means.

14. In an editing machine a first data storage array having a plurality of addressable positions, a first ring having a plurality of stages for addressing a corresponding plurality of addressable positions in said first storage array and adapted to be set to any stage by a signal applied to that stage, means for advancing said first ring from a stage at which it is set through successive stages, a second data storage device having a plurality of addressable positions, a second ring having a plurality of stages for addressing a corresponding plurality of addressable positions in said second storage array, means for sequentially advancing said second ring in a first direction through said plurality of stages, means for transferring data from positions addressed by said first ring to positions addressed by said second ring during the advance of said second ring in said first direction, means for selectively connecting stages of said second ring to stages of said first ring to apply signals to the connected stages of said first ring as said second ring advances in said first direction through the stages connected thereto, a source of special characters having a plurality of terminals each corresponding to a special character, said source adapted to manifest a special character in response to a signal on the corresponding terminal, means for selectively connecting stages of said second ring to said terminals to apply signals to said terminals as said second ring advances in said first direction through the stages connected thereto, means responsive to said second ring advancing in said first direction through a stage selectively connected to one of said terminals for interrupting the operation of said means for advancing said first ring, means for transferring special character manifestations from said source to positions of said second storage array, addressed by said second ring during its advance in said first direction, and means for reading out the data from positions addressed by said second ring during the advance of said second ring in said second direction.

15. In an editing machine a first data storage array having a plurality of addressable positions, a first ring having a plurality of stages for addressing a corresponding plurality of addressable positions in said first storage array and adapted to be set to any stage by a signal applied to that stage, means for advancing said first ring from a stage at which it is set through successive stages, a second data storage device having a plurality of addressable positions, a second ring having a plurality of stages for addressing a corresponding plurality of addressable positions in said second storage array, means for sequentially advancing said second ring in a first direction through said plurality of stages, means for transferring data from positions addressed by said first ring to positions addressed by said second ring during the advance of said second ring in said first direction, means for selectively connecting stages of said second ring to stages of said first ring to apply signals to the connected stages of said first ring as said second ring advances in said first direction through the stages connected thereto, a source of special characters having a plurality of terminals each corresponding to a special character, said source adapted to manifest a special character in response to a signal on the corresponding terminal, means for selectively connecting stages of said second ring to said terminals to apply signals to said terminals as said second ring advances in said first direction through the stages connected thereto, means responsive to said second ring advancing in said first direction through a stage selectively connected to one of said terminals for interrupting the operation of said means for advancing said first ring, means for transferring special character manifestations from said source to positions of said second storage array addressed by said second ring during its advance in said first direction, means for reading the data out from positions addressed by said second ring during the advance of said second ring in said second direction, and means responsive to data read out during the advance of said second ring in said second direction for altering subsequent data read out.

16. In an editing machine a first data storage array having a plurality of addressable positions, a first ring having a plurality of stages for addressing a corresponding plurality of addressable positions in said first storage array and adapted to be set to any stage by a signal applied to that stage, means for advancing said first ring from a stage at which it is set through successive stages, a second data storage device having a plurality of addressable positions, a second ring having a plurality of stages for addressing a corresponding plurality of addressable positions in said second storage array, means for sequentially advancing said second ring in a first direction through said plurality of stages, means for transferring data from positions addressed by said first ring to positions addressed by said second ring during the advance of said second ring in said first direction, means for selectively connecting stages of said second ring to stages of said first ring to apply signals to the connected stages of said first ring as said second ring advances in said first direction through the stages connected thereto, a source of special characters having a plurality of terminals each corresponding to a special character, said source adapted to manifest a special character in response to a signal on the corresponding terminal, means for selectively connecting stages of said second ring to said terminals to apply signals to said terminals as said second ring advances in said first direction through the stages connected thereto, means responsive to said second ring advancing in said first direction through a stage selectively connected to one of said terminals for interrupting the operation of said means for advancing said first ring, means for transferring special character manifestations from said source to positions of said second storage array addressed by said second ring during its advance in said first direction, means for reading the data out from positions addressed by said second ring during the advance of said second ring in said second direction, signal generating means, means responsive to said signal generating means for altering predetermined data read out from second storage array, and means responsive to said predetermined data for disabling said signal generating means.

17. Apparatus according to claim 16 wherein said first and said second storage arrays comprise an array of magnetic cores.

18. Apparatus according to claim 16 further characterized by the provision of means for reentering the data read out from said second data storage array therein.

19. Apparatus according to claim 16 wherein said first and said second rings each comprise a plurality of individual rings operating together.

20. Apparatus according to claim 16 wherein said means for selectively connecting stages of said second ring to stages of said first ring comprise a plurality of plug wires.

21. Apparatus according to claim 16 wherein said signal generating means comprises a bistable device set in a first state in response to a connection to a floating dollar sign terminal of said source of special characters and reset in response to the sensing of this character in said second storage array.

22. Apparatus according to claim 21 wherein the sensing of a floating dolar sign character alters the output data from said second storage array to represent a dollar sign while said bistable device is in said first state and alters the floating dollar sign character to represent a zero when said bistable device is reset whereby a dollar sign is manifested as output data only adjacent the highest significant digit of a number.

23. Apparatus according to claim 20 wherein said means for selectively connecting stages of said second ring to said terminals comprise a plurality of plug wires.

24. Apparatus according to claim 15 wherein said data responsive means is responsive to the sensing of a blank to suppress all following high order zeros.

25. Apparatus according to claim 24 wherein said connecting means comprise a plurality of pluggable connectors.

26. Apparatus according to claim 10 further characterized by the provision of second selective connecting means and means for enabling one of said connecting means and disabling the other.

27. Apparatus according to claim 14 further characterized by the provision of a second pair of selective connecting means and means for enabling one pair and disabling the other in response to a sign detection.

References Cited in the file of this patent

UNITED STATES PATENTS

| | | |
|---|---|---|
| 2,714,843 | Hooven | Aug. 9, 1955 |
| 2,719,965 | Person | Oct. 4, 1955 |
| 2,762,485 | Bafour | Sept. 11, 1956 |
| 2,797,862 | Andrews | July 2, 1957 |
| 2,801,406 | Lubkin | July 30, 1957 |
| 2,853,696 | Mendelson | Sept. 23, 1958 |
| 2,885,659 | Spielberg | May 5, 1959 |
| 2,957,626 | Havens | Oct. 25, 1960 |

OTHER REFERENCES

Handbook of Automation, Computation and Control by Grabbe, Ramo and Wooldridge. Copyright 1959 by John Wiley & Sons, pp. 2–56 to 2–59.

Publication, Electronic Operations, Type 701 IBM Electronic Data Processing Machines, vols. 1 and 2, dated 9–22–52 to 2–3–53.